United States Patent
Sasakura et al.

(10) Patent No.: US 12,379,357 B2
(45) Date of Patent: Aug. 5, 2025

(54) METHOD FOR QUANTIFYING AMINO GROUP-CONTAINING COMPOUND PROTECTED BY PROTECTING GROUP HAVING FMOC SKELETON

(71) Applicant: CHUGAI SEIYAKU KABUSHIKI KAISHA, Tokyo (JP)

(72) Inventors: Kiyoshi Sasakura, Tokyo (JP); Keiji Nii, Kamakura (JP)

(73) Assignee: CHUGAI SEIYAKU KABUSHIKI KAISHA, Tokyo (JP)

( * ) Notice: Subject to any disclaimer, the term of this patent is extended or adjusted under 35 U.S.C. 154(b) by 380 days.

(21) Appl. No.: 17/769,317

(22) PCT Filed: Oct. 15, 2020

(86) PCT No.: PCT/JP2020/038852
§ 371 (c)(1),
(2) Date: Apr. 14, 2022

(87) PCT Pub. No.: WO2021/075478
PCT Pub. Date: Apr. 22, 2021

(65) Prior Publication Data
US 2024/0151696 A1 May 9, 2024

(30) Foreign Application Priority Data
Oct. 15, 2019 (JP) .................. 2019-188647

(51) Int. Cl.
*G01N 30/88* (2006.01)
*G01N 30/86* (2006.01)
*G01N 30/02* (2006.01)

(52) U.S. Cl.
CPC ......... *G01N 30/88* (2013.01); *G01N 30/8631* (2013.01); *G01N 2030/027* (2013.01); *G01N 2030/8818* (2013.01)

(58) Field of Classification Search
CPC ....... G01N 2030/027; G01N 2030/067; G01N 2030/8818; G01N 30/06; G01N 30/8631; G01N 30/88
See application file for complete search history.

(56) References Cited

U.S. PATENT DOCUMENTS

| | | | |
|---|---|---|---|
| 2003/0180663 A1 | 9/2003 | Namba et al. | |
| 2012/0022228 A1 | 1/2012 | Giraud et al. | |
| 2017/0081358 A1* | 3/2017 | Thomas, III | ............. C07K 7/06 |

FOREIGN PATENT DOCUMENTS

| | | |
|---|---|---|
| CN | 101131377 A | 2/2008 |
| CN | 101893611 A | 11/2010 |

(Continued)

OTHER PUBLICATIONS

Carpino, L. A., et al., "The 9-Fluorenylmethoxycarbonyl Function, a New Base-Sensitive Amino-Protecting Group," J Amer Chem Soc., 92(19):5748-5749 (1970).

Freeman, C. E. and Howard, A.G., et al., "Measurement of the FMOC loading of protected amine-functionalised polymer beads," Talanta, 65:574-577 (2005).

(Continued)

*Primary Examiner* — Jennifer Wecker
(74) *Attorney, Agent, or Firm* — Nixon & Vanderhye P.C.

(57) ABSTRACT

The present inventors discovered that compounds containing an amino group protected with a protecting group having an Fmoc skeleton can be quantitatively determined accurately by removing the protecting group having the Fmoc skeleton from the compounds and measuring the contents of dibenzofulvene or its derivative thereby produced.

20 Claims, 36 Drawing Sheets

(56) References Cited

FOREIGN PATENT DOCUMENTS

| | | |
|---|---|---|
| CN | 102621250 A | 8/2012 |
| CN | 107365352 A | 11/2017 |
| EP | 2181983 A1 | 5/2010 |
| EP | 2716650 A1 | 4/2014 |
| EP | 3636656 A1 | 4/2020 |
| JP | 2008529035 A | 7/2008 |
| KR | 20090081461 A | 7/2009 |
| TW | 200305062 A | 10/2003 |
| WO | WO2006084130 A2 | 8/2006 |
| WO | WO2009014177 A1 | 1/2009 |
| WO | WO2011157803 A1 | 12/2011 |
| WO | WO2012165546 A1 | 12/2012 |
| WO | WO2018225851 A1 | 12/2018 |

OTHER PUBLICATIONS

Guo, Y., et al., "Analysis of Total Amino Acids by Pre-column Derivatization with Fmoc," Chromatogr., 7(4):219-221 (1989).

Musaimi, O. A. et al., "Calculating Resin Functionalization in Solid-Phase Peptide Synthesis Using a Standardized Method based on Fmoc Determination," ACS Comb Sci., 21:717-721 (2019).

Newcomb, W., et al., "Analysis of 9-Fluorenylmethoxycarbonyl (FMOC) Loading of Solid-Phase Synthesis Resins by Gas Chromatography," Biotechnol Bioeng. (Comb Chem), 61(1):55-60 (1998).

Várady, L., et al., "Fast and quantitative high-performance liquid chromatography method for the determination of 9-fluorenylmethoxycarbonyl release from solid-phase synthesis resins," J Chromatogr A, 869:171-179 (2000).

* cited by examiner

METHOD FOR QUANTIFYING AMINO GROUP-CONTAINING COMPOUND PROTECTED BY PROTECTING GROUP HAVING FMOC SKELETON

CROSS-REFERENCE TO RELATED APPLICATIONS

This application is a U.S. National Phase of PCT Application No. PCT/JP2020/038852, filed Oct. 15, 2020, which claims the benefit of Japanese Patent Application No. 2019-188647, filed Oct. 15, 2019, each of which is incorporated herein by reference in its entirety.

TECHNICAL FIELD

The present invention relates to methods of quantitatively determining compounds containing an amino group protected with a protecting group having an Fmoc skeleton.

BACKGROUND ART

In recent years, attention has been attracted to drug discovery technology development that allows drug discovery against a tough target, which is represented by inhibition of a protein-protein interaction, agonists, and molecular chaperones, by using molecular peptide compounds (molecular weight: 500 to 2000). These compounds are typically synthesized on a solid phase by elongating amino acids whose N terminus has been protected with an Fmoc group. In manufacturing medicaments, evaluation of raw material content is critically important in terms of quality control, and ICHQ11 requires providing appropriate quality control items for raw materials set as starting materials under GMP. When an Fmoc-amino acid is set as a starting material, its content is typically evaluated by titration, and besides titration, quantitative NMR is used. Titration methods are most commonly used due to their ease of testing; however, they have the disadvantage of losing the accuracy of content measurement if the substance to be measured contains an acid such as carboxylic acid as an impurity. Furthermore, while quantitative NMR has the advantage of being able to measure the number of nuclei of hydrogen atoms directly and accurately at the functional group level, it cannot separate multiple components, unlike chromatography such as HPLC and GC.

An Fmoc group is frequently used as a protecting group for compounds containing an amino group(s). This Fmoc group can be quantitatively determined by chromatography since it shows ultraviolet (UV) absorption. Moreover, methods are known in which the loading amount of Fmoc groups on polymer beads is quantitatively determined using dibenzofulvene (DBF), which is produced when the Fmoc groups are removed (NPLs 1, 2, and 3).

CITATION LIST

Non-Patent Literature

[NPL 1] William S. N. et al. Biotechnol. Bioeng. 1998, 61, 55-60.
[NPL 2] Laszlo V. et al. J. Chromatogr. A 2000, 869, 171-179.
[NPL 3] Freeman C E et al. Talanta 2005, 65, 574-577.

SUMMARY OF INVENTION

Technical Problem

As mentioned above, an Fmoc group can be quantitatively determined by chromatography since it shows ultraviolet (UV) absorption. However, the molar absorption coefficient at the same wavelength varies according to compounds, and even though the molar absorption coefficients of compounds are the same under a certain condition, their molar absorption coefficients may differ from each other when the solvent composition for elution in chromatography changes. Thus, with respect to each compound to be quantitatively determined, it is necessary to prepare an authentic sample of the compound for which the content has been confirmed. For example, when an Fmoc-amino acid consisting of a natural amino acid is quantitatively determined by chromatography, authentic samples of Fmoc-amino acids have been sold by many manufactures and thus the quantitative determination can be performed by comparing an authentic sample and the Fmoc-amino acid by chromatography. On the other hand, for an unnatural amino acid and a peptide protected with an Fmoc group, which are being used recently, it is difficult to obtain authentic samples of the amino acid and peptide. Thus, when they are measured by chromatography, it is necessary to synthesize their authentic samples one by one and then to confirm the contents.

Furthermore, in the above-mentioned literatures, the loading amount of an Fmoc group on polymer beads is evaluated; however, it is quantitative evaluation including other impurities having an Fmoc group. Moreover, since dibenzofulvene produced by removing an Fmoc group is an unstable molecule and degrades over time, it may cause a decrease in the accuracy of quantitation of a compound containing an amino group protected with a protecting group having an Fmoc skeleton.

The present invention was achieved in view of the above circumstances. A problem to be solved by the present invention is to provide methods of quantitatively determining a compound containing an amino group protected with a protecting group having an Fmoc skeleton to the first decimal place as required for manufacturing medicaments, as long as there is one authentic sample of the compound.

Solution to Problem

As a solution to the above-mentioned problem, the present inventors have found the following, and thereby completed the present invention.
1) The present inventors discovered novel methods of quantitatively determining a compound containing an amino group protected with a protecting group having an Fmoc skeleton by an indirect technique in which the protecting group having the Fmoc skeleton is removed from the compound and the content of dibenzofulvene or its derivative thereby produced is quantitatively determined, instead of quantitatively determining the compound itself.
2) The present inventors discovered that the content of a compound containing an amino group protected with a protecting group having an Fmoc skeleton can be calculated to the first decimal place as required for raw material quality control for medicaments, based on the purity of the compound in a crude product and the content of dibenzofulvene or its derivative produced after removal of the protecting group having the Fmoc skeleton.

3) The present inventors made it possible to calculate the accurate content with few errors by setting the measurement conditions for the purity to be the same as those for dibenzofulvene or its derivative.

4) The present inventors discovered reaction conditions in which the reaction rate of the deprotection reaction of a protecting group having an Fmoc skeleton is 100% and that of a side reaction is almost 0%, thereby enabling more accurate quantitative determination.

5) The present inventors discovered that the stability of dibenzofulvene or its derivative produced after removal of a protecting group having an Fmoc skeleton is improved by mixing the dibenzofulvene or its derivative with an acid to allow calculation of a value closer to the true value.

More specifically, the present invention comprises the following.

The present invention relates to the following methods of quantitatively determining a compound containing an amino group protected with a protecting group having an Fmoc skeleton:

(A1) a method of quantitatively determining the content of a compound containing an amino group protected with a protecting group having an Fmoc skeleton (hereinafter may be referred to as a first Fmoc compound) comprised in a crude product, the method comprising
deprotecting the protecting group with a base from the first Fmoc compound in a solution (hereinafter may be referred to as a first solution) to quantitatively determine the content of dibenzofulvene or its derivative thereby produced;

(A2) the method of (A1), further comprising deprotecting a protecting group having an Fmoc skeleton with a base from a compound containing an amino group with the protecting group (hereinafter may be referred to as a second Fmoc compound) used as an authentic sample in a solution (hereinafter may be referred to as a second solution) to quantitatively determine the content of dibenzofulvene or its derivative thereby produced, wherein the content rate (% weight) of the first Fmoc compound relative to the second Fmoc compound is calculated by comparing the content of the dibenzofulvene or its derivative between in the first solution and in the second solution;

(A3) the method of (A2), wherein the deprotection reactions quantitatively proceed in the first solution and in the second solution;

(A4) the method of any one of (A1) to (A3), wherein the content of the dibenzofulvene or its derivative is quantitatively determined by measuring the peak area of the dibenzofulvene or its derivative;

(A5) the method of any one of (A2) to (A4), further comprising correcting the content rate with an Fmoc purity in the crude product,
wherein the "Fmoc purity" is the ratio of the content of the first Fmoc compound to the sum of the contents of all compounds protected with the protecting group having the Fmoc skeleton contained in the crude product;

(A6) the method of (A5), wherein the Fmoc purity is calculated based on (i) the peak area of the first Fmoc compound and (ii) each peak area of the compounds protected with the protecting group having the Fmoc skeleton other than the first Fmoc compound in the crude product;

(A7) the method of any one of (A2) to (A6), further comprising correcting the content rate with an internal standard substance;

(A8) the method of (A7), comprising comparing the content of an internal standard substance comprised in the first solution (hereinafter may be referred to as a first internal standard substance) with that of an internal standard substance comprised in the second solution (hereinafter may be referred to as a second internal standard substance);

(A9) the method of (A8), wherein the contents of the first and second internal standard substances are each quantitatively determined by measuring the peak areas of the first and second internal standard substances;

(A10) the method of any one of (A8) to (A9), wherein the first and second internal standard substances are independently selected from the group consisting of anthracene, phenanthrene, naphthalene, benzene, toluene, triphenylene, and naphthacene;

(A11) the method of any one of (A8) to (A10), wherein the first and second internal standard substances are anthracene;

(A12) the method of any one of (A4), (A6), and (A9), wherein each peak area is measured by chromatography;

(A13) the method of (A12), wherein the chromatography is liquid chromatography or gas chromatography;

(A14) the method of (A12) or (A13), wherein each peak area is measured under the same measurement conditions;

(A15) the method of any one of (A1) to (A14), wherein the protecting group having the Fmoc skeleton is represented by Formula (1):

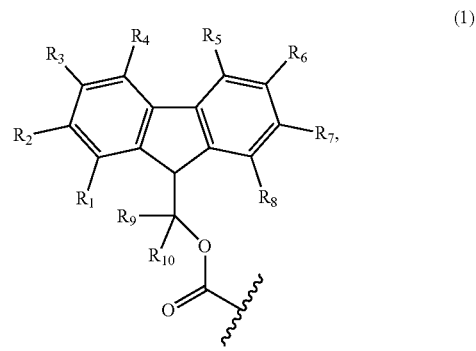

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl;

(A16) the method of any one of (A1) to (A15), wherein the protecting group having the Fmoc skeleton is an Fmoc group, Fmoc(2,7tb) group, Fmoc(1Me) group, Fmoc(2F) group, Fmoc(2,7Br) group, mio-Fmoc group, dio-Fmoc group, tdf-Fmoc group, Fmoc(2TMS) group, Fmoc(2so3h) group, sm-Fmoc group, or rm-Fmoc group;

(A17) the method of any one of (A1) to (A16), wherein the protecting group having the Fmoc skeleton is an Fmoc group;

(A18) the method of any one of (A1) to (A17), wherein the first Fmoc compound and/or the second Fmoc compound are/is not supported by a solid phase;

(A19) the method of any one of (A1) to (A18), wherein the first Fmoc compound and/or the second Fmoc compound are/is amino acid(s), peptide(s), or low molecular weight organic compound(s), each protected with the protecting group having the Fmoc skeleton;

(A20) the method of any one of (A1) to (A19), wherein the first Fmoc compound and/or the second Fmoc compound are/is amino acid(s) or peptide(s), each protected with the protecting group having the Fmoc skeleton;

(A21) the method of (A19) or (A20), wherein the amino acid is an α-amino acid or a β-amino acid;

(A22) the method of any one of (A19) to (A21), wherein a main chain carboxy group of the amino acid is a free carboxy group;

(A23) the method of (A19) or (A20), wherein the peptide comprises an α-amino acid(s) and/or a β-amino acid(s) or consists of an α-amino acid(s) and/or a β-amino acid(s);

(A24) the method of any one of (A1) to (A23), wherein the base is an organic base;

(A25) the method of any one of (A1) to (A24), wherein the base is at least one base selected from the group consisting of amines, bases having an amidine skeleton, and bases having a guanidine skeleton;

(A26) the method of (A24), wherein the organic base is selected from the group consisting of 1,8-diazabicyclo[5.4.0]-7-undecene (DBU)), 2,3,6,7-tetrahydro-1H,5H-9-azabenzo[ij]quinolizine, 1,4-diazabicyclo[2.2.2]octane (DABCO)), 1,5-diazabicyclo[4.3.0]-5-nonene, 7-methyl-1,5,7-triazabicyclo[4.4.0]dec-5-ene, 1,1,3,3-tetramethylguanidine, 2-tert-butyl-1,1,3,3-tetramethylguanidine, 1,8-bis(tetramethylguanidino)naphthalene, triethylamine, trimethylamine, 1-methylpiperidine, N,N'-dimethylpiperazine, N-methylmorpholine, N-ethylmorpholine, p-dimethylaminopyridine, piperidine, morpholine, dicyclohexylamine, p-dimethylaminopyridine, diisopropylethylamine, pyridine, piperazine, and tetrabutylammonium fluoride;

(A27) the method of any one of (A1) to (A26), wherein the base is an organic base comprising one or more tertiary amines but comprising no primary or secondary amine;

(A28) the method of (A27), wherein the organic base comprising one or more tertiary amines but comprising no primary or secondary amine is selected from the group consisting of 1,8-diazabicyclo[5.4.0]-7-undecene (DBU)), 2,3,6,7-tetrahydro-1H,5H-9-azabenzo[ij]quinolizine, 1,4-diazabicyclo[2.2.2]octane (DABCO)), 1,5-diazabicyclo[4.3.0]-5-nonene, 7-methyl-1,5,7-triazabicyclo[4.4.0]dec-5-ene, 2-tert-butyl-1,1,3,3-tetramethylguanidine, 1,8-bis(tetramethylguanidino)naphthalene, triethylamine, trimethylamine, 1-methylpiperidine, N,N'-dimethylpiperazine, N-methylmorpholine, N-ethylmorpholine, and p-dimethylaminopyridine;

(A29) the method of (A27), wherein the organic base comprising one or more tertiary amines but comprising no primary or secondary amine is 1,8-diazabicyclo[5.4.0]-7-undecene;

(A30) the method of any one of (A1) to (A29), further comprising adding an acid to the first and/or second solutions after removal of the protecting group having the Fmoc skeleton;

(A31) the method of (A30), wherein the acid is an organic acid and/or an inorganic acid;

(A32) the method of (A31), wherein the organic acid is selected from the group consisting of citric acid, oxalic acid, maleic acid, tetramethylammonium hydrogensulfate, formic acid, acetic acid, trifluoroacetic acid, propionic acid, monofluoroacetic acid, difluoroacetic acid, trichloroacetic acid, monochloroacetic acid, dichloroacetic acid, and combinations thereof;

(A33) the method of (A31) or (A32), wherein the inorganic acid is selected from the group consisting of phosphoric acid, boric acid, hydrochloric acid, nitric acid, sulfuric acid, hydrobromic acid, phosphonic acid, and combinations thereof;

(A34) the method of any one of (A1) to (A33), wherein a solvent of the first and/or second solutions is an aprotic polar solvent;

(A35) the method of (A34), wherein the aprotic polar solvent is DMF, DMA, NMP, DMSO, or acetonitrile;

(A36) the method of any one of (A1) to (A35), wherein the protecting group is deprotected at a reaction temperature of 0° C. to 50° C.; and (A37) the method of any one of (A2) to (A36), wherein the content rate (% weight) is calculated from the formula:

$$\text{Content rate (\% weight)} = \frac{C_S \times A_T}{C_T \times A_S} \times 100,$$

wherein:
$C_S$ is the molar concentration of the second Fmoc compound;
$C_T$ is the molar concentration of the crude product assuming that the crude product consists of only the first Fmoc compound;
$A_S$ is the peak area of the dibenzofulvene or its derivative in the second solution; and
$A_T$ is the peak area of the dibenzofulvene or its derivative in the first solution; the formula:

$$\text{Content rate (\% weight)} = \frac{C_S \times IS_S \times A_T}{C_T \times IS_T \times A_S} \times 100,$$

wherein:
$C_S$ is the molar concentration of the second Fmoc compound;
$C_T$ is the molar concentration of the crude product assuming that the crude product consists of only the first Fmoc compound;
$IS_S$ is the peak area of the internal standard substance in the second solution;
$IS_T$ is the peak area of the internal standard substance in the first solution;
$A_S$ is the peak area of the dibenzofulvene or its derivative in the second solution; and
$A_T$ is the peak area of the dibenzofulvene or its derivative in the first solution; the formula:

$$\text{Content rate (\% weight)} = \frac{C_S \times A_T}{C_T \times A_S} \times \frac{P_S}{100} \times 100,$$

wherein:
$C_S$ is the molar concentration of the second Fmoc compound;
$C_T$ is the molar concentration of the crude product assuming that the crude product consists of only the first Fmoc compound;
$A_S$ is the peak area of the dibenzofulvene or its derivative in the second solution;
$A_T$ is the peak area of the dibenzofulvene or its derivative in the first solution; and
$P_S$ is the Fmoc purity;
or the formula:

$$\text{Content rate (\% weight)} = \frac{C_S \times IS_S \times A_T}{C_T \times IS_T \times A_S} \times \frac{P_S}{100} \times 100,$$

wherein:
$C_S$ is the molar concentration of the second Fmoc compound;
$C_T$ is the molar concentration of the crude product assuming that the crude product consists of only the first Fmoc compound;
$IS_S$ is the peak area of the internal standard substance in the second solution;
$IS_T$ is the peak area of the internal standard substance in the first solution;
$A_S$ is the peak area of the dibenzofulvene or its derivative in the second solution;
$A_T$ is the peak area of the dibenzofulvene or its derivative in the first solution; and
$P_S$ is the Fmoc purity.

The present invention also relates to the following methods of stabilizing dibenzofulvene or its derivative:
(B1) a method of stabilizing dibenzofulvene or its derivative comprised in a crude product, the method comprising mixing the dibenzofulvene or its derivative with an acid;
(B2) the method of (B1), comprising mixing, with the acid, dibenzofulvene or its derivative produced by removing a protecting group having an Fmoc skeleton from a compound containing an amino group protected with the protecting group having the Fmoc skeleton (hereinafter may be referred to as an Fmoc compound);
(B3) the method of (B2), wherein the protecting group having the Fmoc skeleton is represented by Formula (1):

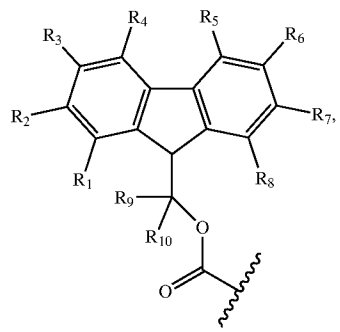

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl;
(B4) the method of (B2) or (B3), wherein the protecting group having the Fmoc skeleton is an Fmoc group, Fmoc(2,7tb) group, Fmoc(1Me) group, Fmoc(2F) group, Fmoc(2,7Br) group, mio-Fmoc group, dio-Fmoc group, tdf-Fmoc group, Fmoc(2TMS) group, Fmoc (2so3h) group, sm-Fmoc group, or rm-Fmoc group;
(B5) the method of any one of (B2) to (B4), wherein the protecting group having the Fmoc skeleton is an Fmoc group;
(B6) the method of any one of (B2) to (B5), wherein the Fmoc compound is a low molecular weight organic compound protected with the protecting group having the Fmoc skeleton that is not supported by a solid phase;
(B7) the method of any one of (B2) to (B6), wherein the Fmoc compound is an amino acid, peptide, or low molecular weight organic compound protected with the protecting group having the Fmoc skeleton;
(B8) the method of any one of (B2) to (B7), wherein the Fmoc compound is an amino acid or peptide protected with the protecting group having the Fmoc skeleton;
(B9) the method of (B7) or (B8), wherein the amino acid is an α-amino acid or β-amino acid;
(B10) the method of (B7) or (B8), wherein the peptide comprises an α-amino acid(s) and/or a β-amino acid(s) or consists of an α-amino acid(s) and/or a β-amino acid(s);
(B11) the method of (B2), wherein the acid is an organic acid and/or an inorganic acid;
(B12) the method of (B11), wherein the organic acid is selected from the group consisting of citric acid, oxalic acid, maleic acid, tetramethylammonium hydrogensulfate, formic acid, acetic acid, trifluoroacetic acid, propionic acid, monofluoroacetic acid, difluoroacetic acid, trichloroacetic acid, monochloroacetic acid, dichloroacetic acid, and combinations thereof; and
(B13) the method of (B11), wherein the inorganic acid is selected from the group consisting of phosphoric acid, boric acid, hydrochloric acid, nitric acid, sulfuric acid, hydrobromic acid, phosphonic acid, and combinations thereof.

The present disclosure also relates to the following stabilizing agents:
(C1) a stabilizing agent for stabilizing dibenzofulvene or its derivative;
(C2) the stabilizing agent of (C1), wherein the agent is an acid;
(C3) the stabilizing agent of (C2), wherein the acid is an organic acid and/or an inorganic acid;
(C4) the stabilizing agent of (C3), wherein the organic acid is selected from the group consisting of citric acid, oxalic acid, maleic acid, tetramethylammonium hydrogensulfate, formic acid, acetic acid, trifluoroacetic acid, propionic acid, monofluoroacetic acid, difluoroacetic acid, trichloroacetic acid, monochloroacetic acid, dichloroacetic acid, and combinations thereof; and
(C5) the stabilizing agent of (C3), wherein the inorganic acid is selected from the group consisting of phosphoric acid, boric acid, hydrochloric acid, nitric acid, sulfuric acid, hydrobromic acid, phosphonic acid, and combinations thereof.

Alternatively, the present disclosure also relates to the following methods of quantitatively determining compounds containing an amino group;

(D1) a method of quantitatively determining the content of a compound containing an amino group produced from a compound containing the amino group protected with a protecting group having an Fmoc skeleton (hereinafter may be referred to as an Fmoc compound) comprised in a crude product, the method comprising quantitatively determining the content of the compound containing the amino group produced by removing the protecting group having the Fmoc skeleton from the Fmoc compound;

(D2) the method of (D1), wherein the content of the compound containing the amino group is measured by chromatography;

(D3) the method of (D2), wherein the chromatography is hydrophilic interaction chromatography (HILIC);

(D4) the method of (D2) or (D3), wherein a detector of the chromatography is a charged aerosol detector (CAD) and/or a mass spectrometer;

(D5) the method of any one of (D1) to (D4), wherein the protecting group having the Fmoc skeleton is represented by Formula (1):

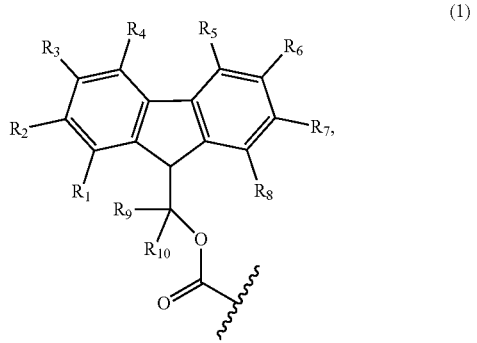

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl;

(D6) the method of any one of (D1) to (D5), wherein the protecting group having the Fmoc skeleton is an Fmoc group, Fmoc(2,7tb) group, Fmoc(1Me) group, Fmoc (2F) group, Fmoc(2,7Br) group, mio-Fmoc group, dio-Fmoc group, tdf-Fmoc group, Fmoc(2TMS) group, Fmoc(2so3h) group, sm-Fmoc group, or rm-Fmoc group;

(D7) the method of any one of (D1) to (D6), wherein the protecting group having the Fmoc skeleton is an Fmoc group;

(D8) the method of any one of (D1) to (D7), wherein the Fmoc compound is not supported by a solid phase;

(D9) the method of any one of (D1) to (D8), wherein the Fmoc compound is an amino acid, peptide, or low molecular weight organic compound protected with the protecting group having the Fmoc skeleton;

(D10) the method of any one of (D1) to (D9), wherein the Fmoc compound is an amino acid or peptide protected with the protecting group having the Fmoc skeleton;

(D11) the method of (D9) or (D10), wherein the amino acid is an α-amino acid or a β-amino acid;

(D12) the method of (D9) or (D10), wherein the peptide comprises an α-amino acid(s) and/or a β-amino acid(s) or consists of an α-amino acid(s) and/or a β-amino acid(s);

(D13) the method of any one of (D9) to (D12), wherein a main chain carboxy group of the amino acid is a free carboxy group;

(D14) the method of any one of (D1) to (D13), wherein the protecting group having the Fmoc skeleton is removed with a base;

(D15) the method of (D14), wherein the base is an organic base;

(D16) the method of (D14) or (D15), wherein the base is at least one base selected from the group consisting of amines, bases having an amidine skeleton, and bases having a guanidine skeleton;

(D17) the method of (D15), wherein the organic base is selected from the group consisting of 1,8-diazabicyclo [5.4.0]-7-undecene (DBU), 2,3,6,7-tetrahydro-1H,5H-9-azabenzo[ij]quinolizine, 1,4-diazabicyclo[2.2.2]octane (DABCO), 1,5-diazabicyclo[4.3.0]-5-nonene, 7-methyl-1,5,7-triazabicyclo[4.4.0]dec-5-ene, 1,1,3,3-tetramethylguanidine, 2-tert-butyl-1,1,3,3-tetramethylguanidine, 1,8-bis(tetramethylguanidino)naphthalene, triethylamine, trimethylamine, 1-methylpiperidine, N,N'-dimethylpiperazine, N-methylmorpholine, N-ethylmorpholine, p-dimethylaminopyridine, piperidine, morpholine, dicyclohexylamine, p-dimethylaminopyridine, diisopropylethylamine, pyridine, piperazine, and tetrabutylammonium fluoride;

(D18) the method of any one of (D14) to (D17), wherein the base is an organic base comprising one or more tertiary amines but comprising no primary or secondary amine;

(D19) the method of (D18), wherein the organic base comprising one or more tertiary amines but comprising no primary or secondary amine is selected from the group consisting of 1,8-diazabicyclo[5.4.0]-7-undecene (DBU), 2,3,6,7-tetrahydro-1H,5H-9-azabenzo[ij] quinolizine, 1,4-diazabicyclo[2.2.2]octane (DABCO), 1,5-diazabicyclo[4.3.0]-5-nonene, 7-methyl-1,5,7-triazabicyclo[4.4.0]dec-5-ene, 2-tert-butyl-1,1,3,3-tetramethylguanidine, 1,8-bis(tetramethylguanidino) naphthalene, triethylamine, trimethylamine, 1-methylpiperidine, N,N'-dimethylpiperazine, N-methylmorpholine, N-ethylmorpholine, and p-dimethylaminopyridine; and (D20) the method of (D18) or (D19), wherein the organic base comprising one or more tertiary amines but comprising no primary or secondary amine is 1,8-diazabicyclo[5.4.0]-7-undecene.

Advantageous Effects of Invention

According to the methods of the present invention, it is possible to quantitatively determine highly precisely and easily the content of compounds containing an amino group protected with a protecting group having an Fmoc skeleton comprised in analysis samples. Thus, the present invention can be an extremely useful technique for quantitatively determining such compounds at the quality level required to manufacture medicaments.

BRIEF DESCRIPTION OF DRAWINGS

FIG. 12-1 depicts a comparison between the chromatograms of the sample solution comprising crude Fmoc-Val-OH before and after DBU treatment in Example 3.

FIG. 12-2 is an enlarged view of a partial section of FIG. 12-1.

FIG. 15-1 depicts a comparison between the chromatograms of the sample solution comprising crude Fmoc-Phe-OH before and after DBU treatment in Example 3.

FIG. 15-2 is an enlarged view of a partial section of FIG. 15-1.

FIG. 18-1 depicts a comparison between the chromatograms of the sample solution comprising crude Fmoc-NMe-Val-OH before and after DBU treatment in Example 3.

FIG. 18-2 is an enlarged view of a partial section of FIG. 18-1.

DESCRIPTION OF EMBODIMENTS

Abbreviations

Figure 1:
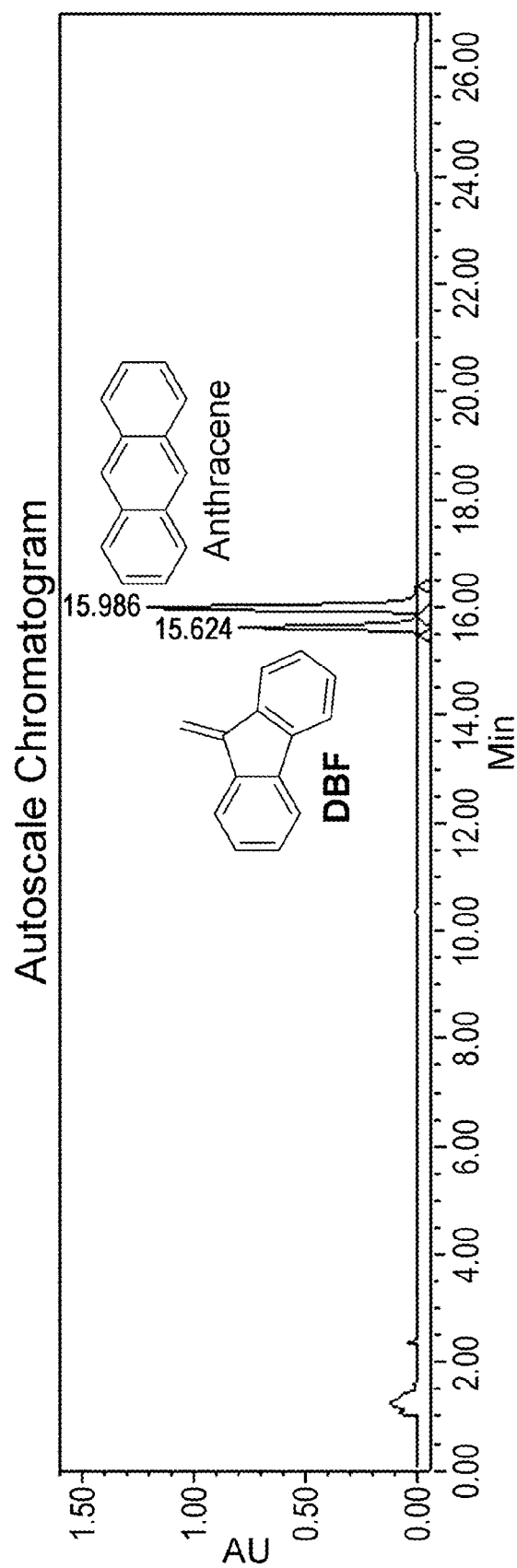
FIG. 1 shows the chromatogram of the standard solution (solution in which Fmoc-Gly-OH was treated by DBU) in Example 1.
Figure 2:
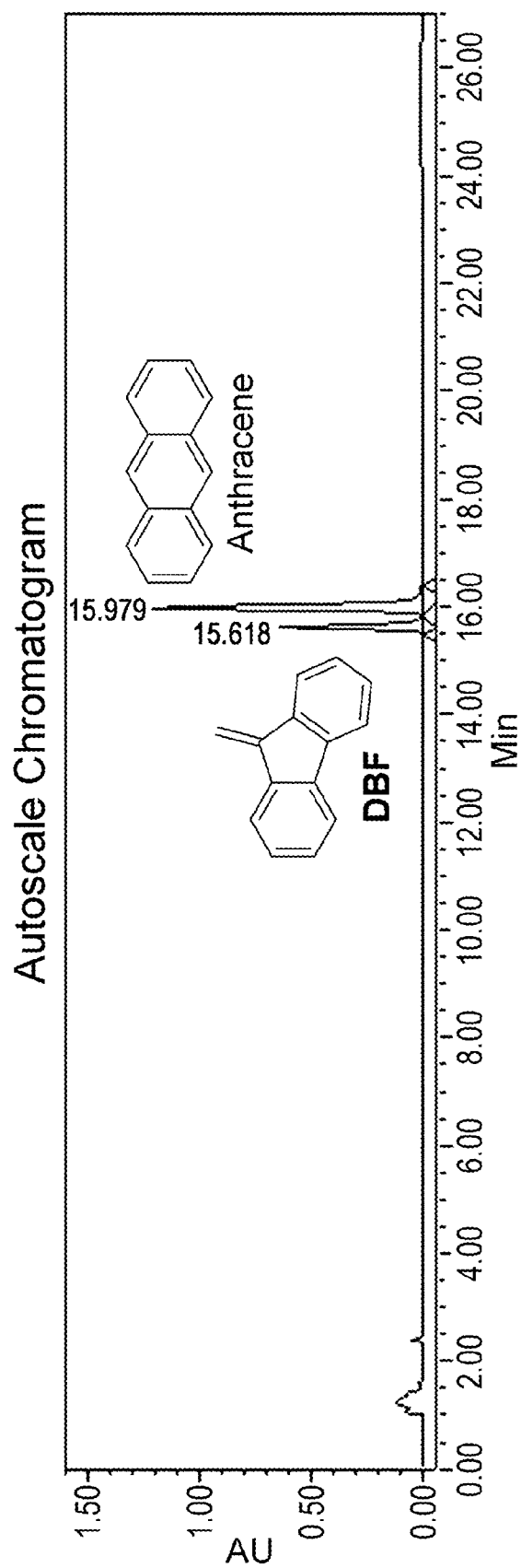
FIG. 2 shows the chromatogram of a sample solution after DBU treatment for a sample solution comprising crude Fmoc-NMe-Val-OH in Example 1.
Figure 3:
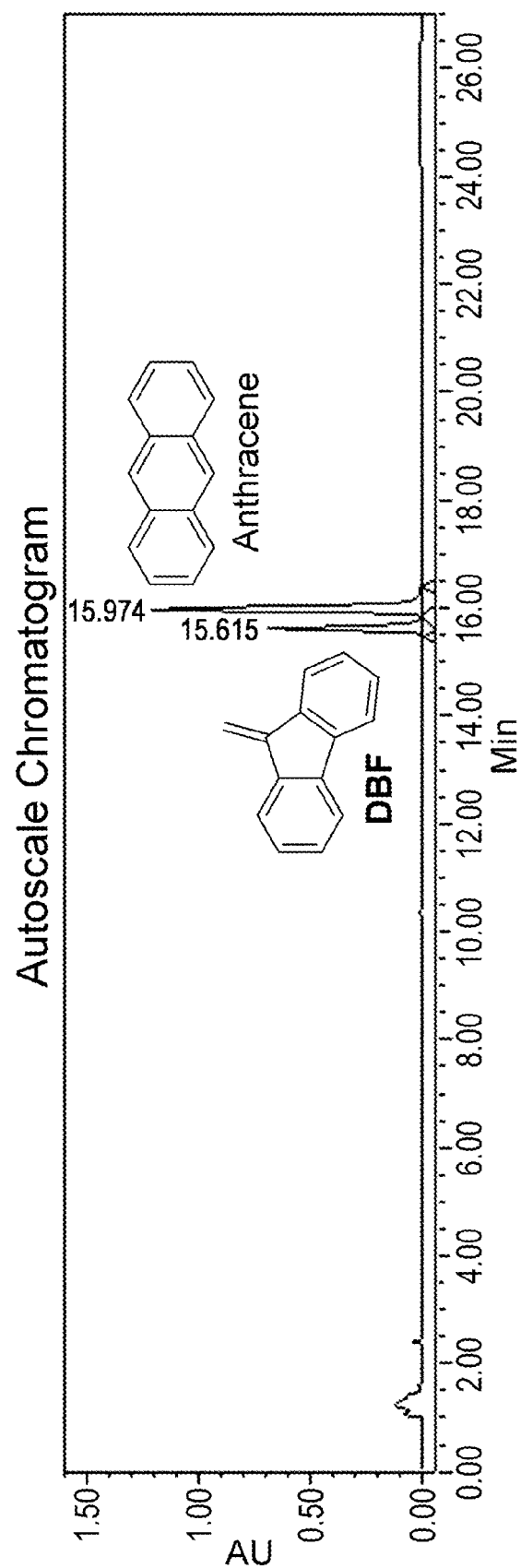
FIG. 3 shows the chromatogram of a sample solution after DBU treatment for a sample solution comprising crude Fmoc-Pro-OH in Example 1.
Figure 4:
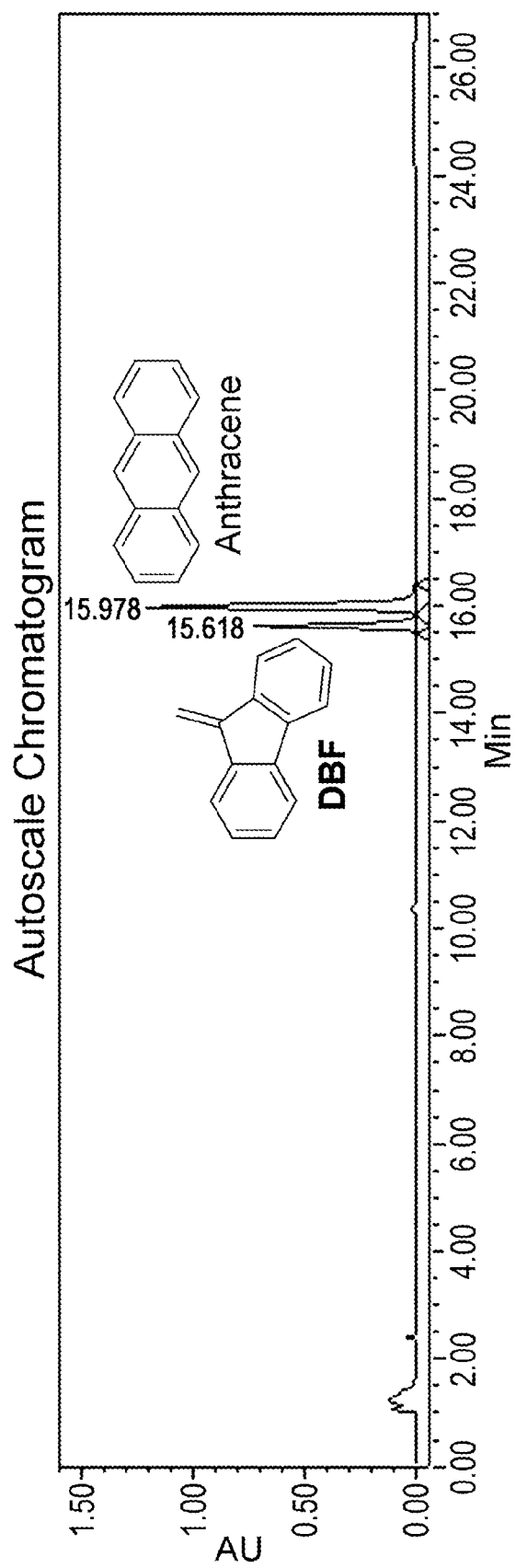
FIG. 4 shows the chromatogram of a sample solution after DBU treatment for a sample solution comprising crude Fmoc-NMe-Ala-OH in Example 1.
Figure 5:
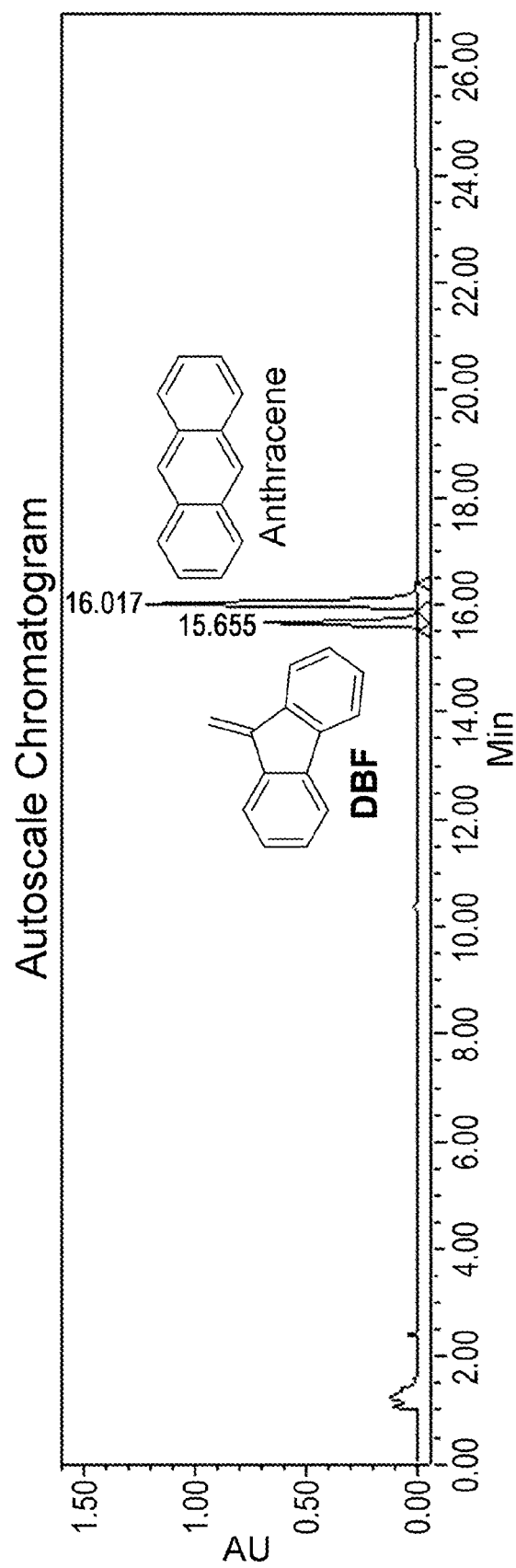
FIG. 5 shows the chromatogram of a sample solution after DBU treatment for a sample solution comprising crude Fmoc-Ile-OH in Example 1.
Figure 6:
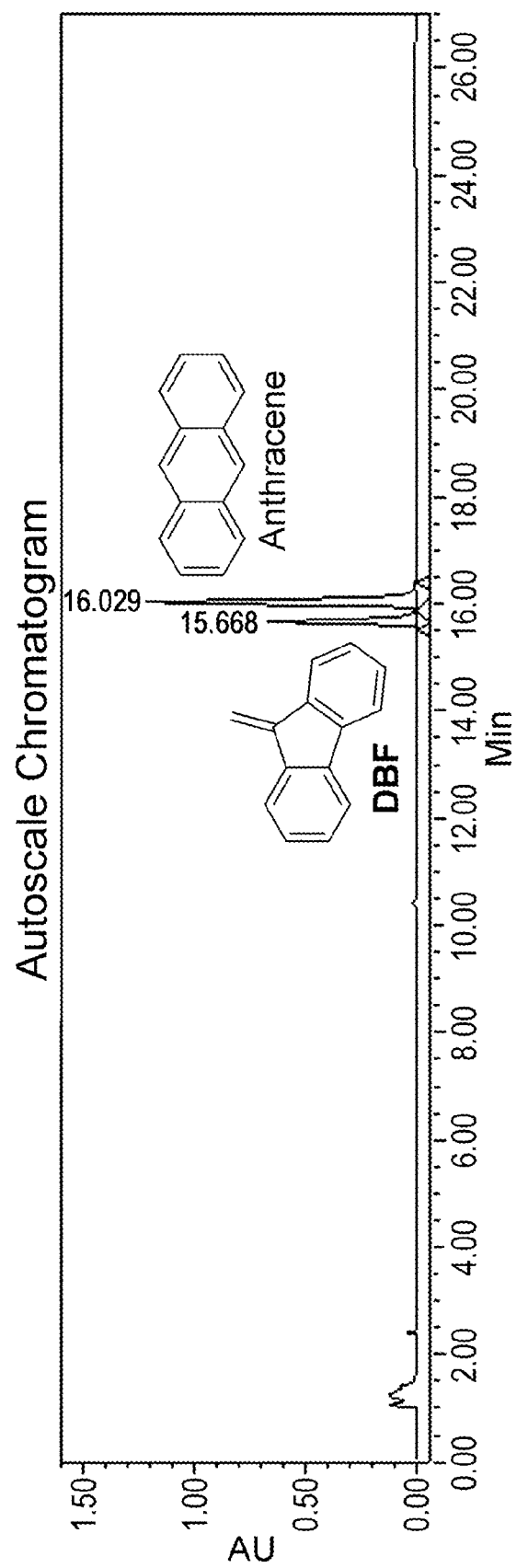
FIG. 6 shows the chromatogram of a sample solution after DBU treatment for a sample solution comprising crude Fmoc-NMe-Leu-OH in Example 1.
Figure 7:
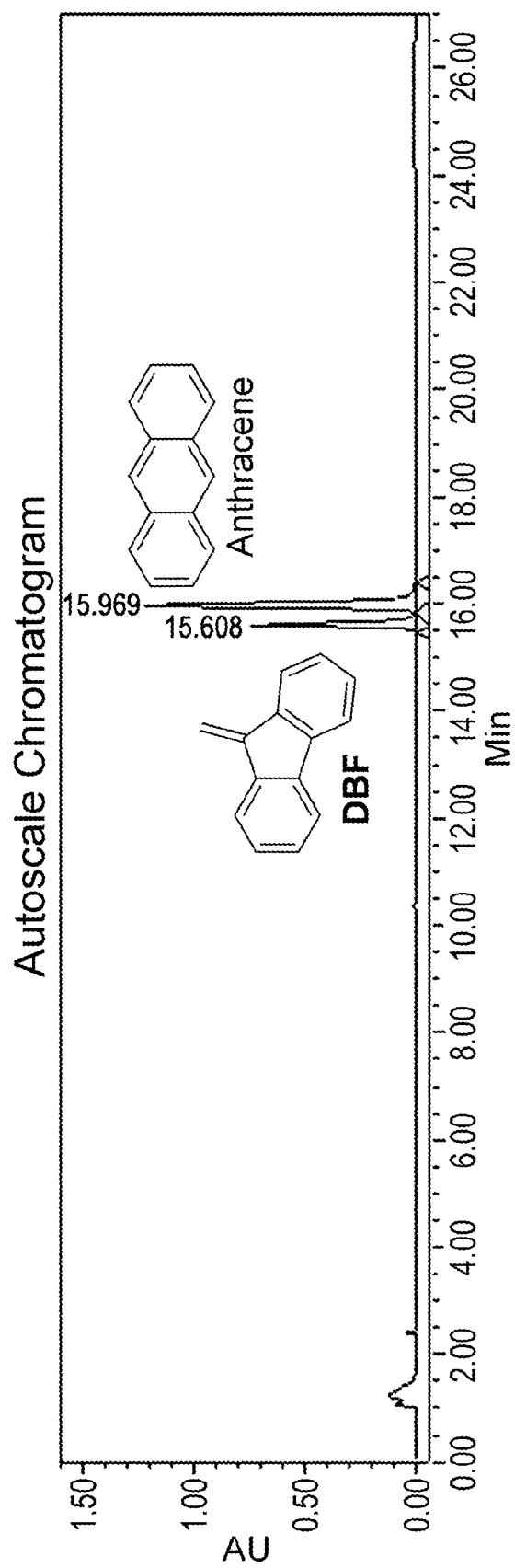
FIG. 7 shows the chromatogram of a sample solution after DBU treatment for a sample solution comprising crude Fmoc-NMe-Gly-OH in Example 1.

The meaning of signs and abbreviations used herein is shown below.

Fmoc: 9-Fluorenylmethoxycarbonyl
DBF: Dibenzofulvene
DBU: 1,8-Diazabicyclo[5.4.0]-7-undecene
DMF: N,N-Dimethylformamide
DMA: N,N-Dimethylacetamide
NMP: N-Methylpyrrolidone
DMSO: Dimethylsulfoxide
TFA: Trifluoroacetic acid
TFE: 2,2,2-Trifluoroethanol
TMS: Trimethylsilyl
$CH_3CN$: Acetonitrile
$Na_2SO_4$: Sodium sulfate
Pip: Piperidine
HILIC: Hydrophilic interaction chromatography
CAD: Charged Aerosol Detector
HPLC: High performance liquid chromatography
GC: Gas chromatography
PDA: Photodiode Array
Gly: Glycine
Ala: Alanine
Val: Valine
Leu: Leucine
Ile: Isoleucine
Met: Methionine
Phe: Phenylalanine
Tyr: Tyrosine Trp: Tryptophan
His: Histidine
Lys: Lysine
Arg: Arginine
Ser: Serine
Thr: Threonine
Asp: Aspartic acid
Glu: Glutamic acid
Asn: Asparagine
Gln: Glutamine
Cys: Cysteine
Pro: Proline
Cha: Cyclohexylalanine
cLeu: Cycloleucine
NMe: N-Methyl
bAla: β-Alanine In a certain embodiment, the present invention relates to methods of quantitatively determining the content of a compound containing an amino group protected with a protecting group having an Fmoc skeleton (hereinafter may be referred to as a first Fmoc compound) in a crude product or analysis sample.

In a certain embodiment, the above-mentioned methods comprise deprotecting the protecting group with a base from the first Fmoc compound in a solution (hereinafter may be referred to as a first solution) to quantitatively determine the content of dibenzofulvene or its derivative thereby produced.

In a certain embodiment, the above-mentioned methods further comprise deprotecting a protecting group having an Fmoc skeleton with a base from a compound containing an amino group with the protecting group (hereinafter referred to as a second Fmoc compound) used as an authentic sample in a solution distinct from the first solution (hereinafter may be referred to as a second solution) to quantitatively determine the content of dibenzofulvene or its derivative thereby produced. In this case, the content rate (% weight) of the first Fmoc compound relative to the second Fmoc compound can be calculated by comparing the content of the dibenzofulvene or its derivative between in the first solution and in the second solution.

An "analysis sample" in the present invention refers to a sample comprising a compound containing an amino group protected with a protecting group having an Fmoc skeleton. The analysis sample is preferably a crude product in which analysis sample-derived impurities and/or impurities such as moisture, organic salts, inorganic salts, and residual solvents have been removed by utilizing filtration, adsorption, recrystallization, distillation, extraction, chromatography and such.

A "content" in the present invention means the amount of any substance comprised in an analysis sample (crude product) or in a solution, for example, the amount of a compound containing an amino group protected with a protecting group having an Fmoc skeleton, a compound containing an amino group (deprotected compound), dibenzofulvene or its derivative, an internal standard substance, or such.

A "compound containing an amino group" in the present invention means any compound having a primary amino group and/or a secondary amino group. The number of amino groups comprised in the compound containing the amino group is not particularly limited, but is preferably one or two, and more preferably one. Examples of the compound containing the amino group include amino acids, peptides, and low molecular weight organic compounds. The compound containing the amino group may be or may not be supported by a solid phase (for example, a resin for solid-phase synthesis).

As used herein, a "resin for solid-phase synthesis" is not particularly limited as long as it can be used for synthesizing peptide compounds by solid-phase methods. Such a resin for solid-phase synthesis specifically includes those which can be removed under acidic conditions, such as a CTC resin, Wang resin, SASRIN resin, trityl chloride resin (Trt resin), 4-methyltrityl chloride resin (Mtt resin), and 4-methoxytrityl chloride resin (Mmt). The resin can be appropriately selected according to a functional group of the amino acid to be used. For example, when a carboxylic acid (a main chain carboxylic acid or a side chain carboxylic acid represented by Asp and Glu) or a hydroxy group on an aromatic ring (a phenol group represented by Tyr) is used as a functional group of the amino acid, it is preferred that a trityl chloride resin (Trt resin) or a 2-chlorotrityl chloride resin (CTC resin) is used as the resin. When an aliphatic hydroxy group (an aliphatic alcohol group represented by Ser and Thr) is used as a functional group of the amino acid, it is preferred that a trityl chloride resin (Trt resin), a 2-chlorotrityl chloride resin (CTC resin), or a 4-methyltrityl chloride resin (Mtt resin) is used as the resin. Meanwhile, resins may be herein referred to as resins.

The types of polymers constituting resins are also not particularly limited. For resins composed of polystyrene, both those of 100 to 200 mesh and of 200 to 400 mesh can be used. Furthermore, a crosslinking rate is not particularly limited either; however, those of 1% DVB (divinylbenzene) crosslinking is preferred. Moreover, the types of polymers constituting resins include Tentagel and Chemmatrix.

The "amino acids" herein may be "natural amino acids" or "amino acid analogs". Herein, the "amino acids", "natural amino acids", and "amino acid analogs" are also referred to as "amino acid residues", "natural amino acid residues", and "amino acid analog residues", respectively.

"Natural amino acids" are α-aminocarboxylic acids (α-amino acids), and refer to the 20 types of amino acids contained in proteins. Specifically, they refer to Gly, Ala, Ser, Thr, Val, Leu, Ile, Phe, Tyr, Trp, His, Glu, Asp, Gln, Asn, Cys, Met, Lys, Arg and Pro.

"Amino acid analogs" are not particularly limited, and include β-amino acids, γ-amino acids, D-amino acids, N-substituted amino acids, α,α-disubstituted amino acids, hydroxycarboxylic acids, and unnatural amino acids (amino acids whose side chains are different from those of natural amino acids: for example, unnatural α-amino acids, β-amino acids, and γ-amino acids). An α-amino acid may be a D-amino acid, or an α,α-dialkylamino acid. In a similar manner to an α-amino acid, a β-amino acid and a γ-amino acid are also allowed to have any configuration. Selection of amino acid side chains is not particularly limited, but they are freely selected from, for example, an alkyl group, alkenyl group, alkynyl group, aryl group, heteroaryl group, aralkyl group, and cycloalkyl group, besides a hydrogen atom. Each side chain may be provided with a substituent(s), and such a substituent is also freely selected from among any functional groups including, for example, an N atom, O atom, S atom, B atom, Si atom, and P atom (i.e., an optionally substituted alkyl group, alkenyl group, alkynyl group, aryl group, heteroaryl group, aralkyl group, cycloalkyl group and such).

The main chain amino group of an amino acid may be unsubstituted (a NH2 group), or it may be substituted (that is, —NHR group: R represents, for example, an alkyl, an alkenyl, an alkynyl, an aryl, a heteroaryl, an aralkyl, or a cycloalkyl, each of which optionally has a substituent; or a carbon chain bonded to the N atom and a carbon atom at the ☐ position may form a ring as in proline). Such amino acids in which the main chain amino group has been substituted are herein referred to as "N-substituted amino acids". Examples of "N-substituted amino acids" as used herein preferably include N-alkyl amino acids (such as N—$C_1$-$C_6$ alkyl amino acids, N—$C_1$-$C_4$ alkyl amino acids, and N-methyl amino acids), N-cycloalkyl amino acids, N-cycloalkyl alkyl amino acids, N-aryl amino acids, and N-aralkyl amino acids, but are not limited thereto.

The main chain carboxy group of an amino acid may be unsubstituted (carboxy group: COOH group) or may form an ester group (that is, —COOR group: R is, for example, an optionally substituted alkyl, alkenyl, alkynyl, aryl, heteroaryl, aralkyl, or cycloalkyl). Such amino acids in which the main chain carboxy group forms an ester group are herein referred to as "amino acid esters". Examples of "amino acid esters" as used herein include amino acid $C_{1-10}$ alkyl esters, amino acid benzyl esters, amino acid [2,4-di($C_1$-$C_{25}$ alkoxy)phenyl]methyl esters, amino acid (3,4,5-tri$C_1$-$C_{25}$ alkoxyphenyl)methyl esters, amino acid methyl esters, amino acid ethyl esters, amino acid tert-butyl esters, amino acid trityl esters, amino acid (3,4,5-trioctadecoxyphenyl)methyl esters, amino acid [2-(12-docosoxydodecoxy)-9-(3-fluorophenyl)fluorene-9-yl] esters, and [2,4-di(docosoxy)phenyl]methyl esters, but are not limited thereto.

The main chain carboxy group of an amino acid may form an amide group (that is, —$CONR_1R_2$ group: $R_1$ and $R_2$ are independently selected from the group consisting of, for example, hydrogen, an optionally substituted alkyl, alkenyl, alkynyl, aryl, heteroaryl, aralkyl, and cycloalkyl). Such amino acids in which the main chain carboxy group has been substituted with an amide group are herein referred to as "amino acid amides". Examples of "amino acid amides" as used herein include amino acid $C_1$-$C_{10}$ alkylamides, amino acid benzylamides, and amino acid bis[4-(docosoxy)phenyl] methylamides (AJIPHASE (registered trademark)), but are not limited thereto.

Herein, the term "side chain" is used in the context of an amino acid side chain, a side chain in the cyclic portion of a cyclic peptide and such, and means the part not comprised in the main chain structure of each compound.

The term "peptide" as used herein includes a linear or cyclic peptide in which two or more amino acids are linked, and amino acids may be "natural amino acids" or "amino acid analogs".

"Natural amino acids" and "amino acid analogs" constituting peptides comprise all isotopes corresponding to each of them. Isotopes of a "natural amino acid" and an "amino acid analog" are those in which at least one atom has been substituted with an atom which is identical in atomic number (number of protons) and is different in mass number (sum of the numbers of protons and neutrons). Examples of isotopes comprised in the "natural amino acids" and "amino acid analogs" constituting the peptides of the present invention include a hydrogen atom, carbon atom, nitrogen atom, oxygen atom, phosphorus atom, sulfur atom, fluorine atom, and chlorine atom, and they comprise $^2H$, $^3H$, $^{13}C$, $^{14}C$, $^{15}N$, $^{17}O$, $^{18}O$, $^{32}P$, $^{35}S$, $^{18}F$, and $^{36}Cl$, respectively.

In the present invention, the term "organic compound" means a compound comprising carbon(s).

In the present invention, the term "low molecular weight organic compound" means a compound with low molecular weight and comprising carbon(s), and its molecular weight is preferably 1500 daltons or less.

In the present invention, the term "protecting group having an Fmoc skeleton" means an Fmoc group or a group in which any substituent has been introduced into any position in the constituent skeleton of an Fmoc group. Such a protecting group having an Fmoc skeleton specifically includes a protecting group represented by Formula (1):

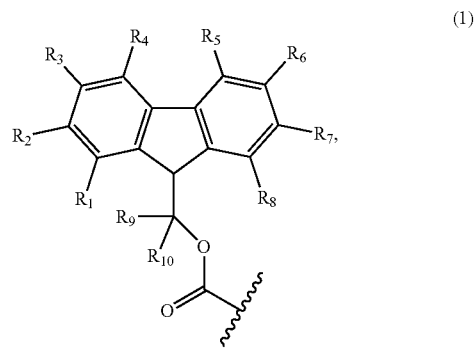

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl.

More specifically, examples of the protecting group having the Fmoc skeleton include 9-fluorenylmethyloxycarbonyl (Fmoc) group, 2,7-di-tert-butyl-Fmoc (Fmoc(2,7tb)) group, 1-methyl-Fmoc (Fmoc(1Me)) group, 2-fluoro-Fmoc (Fmoc(2F)) group, 2,7-dibromo-Fmoc (Fmoc(2,7Br)) group, 2-monoisooctyl-Fmoc (mio-Fmoc) group, 2,7-diisooctyl-Fmoc (dio-Fmoc) group, 2,7-(3,3,4,4,5,5,6,6,7,7,8,8,8-tridecafluorooctyl)-Fmoc (tdf-Fmoc) group, 2,7-bis(trimethylsilyl)-Fmoc (Fmoc(2TMS)) group, (2-sulfo-9H-fluorene-9-yl)methoxycarbonyl group (Fmoc(2so3h)), [(1S)-1-(9H-fluorene-9-yeethoxy]carbonyl group (sm-Fmoc), and [(1R)-1-(9H-fluorene-9-yl)ethoxy]carbonyl group (rm-Fmoc). Reagents for introducing these protecting groups having the Fmoc skeleton can be purchased or synthesized by known methods.

In the present invention, the term "compound containing an amino group protected with a protecting group having an Fmoc skeleton" means a compound in which at least one of the primary amino groups and/or secondary amino groups which the compound has is protected with a protecting group having an Fmoc skeleton.

In the present invention, the term "amino acid protected with a protecting group having an Fmoc skeleton" refers to a natural amino acid or an amino acid analog in which at least one of the main chain and/or side chain amino groups is protected with a protecting group having an Fmoc skeleton.

In the present invention, the term "compound containing an amino group protected with an Fmoc group" means a compound containing an amino group in which at least one of the primary amino groups and/or secondary amino groups which the compound has is protected with an Fmoc group.

In the present invention, the term "amino acid protected with an Fmoc group" refers to a natural amino acid or an amino acid analog in which at least one of the main chain and/or side chain amino groups is protected with an Fmoc group. An amino acid protected with an Fmoc group, a natural amino acid protected with an Fmoc group, and an amino acid analog protected with an Fmoc group may be referred to as an "Fmoc-amino acid", "Fmoc-natural amino acid", and "Fmoc-amino acid analog", respectively.

Examples of the amino acids protected with an Fmoc group that can be used in the present invention are described below, but are not limited thereto. Many of these amino acids protected with an Fmoc group can be purchased in a state in which the side chain is protected or unprotected and the amine portion is protected or unprotected Amino acids protected with an Fmoc group that cannot be purchased can be synthesized by known methods.

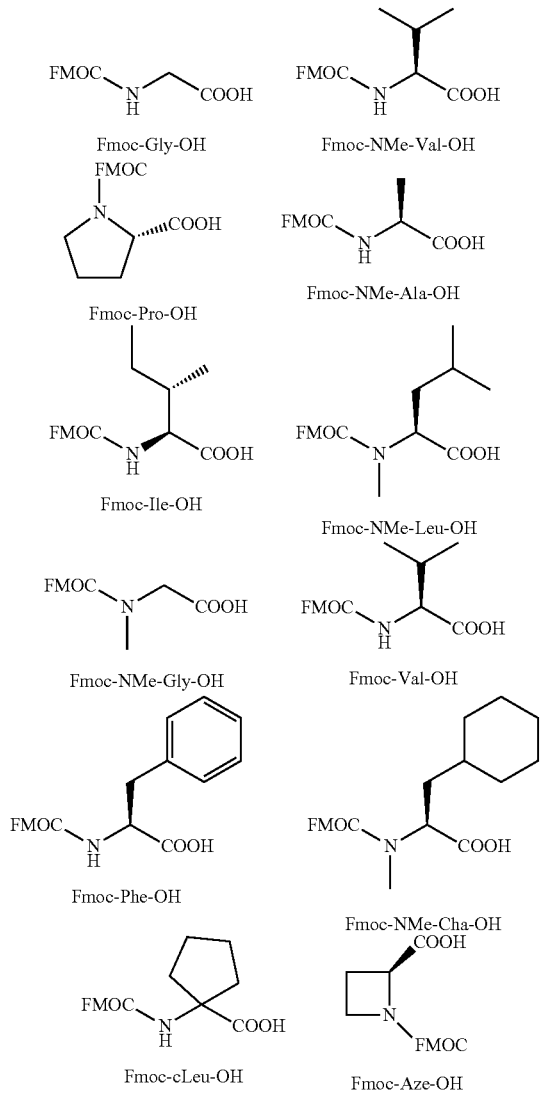

In the present invention, the term "peptide protected with a protecting group having an Fmoc skeleton" means a peptide comprising the above-mentioned "amino acid protected with a protecting group having an Fmoc skeleton". Examples of such a peptide include dipeptides and oligopeptides which have two or more amino acids comprising either or both of the above-mentioned natural amino acids protected with a protecting group having an Fmoc skeleton and amino acid analogs protected with a protecting group having an Fmoc skeleton.

In the present invention, the term "peptide protected with an Fmoc group" means a peptide comprising the above-mentioned "amino acid protected with an Fmoc group". Examples of such a peptide include dipeptides and oligopeptides which have two or more amino acids comprising either or both of the above-mentioned natural amino acids protected with an Fmoc group and amino acid analogs protected with an Fmoc group.

The term "alkyl" as used herein refers to a monovalent group derived by removing any one hydrogen atom from an aliphatic hydrocarbon, and covers a subset of hydrocarbyl or hydrocarbon group structures that contain hydrogen and carbon atoms, but do not contain a heteroatom (which refers to an atom other than carbon and hydrogen atoms) or an unsaturated carbon-carbon bond in the skeleton. The alkyl includes linear and branched alkyl. The alkyl is alkyl having 1 to 20 carbon atoms ($C_1$-$C_{20}$; hereinafter, "$C_p$-$C_q$" means that it has p to q carbon atoms), preferred examples of which include $C_1$-$C_{10}$ alkyl, $C_1$-$C_8$ alkyl $C_1$-$C_6$ alkyl and $C_1$-$C_4$ alkyl. Specific examples of alkyl include methyl, ethyl, propyl, butyl, pentyl, hexyl, isopropyl, tert-butyl, sec-butyl, 1-methylpropyl, 1,1-dimethylpropyl, 2,2-dimethylpropyl, 1,2-dimethylpropyl, 1,1,2-trimethylpropyl, 1,2,2-trimethylpropyl, 1,1,2,2-tetramethylpropyl, 1-methylbutyl, 2-methylbutyl, 3-methylbutyl, 1,1-dimethylbutyl, 1,2-dimethylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, isopentyl, and neopentyl.

The term "fluoroalkyl" as used herein means a group obtained by substituting one or more hydrogen atoms of the "alkyl" with fluorine atoms, and preferred examples include $C_1$-$C_8$ fluoroalkyl, $C_1$-$C_6$ fluoroalkyl, $C_1$-$C_4$ fluoroalkyl, and $C_1$-$C_2$ fluoroalkyl. Specific examples of fluoroalkyl include trifluoromethyl, 2,2,2-trifluoroethyl, pentafluoroethyl, 2,2,3,3-tetrafluoropropyl, heptafluoropropyl, trifluoromethoxy, 2,2,2-trifluoroethoxy, pentafluoroethoxy, 2,2,3,3-tetrafluoropropoxy, heptafluoropropoxy, and 3,3,4,4,5,5,6,6,7,7,8,8,8-tridecafluorooctyl.

The term "cycloalkyl" as used herein means a saturated or partially saturated cyclic monovalent aliphatic hydrocarbon group, including single rings, bicyclo rings, and spiro rings. Preferred examples include $C_3$-$C_8$ cycloalkyl. The cycloalkyl may be partially unsaturated. Specific examples of the cycloalkyl include cyclopropyl, cyclobutyl, cyclopentyl, and cyclohexyl.

The term "cycloalkylalkyl" as used herein means a group in which any hydrogen atom in the above-defined "alkyl" has been substituted with the above-defined "cycloalkyl". Preferred examples of cycloalkylalkyl include $C_3$-$C_8$ cycloalkyl-$C_1$-$C_6$ alkyl and $C_3$-$C_6$ cycloalkyl-$C_1$-$C_4$ alkyl. Specific examples include cyclopropylmethyl, cyclopropylethyl, cyclobutylmethyl, cyclopentylmethyl, and cyclohexylmethyl.

The term "aryl" as used herein refers to a monovalent aromatic hydrocarbon ring, preferred examples of which include $C_6$-$C_{10}$ aryl. Specific examples of the aryl include phenyl and naphthyl (e.g., 1-naphthyl or 2-naphthyl).

The term "heteroaryl" as used herein refers to a monovalent aromatic ring group containing preferably 1 to 4 heteroatoms in the ring-forming atoms (herein also called "in the ring"), which may be partially saturated. The ring may be a single ring or two fused rings (such as bicyclic heteroaryl in which heteroaryl is fused with benzene or monocyclic heteroaryl). The number of the ring-forming atoms is preferably 5 to 10 (5- to 10-membered heteroaryl). Specific examples of the heteroaryl include furyl, thienyl, pyrrolyl, imidazolyl, pyrazolyl, thiazolyl, pyridyl, pyrimidyl, pyridazinyl, pyrazinyl, benzofuranyl, benzothienyl, quinolyl, isoquinolyl, quinazolinyl, and quinoxalinyl.

The term "aralkyl (arylalkyl)" as used herein refers to a group containing both aryl and alkyl, for example, a group in which at least one hydrogen atom of the alkyl is replaced with aryl, preferred examples of which include "$C_6$-$C_{10}$ aryl-$C_1$-$C_6$ alkyl". Examples include benzyl and phenethyl.

The term "alkenyl" as used herein refers to a monovalent group having at least one double bond (two adjacent sp2 carbon atoms). The double bond can assume entgegen (E) or zusammen (Z) and cis or trans geometric forms depending on the arrangement of the double bond and substituents (if they exist). Examples of alkenyl include linear or branched chains, including straight chains containing internal olefins. Preferred examples thereof include $C_2$-$C_{10}$ alkenyl, and more preferably $C_2$-$C_6$ alkenyl. Specific examples of alkenyl include vinyl, allyl, 1-propenyl, 2-propenyl, 1-butenyl, 2-butenyl (including cis and trans forms), 3-butenyl, pentenyl, and hexenyl.

The term "alkynyl" as used herein refers to a monovalent group having at least one triple bond (two adjacent sp carbon atoms). Examples thereof include linear or branched chain alkynyl including internal alkylene. Preferred examples thereof include $C_2$-$C_{10}$ alkynyl, and more preferably $C_2$-$C_6$ alkynyl. Specific examples of alkynyl include ethynyl, 1-propynyl, propargyl, 3-butynyl, pentynyl, and hexynyl.

The term "alkoxy" as used herein refers to an oxy group to which the above-defined "alkyl" is bonded. Examples include alkoxy having 1 to 20 carbon atoms ($C_1$-$C_{20}$). Specific examples of the alkoxy include methoxy, ethoxy, 1-propoxy, 2-propoxy, n-butoxy, i-butoxy, sec-butoxy, tert-butoxy, and (3,7,11,15-tetramethylhexadecyl)oxy.

Examples of halogen include fluoro (—F), chloro (—Cl), bromo (—Br), and iodo (—I).

The term "sulfo" as used herein refers to the group represented by —$SO_3H$.

The term "trimethylsilyl" as used herein refers to the group represented by —Si($CH_3$)$_3$ or TMS.

In a certain embodiment, the first solution comprises a crude product comprising a compound containing an amino group protected with a protecting group having an Fmoc skeleton (first Fmoc compound) whose content is to be calculated, solvents, and bases. The first solution may comprise an internal standard substance. In the first solution, a deprotection reaction of the protecting group having the Fmoc skeleton takes place. When synthesizing a peptide protected with a protecting group having an Fmoc skeleton by a solid-phase method, the methods of the present invention can comprise cutting off the peptide compound supported by a resin for solid-phase synthesis from the resin to obtain the peptide, prior to the deprotecting step. Herein, the first solution may be referred to as a "sample solution". Moreover, a sample solution before the deprotection reaction may be herein referred to as an "unreacted" sample solution, and when used with this term, the term "sample solution" may mean a solution after the deprotection reaction. The deprotection reaction in the first solution preferably proceeds quantitatively.

In a certain embodiment, the second solution comprises a compound containing an amino group protected with a protecting group having an Fmoc skeleton (second Fmoc compound) which is used as an authentic sample, solvents, and bases. The second solution may comprise an internal standard substance. The second Fmoc compound is not limited as long as its accurate content can be ascertained, and for example, a compound whose purity and/or content is 100% or nearly 100% is used. A specific example of the second Fmoc compound includes glycine in which the amino group has been protected with an Fmoc group (Fmoc-Gly-OH), which is commercially available from many vendors, but is not limited thereto. As with the first solution, a deprotection reaction of the protecting group having the Fmoc skeleton takes place also in the second solution. Herein, the second solution may be referred to as a "standard solution". Moreover, a standard solution before the deprotection reaction may be herein referred to as an "unreacted" standard solution, and when used with this term, the term "standard solution" may mean a solution after the deprotection reaction. The deprotection reaction in the second solution preferably proceeds quantitatively.

Any solvent in which an analysis sample and the second Fmoc compound used as an authentic sample dissolve can be used in the first solution and/or the second solution, and for example, aprotic polar solvents such as acetonitrile, DMF, DMA, NMP, and DMSO can be preferably used. Solvents used in the first solution and/or the second solution may be the same or different, but are preferably the same.

The terms "removal" and "deprotection" as used herein refer to putting a primary amino group and/or a secondary amino group protected with a protecting group having an Fmoc skeleton into a state not protected with the protecting group.

In a certain embodiment, a protecting group having an Fmoc skeleton can be removed by a solid-phase reaction or a liquid-phase reaction, and a liquid-phase reaction is preferred. Furthermore, a compound containing an amino group protected with a protecting group having an Fmoc skeleton may or may not be supported by a solid phase, and is preferably not supported by a solid phase.

In a certain embodiment, a protecting group having an Fmoc skeleton can be removed by stirring and/or leaving to stand a reaction mixture for 1 minute to 5 days at a temperature of 0° C. to a temperature near the boiling point of a solvent, preferably at a temperature of 0° C. to 80° C., and more preferably at a temperature of 0° C. to 50° C., in the presence of a base. To this reaction, an internal standard substance which is not involved in the removal reaction may or may not be added.

In a certain embodiment, any base that can remove a protecting group can be used to remove the protecting group having the Fmoc skeleton. Such a base includes organic bases and inorganic bases, and organic bases are preferred.

In a certain embodiment, an organic base includes bases comprising tertiary amines such as 1,8-diazabicyclo[5.4.0]-7-undecene (DBU), 2,3,6,7-tetrahydro-1H,5H-9-azabenzo[ij]quinolizine, 1,4-diazabicyclo[2.2.2]octane (DABCO), 1,5-diazabicyclo[4.3.0]-5-nonene, 7-methyl-1,5,7-triazabicyclo[4.4.0]dec-5-ene, 1,1,3,3-tetramethylguanidine, 1,8-bis(tetramethylguanidino)naphthalene, 2-tert-butyl-1,1,3,3-tetramethylguanidine, triethylamine, trimethylamine, 1-methylpiperidine, N,N'-dimethylpiperazine, N-methylmorpholine, N-ethylmorpholine, and p-dimethylaminopyridine; and in addition to the above, an organic base includes piperidine, morpholine, dicyclohexylamine, p-dimethylaminopyridine, diisopropylethylamine, pyridine, piperazine, and tetrabutylammonium fluoride, but is not limited thereto. Among these, an organic base which comprises one or more tertiary amines but comprising no primary or secondary amine is preferred, and 1,8-diazabicyclo[5.4.0]-7-undecene (DBU) is more preferred.

In a certain embodiment, a base of any equivalents that can fully remove a protecting group having an Fmoc skeleton can be used in the present invention. Specifically, a base of 0.1 v/v % to 20 v/v %, preferably 1 v/v % to 10 v/v %, and more preferably 1 v/v % to 4 v/v % in a solution can be used.

Herein, the term "dibenzofulvene or its derivative" means a compound represented by Formula (2):

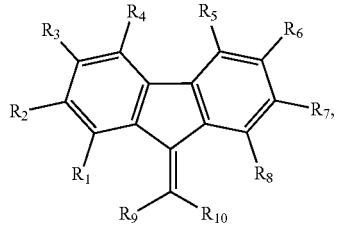

(2)

wherein $R_1$ to $R_{10}$ are the same as $R_1$ to $R_{10}$ of the protecting group having the Fmoc skeleton represented by Formula (1), and which is produced when a protecting group having an Fmoc skeleton is removed. The compound represented by Formula (3) below is "dibenzofulvene", in which $R_1$ to $R_{10}$ are all hydrogen:

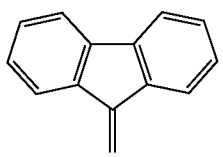

(3)

In a certain embodiment, in the present invention, the content rate (% weight) of the first Fmoc compound relative to the second Fmoc compound can be calculated by comparing the content of the dibenzofulvene or its derivative between in the first solution and in the second solution.

In a certain embodiment, dibenzofulvene or its derivative in the first solution and/or the second solution can be separated from other components in the first solution and/or the second solution by chromatography, and the content of the dibenzofulvene or its derivative can be quantitatively determined by the method.

Any chromatography can be used that can separate a compound containing an amino group protected with a protecting group having an Fmoc skeleton, a compound containing an amino group (deprotected compound), dibenzofulvene (DBF) or its derivative, and an internal standard substance. Examples of such chromatography include chromatography such as liquid chromatography, supercritical fluid chromatography, gas chromatography, thin-layer chromatography, hydrophilic interaction chromatography (HILIC), ion exchange chromatography (IEX), and size exclusion chromatography (SEC), electrophoresis, and ion mobility spectrometry (for example, ion mobility). Liquid chromatography, gas chromatography, electrophoresis, and ion mobility spectrometry are preferred. Moreover, high performance liquid chromatography (HPLC) and ultra-high performance liquid chromatography (UPLC) are preferred as liquid chromatography. These methods may be known.

Normal phase liquid chromatography can be performed by known methods using, for example, a stationary phase such as silica and alumina and a mobile phase such as hexane, ethyl acetate, methylene chloride, isopropyl alcohol, ethanol, methanol, tetrahydrofuran, and a mixed solvent thereof.

Reverse phase liquid chromatography can be performed by known methods. For example, a filler modified with a hydrophobic compound, specifically silica gel modified with a hydrophobic compound can be used as a stationary phase of reverse phase liquid chromatography. For example, organic solvents, aqueous solutions, and mixed solvents thereof can be used as a mobile phase of reverse phase liquid chromatography. Organic solvents include, for example, acetonitrile, methanol, ethanol, and isopropyl alcohol. Organic solvents may include acids such as formic acid, trifluoroacetic acid, and acetic acid. Examples of aqueous solutions include water, a formic acid aqueous solution, an ammonium formate aqueous solution, a trifluoroacetic acid aqueous solution, an acetic acid aqueous solution, an ammonium acetate aqueous solution, an ammonium bicarbonate aqueous solution, ammonia water, and a buffer solution. Furthermore, an ion pair agent such as sodium alkyl sulfonate and salt thereof and tetraalkylammonium or trialkyl aluminum and salt thereof may be added to the solvent. This allows improving the separation capacity of the analysis column when the peak separation is poor. When a mobile phase is a mixed solvent in liquid chromatography, the mixing ratio may be changed stepwise or continuously. Temperature conditions and the flow of a mobile phase in liquid chromatography can be appropriately set according to properties of dibenzofulvene or its derivative and an internal standard substance and the like.

Any method can be used for identifying and quantitatively determining a compound containing an amino group protected with a protecting group having an Fmoc skeleton, dibenzofulvene (DBF) or its derivative, and an internal standard substance. Examples of such a method include those using an ultraviolet-visible absorption detector, diode array detector (PDA), fluorescence detector, differential refractive index detector, evaporative light scattering detector, charged aerosol detector (CAD), mass spectrometer and such. In light of highly sensitive and highly selective detection, use of an ultraviolet-visible absorption detector is preferred. Thus, it is more preferred that separation and quantitative determination methods comprising the methods of the present invention are performed using LC-UV, in which liquid chromatography (LC) and an ultraviolet-visible absorption detector are combined, LC-PDA and the like.

Dibenzofulvene or its derivative in the first solution (sample solution) or the second solution (standard solution) can be quantitatively determined by measuring its peak area by the above-mentioned chromatography.

In a certain embodiment, the content rate of the first Fmoc compound relative to the second Fmoc compound can be corrected based on an internal standard. More specifically, the first and second Fmoc compounds can be quantitatively determined more accurately by providing the first solution (sample solution) and the second solution (standard solution) comprising an internal standard substance as an internal standard for correcting the amounts of these solutions injected into a chromatograph. The correction based on an internal standard is performed by, for example, adding an internal standard substance to the first solution (sample solution) and/or the second solution (standard solution) when preparing these solutions and leaving them to stand, and by taking the content of the internal standard substance into consideration to the quantitative determination result (actual measured value) of dibenzofulvene or its derivative produced after removal of the protecting group. More specifically, the content rate can be corrected by, for example, comparing the content of the internal standard substance contained in the first solution (may be referred to as the first internal standard substance) with the content of the internal standard substance contained in the second solution (may be referred to as the second internal standard substance). The timing of adding the internal standard substance is not limited to the time of preparing the first solution (sample solution) and/or the second solution (standard solution), and may be after removal of the protecting group.

Any substance can be used as an internal standard substance as long as it can be separated from dibenzofulvene (DBF) or its derivative by chromatography. For example, a commercially available substance can be used as such an internal standard substance, and specific examples include anthracene, phenanthrene, naphthalene, benzene, toluene, triphenylene, and naphthacene. Among them, anthracene is preferred.

The content of an internal standard substance in the first solution (sample solution) or the second solution (standard solution) can be quantitatively determined by measuring its peak area by chromatography. The peak area of an internal standard substance is preferably measured under the same measurement conditions as those for the peak area of dibenzofulvene (DBF) or its derivative.

In a certain embodiment, the content rate (% weight) of the first Fmoc compound relative to the second Fmoc compound can be calculated using
1) the peak areas ($A_T$ and $A_S$) of dibenzofulvene or its derivative in the first solution (sample solution) and the second solution (standard solution); and
2) the concentration ($C_T$) of the crude product in the first solution (sample solution) assuming that the crude product consists of only the first Fmoc compound and the concentration ($C_S$) of the second Fmoc compound in the second solution (standard solution), from the calculation formula below:

$$\text{Content rate (\% weight)} = \frac{C_S \times A_T}{C_T \times A_S} \times 100,$$

wherein
$C_S$ is the molar concentration of the second Fmoc compound;
$C_T$ is the molar concentration of the crude product assuming that the crude product consists of only the first Fmoc compound;
$A_S$ is the peak area of the dibenzofulvene or its derivative in the second solution; and
$A_T$ is the peak area of the dibenzofulvene or its derivative in the first solution.

Specifically, $C_T$ can be calculated based on the weighing value of the crude product and the molecular weight of the first Fmoc compound.

Furthermore, when the first Fmoc compound is an Fmoc peptide synthesized by a solid-phase method, $C_T$ can be determined considering that the Fmoc peptide compound supported by a resin for solid-phase synthesis is the first Fmoc compound. Specifically, $C_T$ can be calculated based on, for example, the weighing value of the Fmoc peptide compound supported by a resin for solid-phase synthesis and the molecular weight of the Fmoc peptide.

Moreover, in a certain embodiment, when the correction with an internal standard substance is performed, the content rate (% weight) of the first Fmoc compound relative to the second Fmoc compound can be calculated by further using the peak areas ($IS_T$ and $IS_S$) of the internal standard substance in the first solution (sample solution) and in the second solution (standard solution), from the calculation formula below:

$$\text{Content rate (\% weight)} = \frac{C_S \times IS_S \times A_T}{C_T \times IS_T \times A_S} \times 100,$$

wherein
$C_S$ is the molar concentration of the second Fmoc compound;
$C_T$ is the molar concentration of the crude product assuming that the crude product consists of only the first Fmoc compound;
$IS_S$ is the peak area of the internal standard substance in the second solution;
$IS_T$ is the peak area of the internal standard substance in the first solution;
$A_S$ is the peak area of the dibenzofulvene or its derivative in the second solution; and
$A_T$ is the peak area of the dibenzofulvene or its derivative in the first solution.

In a certain embodiment, the above-mentioned content rate can be corrected with an Fmoc purity of the crude product. Here, the "Fmoc purity" is the ratio (%) of the content of the first Fmoc compound relative to the sum of the contents of all types of compounds protected with a protecting group having an Fmoc skeleton comprised in the crude product. Performing this correction eliminates errors caused by compounds (impurities) with a protecting group having an Fmoc skeleton other than the compound containing an amino group protected with the protecting group having the Fmoc skeleton in the crude product (analysis sample), and allows calculating the content rate more accurately.

Specifically, the Fmoc purity can be calculated based on (i) the peak area of the first Fmoc compound and (ii) each peak area of the compounds protected with a protecting group having an Fmoc skeleton other than the first Fmoc compound (may be referred to as other Fmoc compounds or Fmoc-related impurities) in the crude product. When there are multiple Fmoc-related impurities in the crude product, it is preferred that the peak areas of all detectable Fmoc-related impurities are used to calculate the Fmoc purity.

More specifically, the Fmoc purity can be determined by, for example:
(i) identifying the peaks corresponding to the first Fmoc compound and Fmoc-related impurities by chromatography;
(ii) determining the peak areas of the first Fmoc compound and Fmoc-related impurities and combining these values; and
(iii) dividing the peak area of the first Fmoc compound by the combined value determined in (ii).

Whether a peak is a peak of Fmoc-related impurities can be identified by judging the presence or absence of a protecting group having an Fmoc skeleton from the UV chromatogram (254 nm) in chromatographic analysis.

When the first Fmoc compound (for example, an Fmoc peptide) is produced by a solid-phase method, the Fmoc purity may be determined through determination of the peak areas of the first Fmoc compound and Fmoc-related impurities by utilizing the solution (cutoff solution) used to cut off the first Fmoc compound from the resin for solid-phase synthesis.

Accurate content rates with few errors can be calculated by determining the Fmoc purity through measuring the peak areas of the first Fmoc compound and Fmoc-related impurities under the same measurement conditions as those for quantitative determination of dibenzofulvene or its derivative and an internal standard substance. In a certain embodiment, accurate content rates with fewer errors can be calculated by setting the measuring instrument and measurement conditions used to determine the purity the same as those used to quantitatively determine dibenzofulvene or its derivative.

When the correction with the Fmoc purity is performed, the content rate can be determined by, for example, the calculation formulae described below.
(When the Correction With the Internal Standard Substance is not Performed)

$$\text{Content rate (\% weight)} = \frac{C_S \times A_T}{C_T \times A_S} \times \frac{P_S}{100} \times 100,$$

wherein
$C_S$ is the molar concentration of the second Fmoc compound;
$C_T$ is the molar concentration of the crude product assuming that the crude product consists of only the first Fmoc compound;
$A_S$ is the peak area of the dibenzofulvene or its derivative in the second solution;
$A_T$ is the peak area of the dibenzofulvene or its derivative in the first solution; and
$P_S$ is an Fmoc purity.
(When the Correction With the Internal Standard Substance is Performed)

$$\text{Content rate (\% weight)} = \frac{C_S \times IS_S \times A_T}{C_T \times IS_T \times A_S} \times \frac{P_S}{100} \times 100,$$

wherein
$C_S$ is the molar concentration of the second Fmoc compound;
$C_T$ is the molar concentration of the crude product assuming that the crude product consists of only the first Fmoc compound;
$IS_S$ is the peak area of the internal standard substance in the second solution;
$IS_T$ is the peak area of the internal standard substance in the first solution;
$A_S$ is the peak area of the dibenzofulvene or its derivative in the second solution;
$A_T$ is the peak area of the dibenzofulvene or its derivative in the first solution; and
$P_S$ is an Fmoc purity.

In a certain embodiment, acids can be used for preventing degradation of dibenzofulvene or its derivative. Inhibition of degradation (stabilization) of dibenzofulvene or its derivative can be accomplished by allowing the produced dibenzofulvene or its derivative to contact with acids. The acids preferably include organic acids and inorganic acids, and organic acids, inorganic acids, and combinations thereof are used.

When acids are added, they can be added to the analysis sample (for example, the first and/or second solutions) after removal of the protecting group having the Fmoc skeleton. It is preferred that acids are added immediately after the removal to prevent degradation of dibenzofulvene. Any amount of acids can be used as long as the standard solution or the sample solution is biased toward acidic relative to neutral, and it can be accomplished by, for example, adding acids of an equivalent that is the same or more than that of the bases added to remove the protecting group. The acids may be added to the analysis sample as it is or may be added to the analysis sample after they are dissolved in organic solvents and such.

As organic acids, citric acid, oxalic acid, maleic acid, tetramethylammonium hydrogensulfate, formic acid, acetic acid, trifluoroacetic acid, propionic acid, monofluoroacetic acid, difluoroacetic acid, trichloroacetic acid, monochloroacetic acid, dichloroacetic acid, or a combination thereof is used, and citric acid is preferably used.

As inorganic acids, phosphoric acid, boric acid, hydrochloric acid, nitric acid, sulfuric acid, hydrobromic acid, phosphonic acid, or a combination thereof is used, and phosphoric acid is preferably used.

In a certain embodiment, the present invention relates to methods of quantitatively determining a compound containing an amino group protected with a protecting group having an Fmoc skeleton by quantitatively determining a compound containing an amino group after deprotection.

In a certain embodiment, the present invention relates to methods of removing a protecting group having an Fmoc skeleton from a compound containing an amino group protected with the protecting group having the Fmoc skeleton to quantitatively determine the compound containing an amino group thereby produced.

In a certain embodiment, the above-mentioned methods allow quantitatively determining the content of the compound containing an amino group by separating the compound from other components by chromatography and measuring its peak area.

In a certain embodiment, any method that can separate a compound containing an amino group protected with a protecting group having an Fmoc skeleton, dibenzofulvene (DBF) or its derivative, and a compound containing an amino group can be used to separate the compound containing the amino group by chromatography. Examples of such chromatography include chromatography such as liquid chromatography, supercritical fluid chromatography, gas chromatography, thin-layer chromatography, hydrophilic interaction chromatography (HILIC), ion exchange chromatography (IEX), and size exclusion chromatography (SEC), electrophoresis, and ion mobility spectrometry (for example, ion mobility); and hydrophilic interaction chromatography (HILIC) is preferred. These methods may be known.

Any method can be used as a means for identifying and quantitatively determining a compound containing an amino group. Examples of such a method include those using an ultraviolet/visible absorption detector, diode array detector, fluorescence detector, differential refractive index detector, evaporative light scattering detector, charged aerosol detector (CAD), mass spectrometer and such. It is preferable to use a charged aerosol detector (CAD) and/or mass spectrometer which can detect even when a compound does not absorb ultraviolet/visible wavelengths. Thus, it is more preferred that separation and quantitative determination methods including the methods of the present invention are performed using HILIC-CAD and such, in which hydrophilic interaction chromatography (HILIC) and a charged aerosol detector (CAD) are combined.

The content of a compound containing an amino group in the first solution (sample solution) or the second solution (standard solution) can be quantitatively determined by measuring the peak area of the compound containing an amino group obtained by the above-mentioned chromatography.

All prior art references cited herein are incorporated by reference into this description.

EXAMPLES

The present invention will be further illustrated in detail with reference to the following Examples but is not limited thereto.

The quantitative determination described in the Examples used the following Fmoc-amino acids:

Fmoc-Gly-OH, Fmoc-Ile-OH, Fmoc-Pro-OH, Fmoc-Val-OH, Fmoc-Phe-OH, Fmoc-cLeu-OH, Fmoc-NMe-Gly-OH, Fmoc-NMe-Ala-OH, Fmoc-NMe-Leu-OH, Fmoc-NMe-Val-OH, Fmoc-NMe-Cha-OH, and Fmoc-Aze-OH. These were purchased from raw material manufacturers such as Watanabe Chemical Industries, Ltd. Unless otherwise specifically stated, the same Fmoc-amino acid includes those which are different in raw material manufacturer and lot.

Example 1 (Quantitative Determination of Fmoc-Amino Acids by DBF-1)

Preparation of a Standard Solution

Fmoc-Gly-OH (about 10 mg) was precisely weighed according to the Pharmacopoeia of Japan and dissolved in acetonitrile (20 mL) to prepare an Fmoc-Gly-OH solution (acetonitrile solution containing Fmoc-Gly-OH at a concentration of 500 µg/mL). An internal standard solution (acetonitrile solution containing anthracene at a concentration of 250 µg/mL), a DBU solution (acetonitrile solution containing DBU at a concentration of 10 v/v %), and acetonitrile were added to the Fmoc-Gly-OH solution to prepare an acetonitrile solution containing Fmoc-Gly-OH, anthracene, and DBU at concentrations of 100 µg/mL, 50 µg/mL, and 4 v/v %, respectively. Next, the solution was agitated with vortex and then left to stand at room temperature for 10 minutes or longer to deprotect the Fmoc group. It was confirmed by the UV chromatogram obtained by HPLC that the deprotection reaction proceeded quantitatively. In this Example, the above solution before the start of the deprotection reaction may be referred to as the "unreacted standard solution" and the solution after the deprotection reaction may be referred to merely as the "standard solution". Fmoc-Gly-OH (purity: 99.8%, moisture content: less than 0.10%) used to prepare the standard solution was purchased from Watanabe Chemical Industries, Ltd.

Preparation of Sample Solutions

Crude Fmoc-amino acids (about 10 mg) containing an Fmoc-amino acid to be quantitatively determined were precisely weighed according to the Pharmacopoeia of Japan and dissolved in acetonitrile (20 mL) to prepare crude Fmoc-amino acid solutions (acetonitrile solutions containing a crude Fmoc-amino acid at a concentration of 500 µg/mL). An internal standard solution (acetonitrile solution containing anthracene at a concentration of 250 µg/mL), a DBU solution (acetonitrile solution containing DBU at a concentration of 10 v/v %), and acetonitrile were added to the crude Fmoc-amino acid solutions to prepare acetonitrile solutions containing the crude Fmoc-amino acid, anthracene, and DBU at concentrations of 100 µg/mL, 50 µg/mL, and 4 v/v %, respectively. Next, the solutions were agitated with vortex and then left to stand at room temperature for 10 minutes or longer to deprotect the Fmoc group. It was confirmed by the UV chromatograms obtained by HPLC that the deprotection reaction proceeded quantitatively. In this Example, the above solution before the start of the deprotection reaction may be referred to as the "unreacted sample solution" and the solution after the deprotection reaction may be referred to merely as the "sample solution".

Analytical device and condition are as follows.

(Analytical Device)

HPLC System: H-class (Waters)
Ultraviolet/visible absorbance detector: ACQ-TUV
Pump: ACQ-QSM
Autosampler: ACQ-FTN (Analytical Condition)

Column: OSAKA SODA, CAPCELL CORE ADME (2.1×150 mm, 2.7 µm)
Mobile Phase A: 0.05% TFA/water
Mobile Phase B: 0.05% TFA/acetonitrile
Flow Rate: 0.3 mL/min
Column Temperature: 40° C.
Sample Injection Volume: 2 µL
Measurement Wavelength: 254 nm
Gradient Condition: shown in Table 1

TABLE 1

| Time (min) | B (%) |
|---|---|
| 0 | 30 |
| 20 | 70 |
| 22 | 100 |
| 24 | 100 |
| 24.1 | 30 |
| 28 | 30 |

The chromatogram of the standard solution is shown in FIG. 1 and those of the sample solutions are each shown in FIGS. 2 to 7.

Furthermore, the content rate (w/w %) of each Fmoc-amino acid relative to Fmoc-Gly-OH can be calculated using the formulae indicated below. The results are shown in Table 2 (when the injected amount was not corrected with anthracene) and Table 3 (when the injected amount was corrected with anthracene).

Calculation Formula (When the Injected Amount was not Corrected With Anthracene)

$$\text{Content rate of each } Fmoc \text{ amino acid } (w/w\ \%) = \frac{C_S \times A_T}{C_T \times A_S} \times 100$$

$C_S$: the concentration of Fmoc-Gly-OH in the unreacted standard solution (µmol/L)
$C_T$: the concentration of each crude Fmoc-amino acid in each unreacted sample solution (µmol/L)
$A_S$: the peak area of DBF in the standard solution
$A_T$: the peak area of DBF in each sample solution Calculation Formula (When the Injected Amount was Corrected With Anthracene)

$$\text{Content rate of each } Fmoc \text{ amino acid } (w/w\ \%) = \frac{C_S \times IS_S \times A_T}{C_T \times IS_T \times A_S} \times 100$$

$C_S$: the concentration of Fmoc-Gly-OH in the unreacted standard solution (µmol/L)
$C_T$: the concentration of each crude Fmoc-amino acid in each unreacted sample solution (µmol/L)

$IS_S$: the peak area of anthracene in the standard solution
$IS_T$: the peak area of anthracene in each sample solution
$A_S$: the peak area of DBF in the standard solution
$A_T$: the peak area of DBF in each sample solution

TABLE 2

(No correction of injection amount with Anthracene)

| | Content rate | Weighed value (mg) | Molecular weight | DBF area |
|---|---|---|---|---|
| Fmoc-Gly-OH(Standard solution) | 100% | 10.009 | 297.31 | 4644191 |
| Fmoc-NMe-Val-OH | 92.2% | 9.992 | 353.42 | 3594587 |
| Fmoc-Pro-OH | 94.7% | 10.046 | 337.38 | 3891867 |
| Fmoc-NMe-Ala-OH | 98.7% | 9.999 | 325.36 | 4184860 |
| Fmoc-Ile-OH | 99.5% | 10.062 | 353.42 | 3906522 |
| Fmoc-NMe-Leu-OH | 99.6% | 10.059 | 367.45 | 3759909 |
| Fmoc-NMe-Gly-OH | 94.2% | 10.054 | 311.34 | 4196189 |

TABLE 3

(With correction of injection amount with Anthracene)

| | Content rate | Weighed value (mg) | Molecular weight | DBF area | IS area |
|---|---|---|---|---|---|
| Fmoc-Gly-OH(Standard solution) | 100% | 10.009 | 297.31 | 4644191 | 8825410 |
| Fmoc-NMe-Val-OH | 92.6% | 9.992 | 353.42 | 3594587 | 8784180 |
| Fmoc-Pro-OH | 95.5% | 10.046 | 337.38 | 3891867 | 8758765 |
| Fmoc-NMe-Ala-OH | 99.1% | 9.999 | 325.36 | 4184860 | 8789649 |
| Fmoc-Ile-OH | 100.0% | 10.062 | 353.42 | 3906522 | 8774984 |
| Fmoc-NMe-Leu-OH | 100.1% | 10.059 | 367.45 | 3759909 | 8778041 |
| Fmoc-NMe-Gly-OH | 94.1% | 10.054 | 311.34 | 4196189 | 8835462 |

From the result above, it was found that the content rates of some Fmoc-amino acids such as Fmoc-Ile-OH and Fmoc-NMe-Leu-OH were almost 100% while those of some Fmoc-amino acids did not reach 100%. Fmoc-amino acids whose content rates did not reach 100% were considered to comprise impurities that cannot be detected by UV, such as moisture, inorganic salts, and residual solvents. Furthermore, even when the injected amounts differ between the standard solution and each sample solution, quantitative calculation can be made by correcting the injection amounts with the peak area of the internal standard substance.

Example 2 (Quantitative Determination of Fmoc-Amino Acids by DBF-2)

Preparation of a Standard Solution

Fmoc-Gly-OH (about 10 mg) was precisely weighed according to the Pharmacopoeia of Japan and dissolved in acetonitrile (10 mL) to prepare an Fmoc-Gly-OH solution (acetonitrile solution containing Fmoc-Gly-OH at a concentration of 1 mg/mL). An internal standard solution (acetonitrile solution containing anthracene at a concentration of 500 µg/mL), a DBU solution (acetonitrile solution containing DBU at a concentration of 10 v/v %), and acetonitrile were added to the Fmoc-Gly-OH solution to prepare an acetonitrile solution containing Fmoc-Gly-OH, anthracene, and DBU at concentrations of 100 µg/mL, 50 µg/mL, and 4 v/v %, respectively. Next, the solution was agitated with vortex and then left to stand at room temperature for 10 minutes or longer to deprotect the Fmoc group. It was confirmed by the UV chromatogram obtained by HPLC that the deprotection reaction proceeded quantitatively. In this Example, the above solution before the start of the deprotection reaction may be referred to as the "unreacted standard solution" and the solution after the deprotection reaction may be referred to merely as the "standard solution". Fmoc-Gly-OH (purity: 99.8%, moisture content: less than 0.10%) used to prepare the standard solution was purchased from Watanabe Chemical Industries, Ltd.

Preparation of Sample Solutions

Crude Fmoc-amino acids (about 10 mg) containing an Fmoc-amino acid to be quantitatively determined were precisely weighed according to the Pharmacopoeia of Japan and dissolved in acetonitrile (10 mL) to prepare crude Fmoc-amino acid solutions (acetonitrile solutions containing the crude Fmoc-amino acid at a concentration of 1 mg/mL). An internal standard solution (acetonitrile solution containing anthracene at a concentration of 500 µg/mL), a DBU solution (acetonitrile solution containing DBU at a concentration of 10 v/v %), and acetonitrile were added to the crude Fmoc-amino acid solution to prepare acetonitrile solutions containing the crude Fmoc-amino acid, anthracene, and DBU at concentrations of 100 µg/mL, 50 µg/mL, and 4 v/v %, respectively. Next, the solutions were agitated with vortex and then left to stand at room temperature for 10 minutes or longer to deprotect the Fmoc group. It was confirmed by the UV chromatograms obtained by HPLC that the deprotection reaction proceeded quantitatively. In this Example, the above solution before the start of the deprotection reaction may be referred to as the "unreacted sample solution" and the solution after the deprotection reaction may be referred to merely as the "sample solution".

Analytical device and condition are as follows.

(Analytical Device)

HPLC System: H-class (Waters)

Ultraviolet/visible absorbance detector: ACQ-TUV

Pump: ACQ-QSM

Autosampler: ACQ-FTN (Analytical Condition)
Column: OSAKA SODA, CAPCELL CORE ADME (3.0×150 mm, 2.7 μm)
Mobile Phase A: 0.05% TFA/water
Mobile Phase B: 0.05% TFA/acetonitrile
Flow Rate: 0.6 mL/min
Column Temperature: 40° C.
Sample Injection Volume: 2 μL
Measurement Wavelength: 254 nm
Gradient Condition: shown in Table 4

TABLE 4

| Time (min) | B (%) |
|---|---|
| 0 | 30 |
| 20 | 70 |
| 22 | 100 |
| 24 | 100 |
| 24.1 | 30 |
| 28 | 30 |

Figure 8:
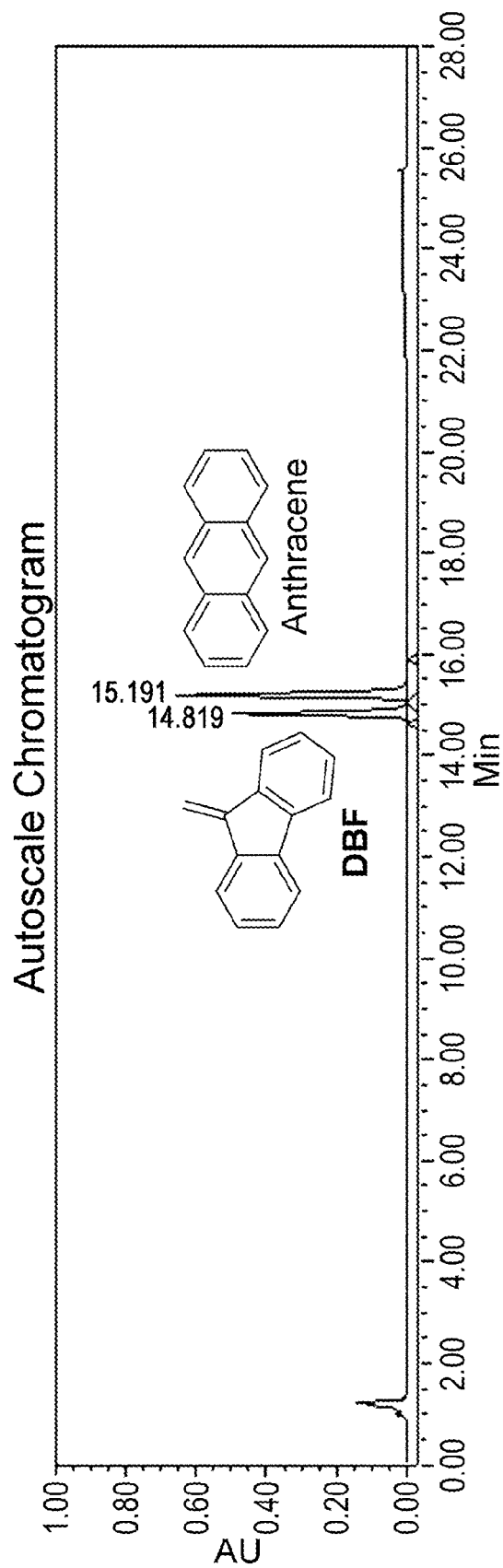
FIG. 8 shows the chromatogram of the standard solution (solution in which Fmoc-Gly-OH was treated by DBU) in Example 2.
Figure 9:
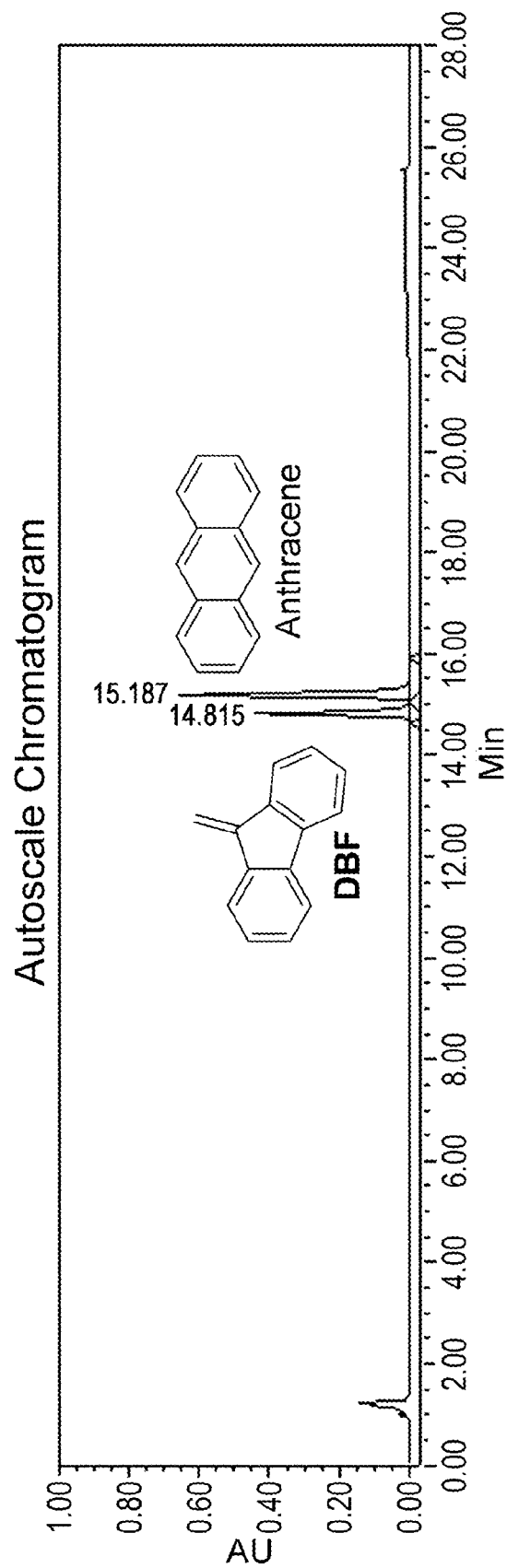
FIG. 9 shows the chromatogram of a sample solution after DBU treatment for a sample solution comprising crude Fmoc-Val-OH in Example 2.
Figure 10:
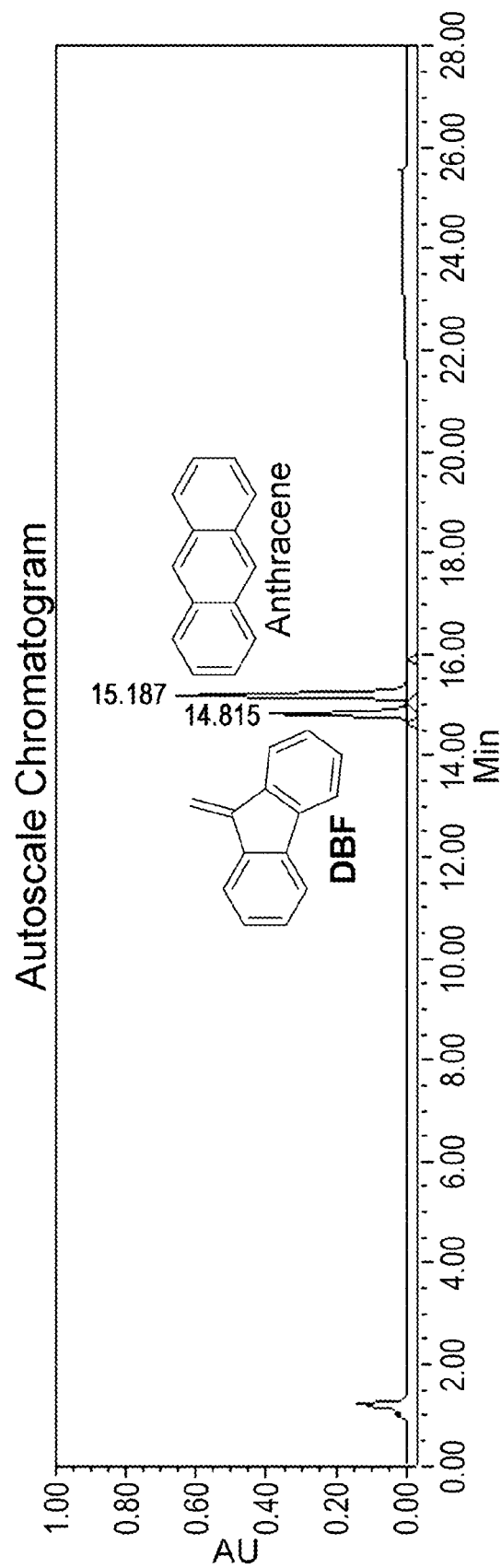
FIG. 10 shows the chromatogram of a sample solution after DBU treatment for a sample solution comprising crude Fmoc-Phe-OH in Example 2.
Figure 11:
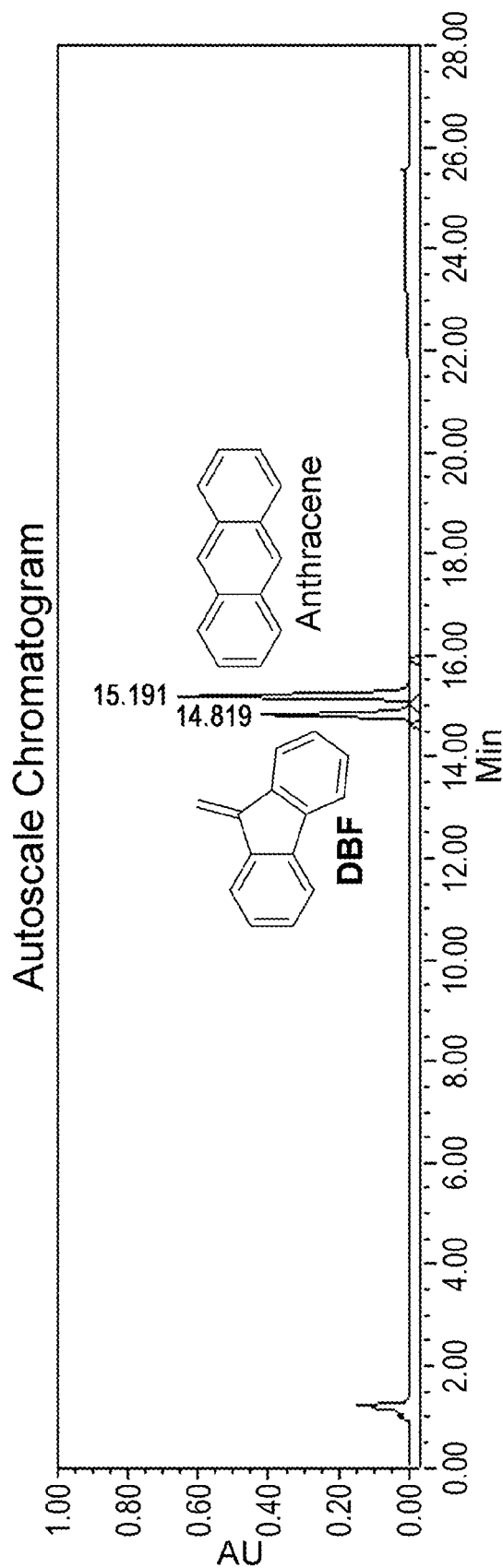
FIG. 11 shows the chromatogram of a sample solution after DBU treatment for a sample solution comprising crude Fmoc-NMe-Val-OH in Example 2.
Figures 1, 12:
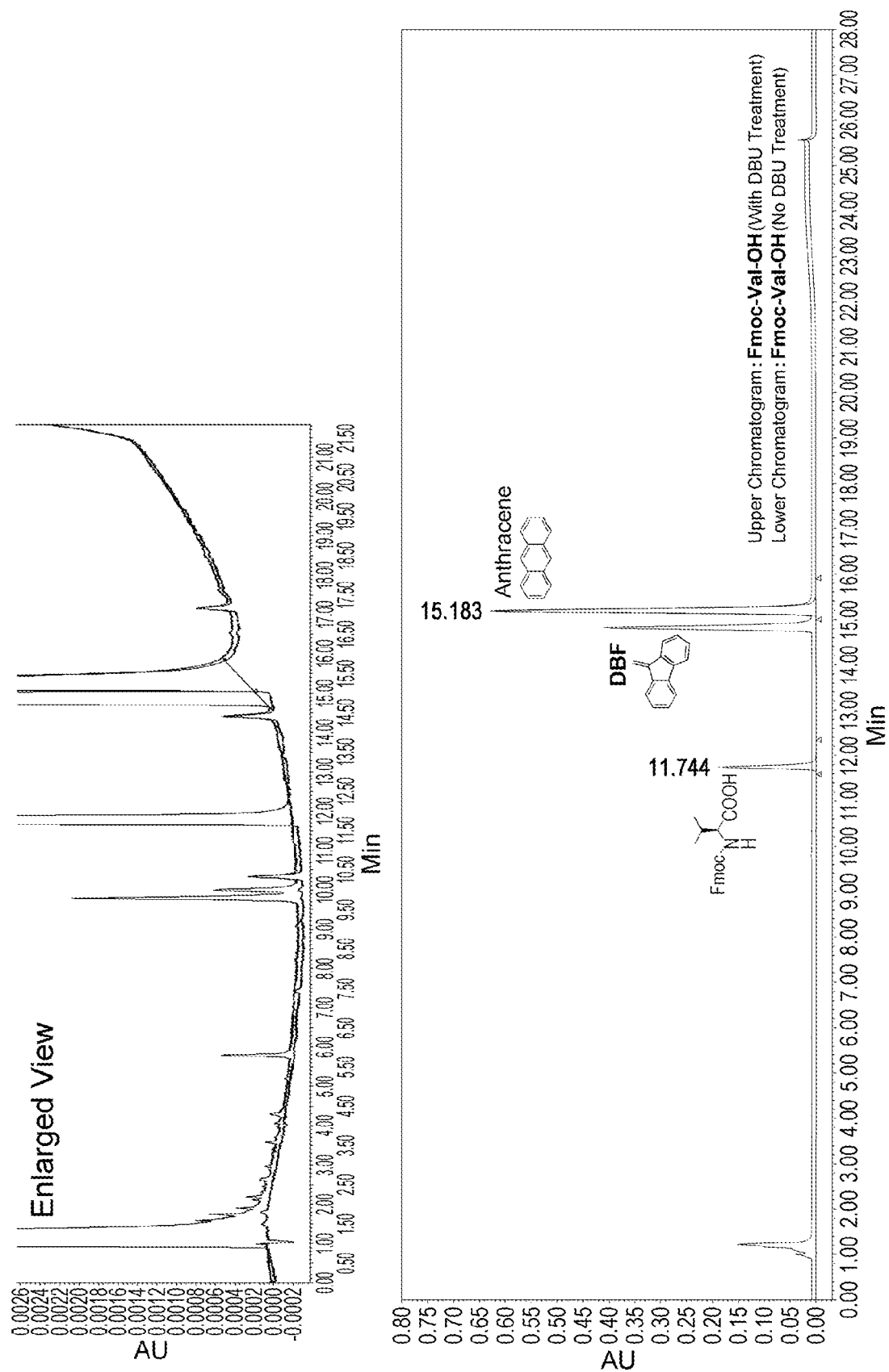
Figures 2, 12:
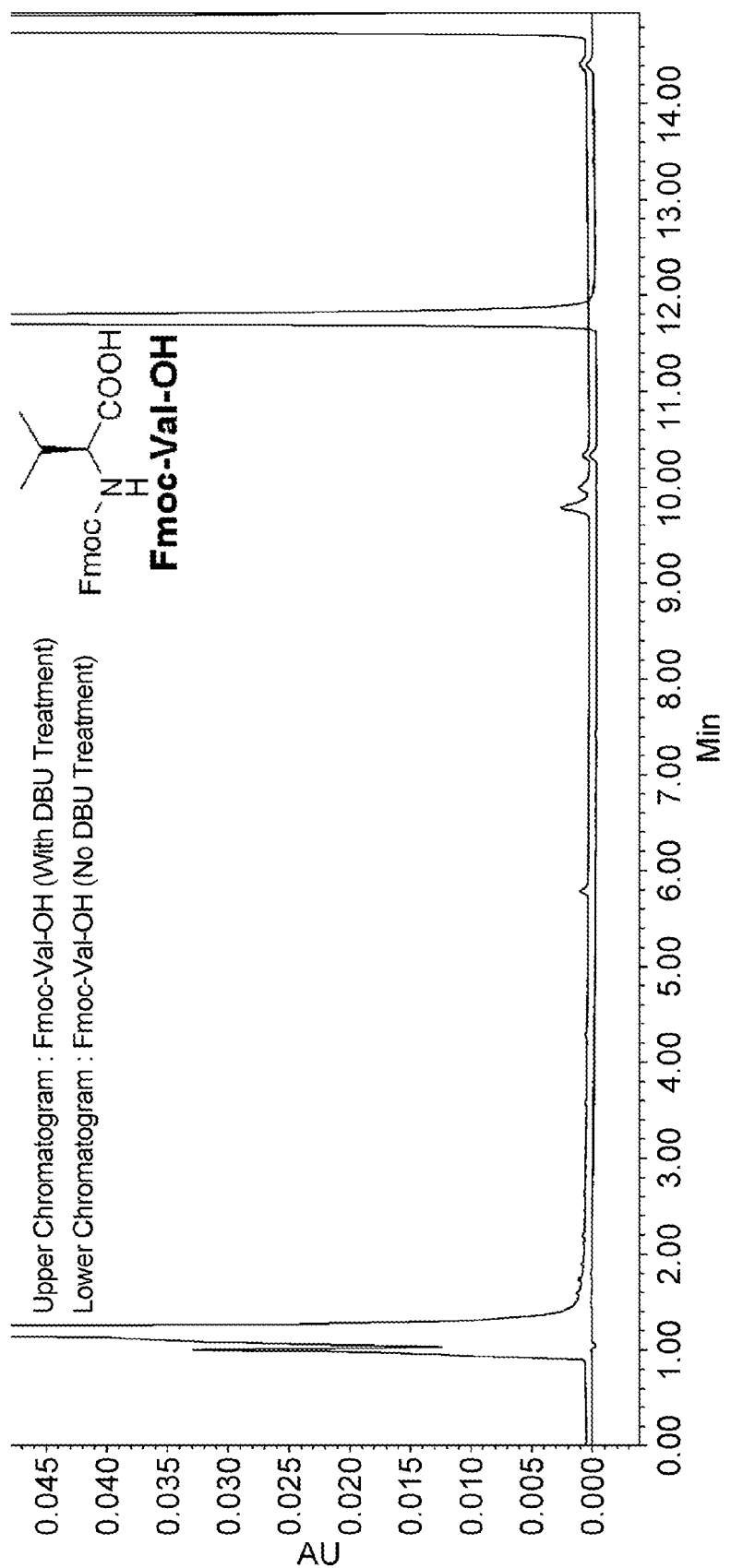
Figure 13:
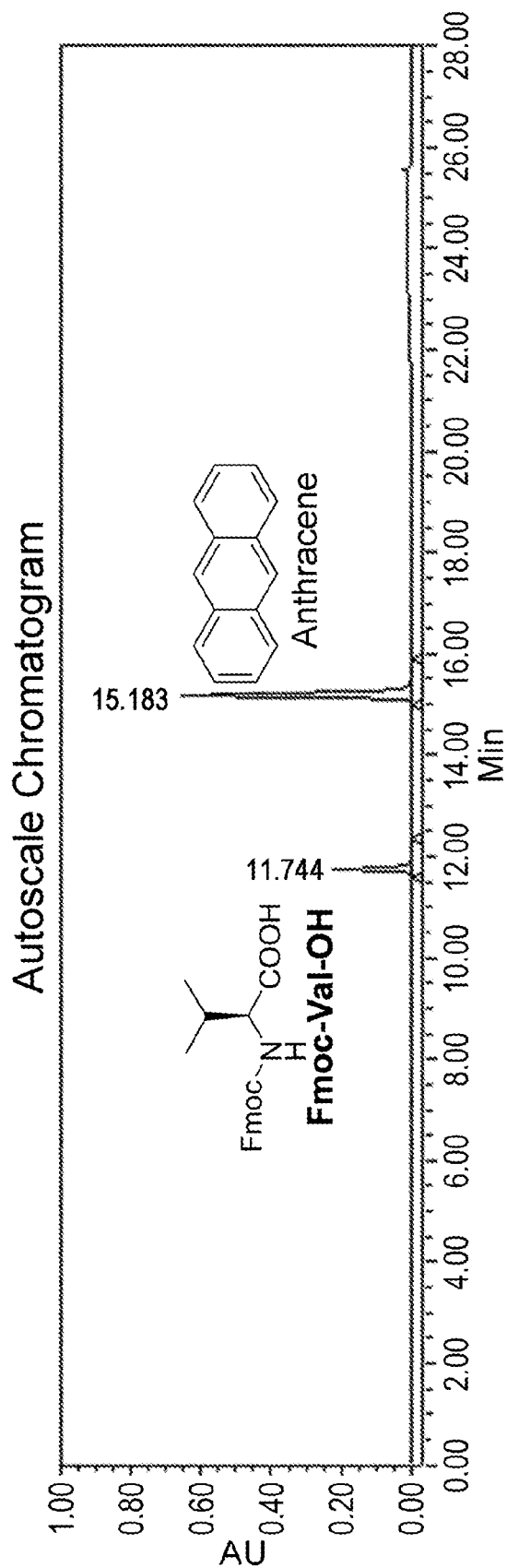
FIG. 13 shows the chromatogram of a sample solution before DBU treatment for a sample solution comprising crude Fmoc-Val-OH in Example 3.
Figure 14:
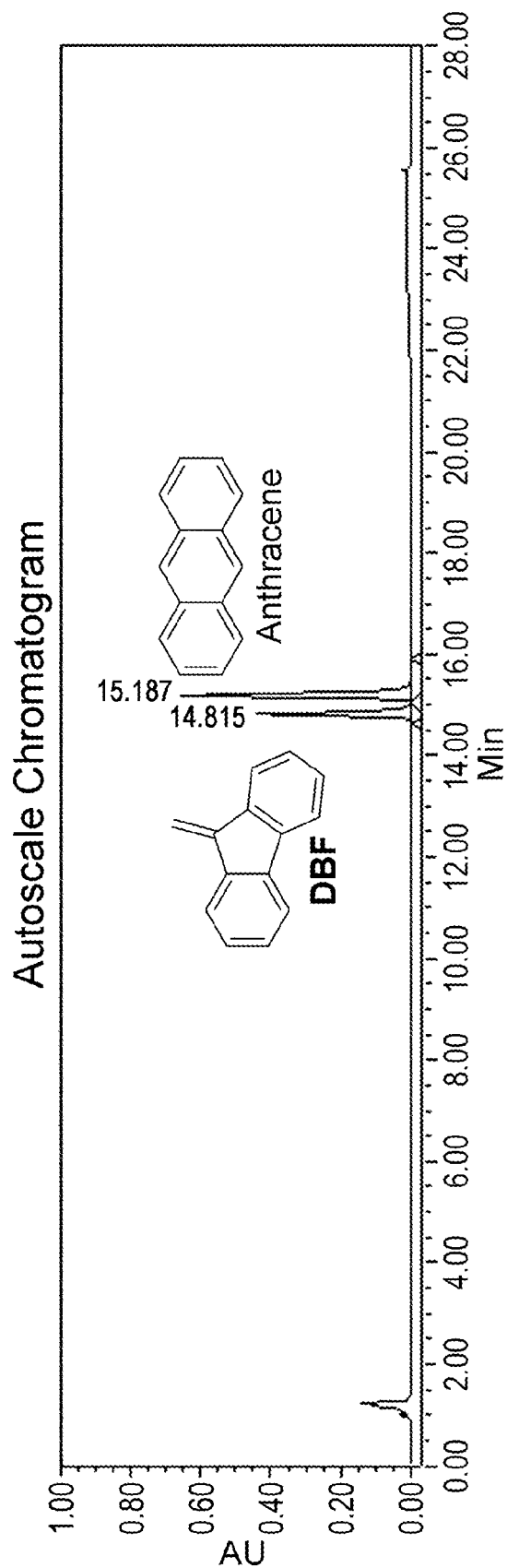
FIG. 14 shows the chromatogram of a sample solution after DBU treatment for a sample solution comprising crude Fmoc-Val-OH in Example 3.
Figures 1, 15:
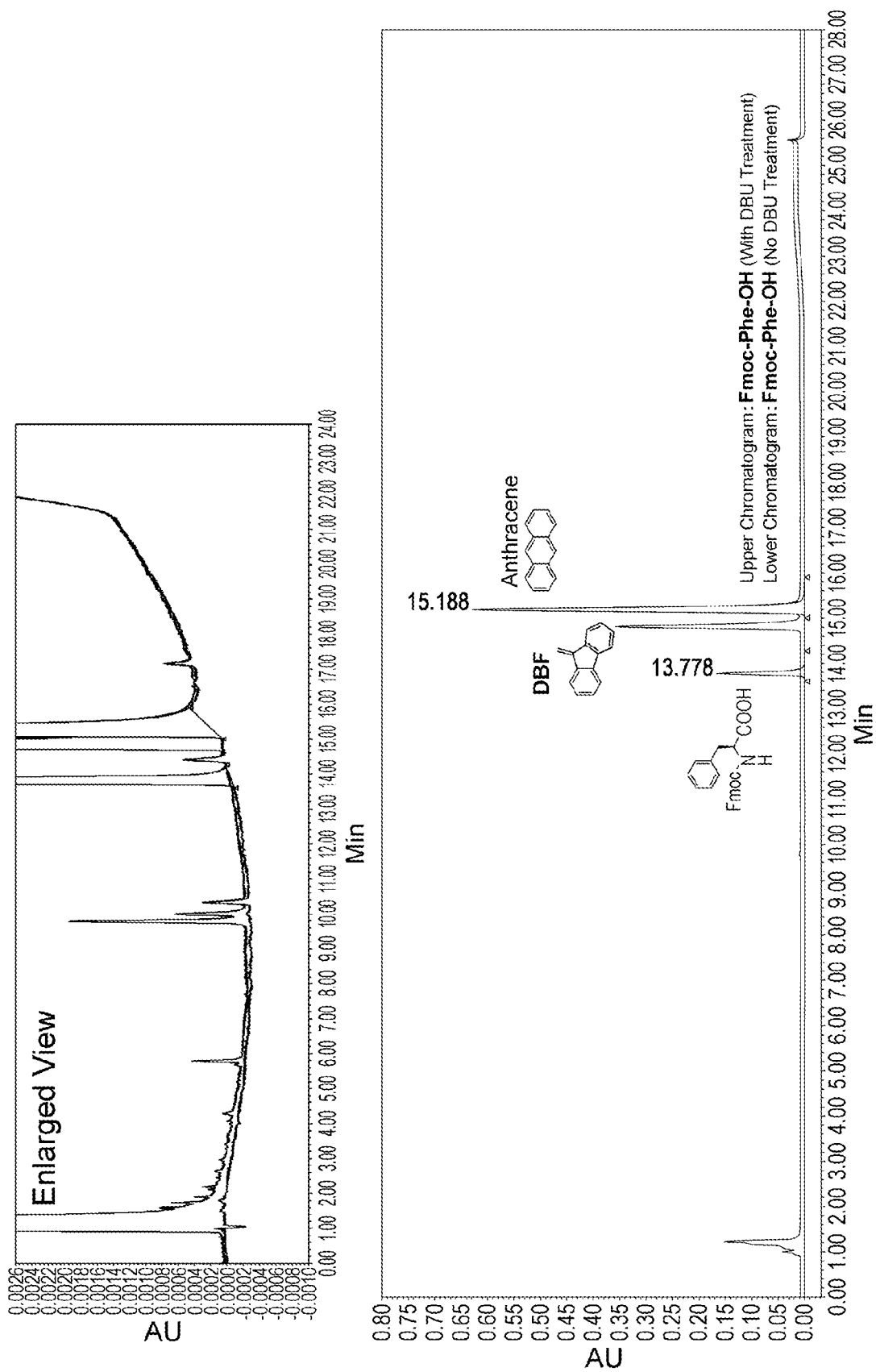
Figures 2, 15:
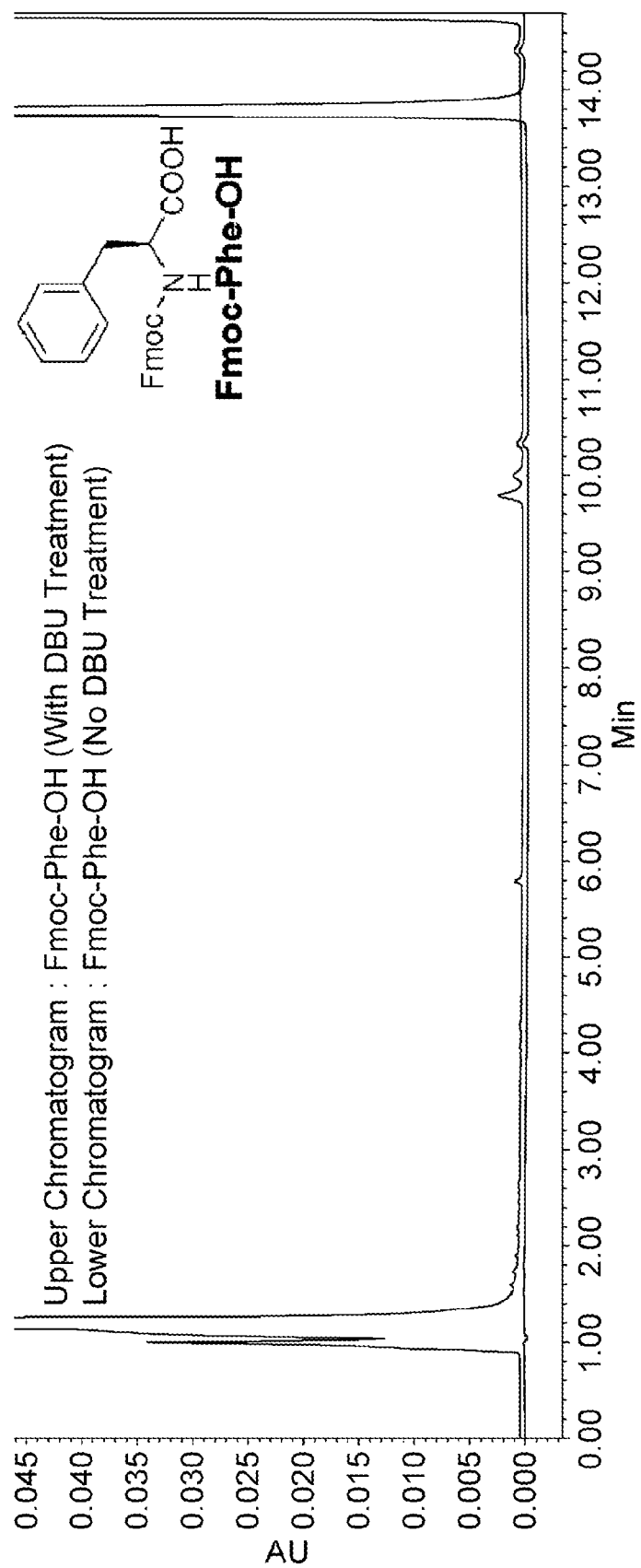
Figure 16:
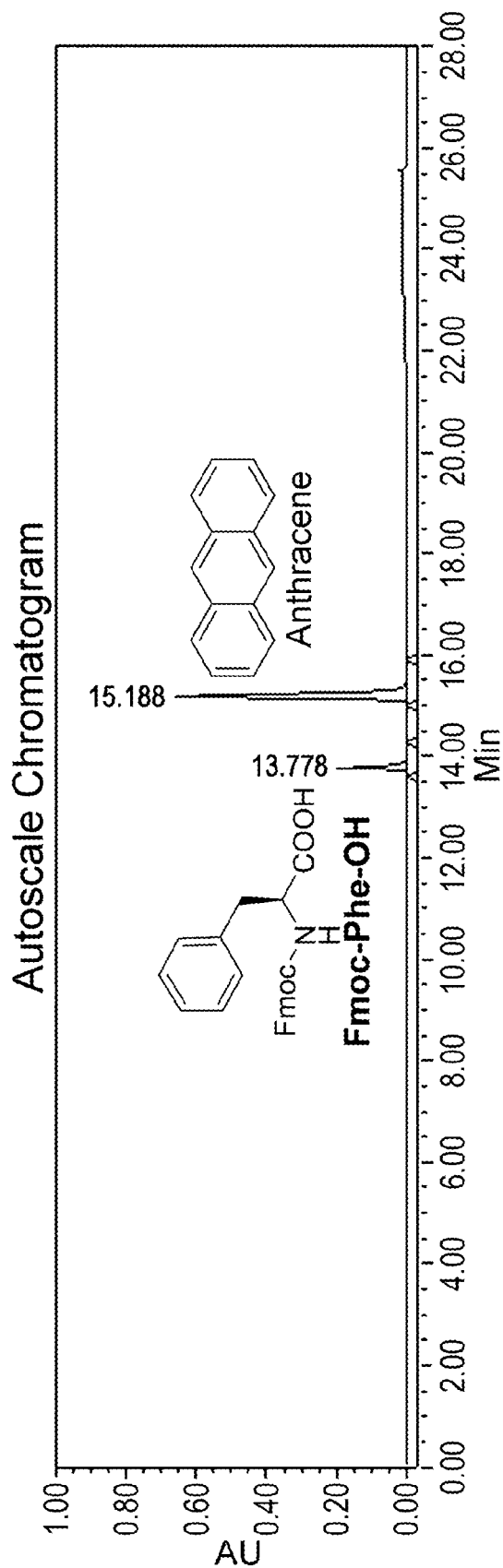
FIG. 16 shows the chromatogram of a sample solution before DBU treatment for a sample solution comprising crude Fmoc-Phe-OH in Example 3.
Figure 17:
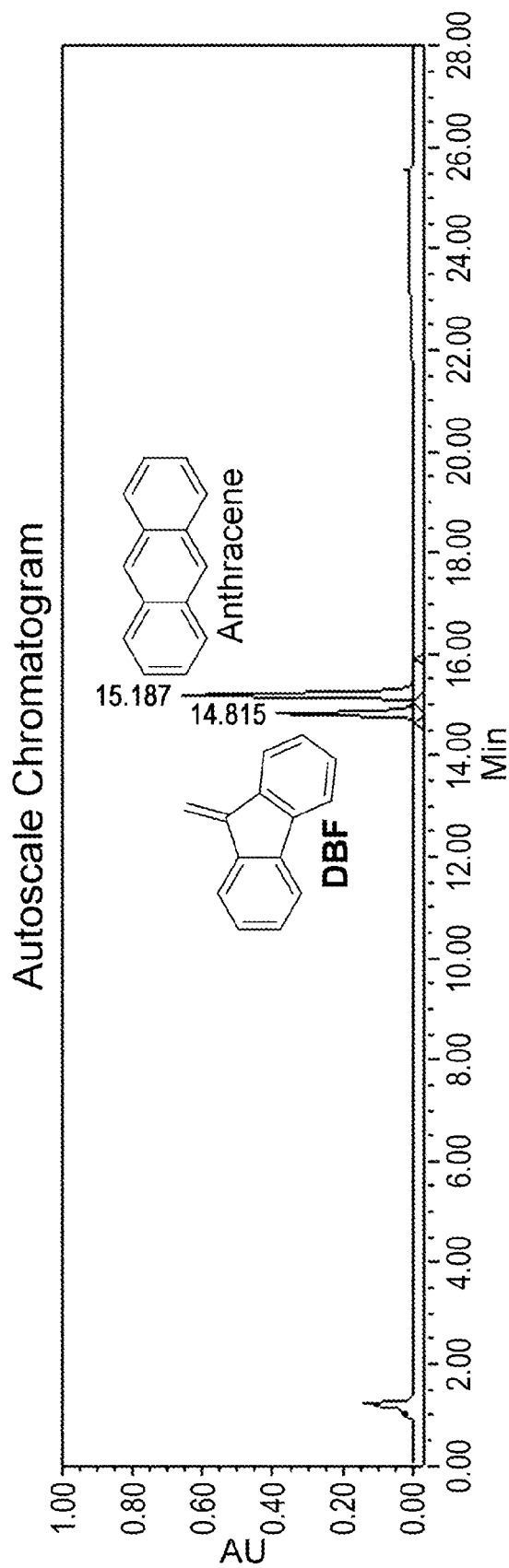
FIG. 17 shows the chromatogram of a sample solution after DBU treatment for a sample solution comprising crude Fmoc-Phe-OH in Example 3.
Figures 1, 18:
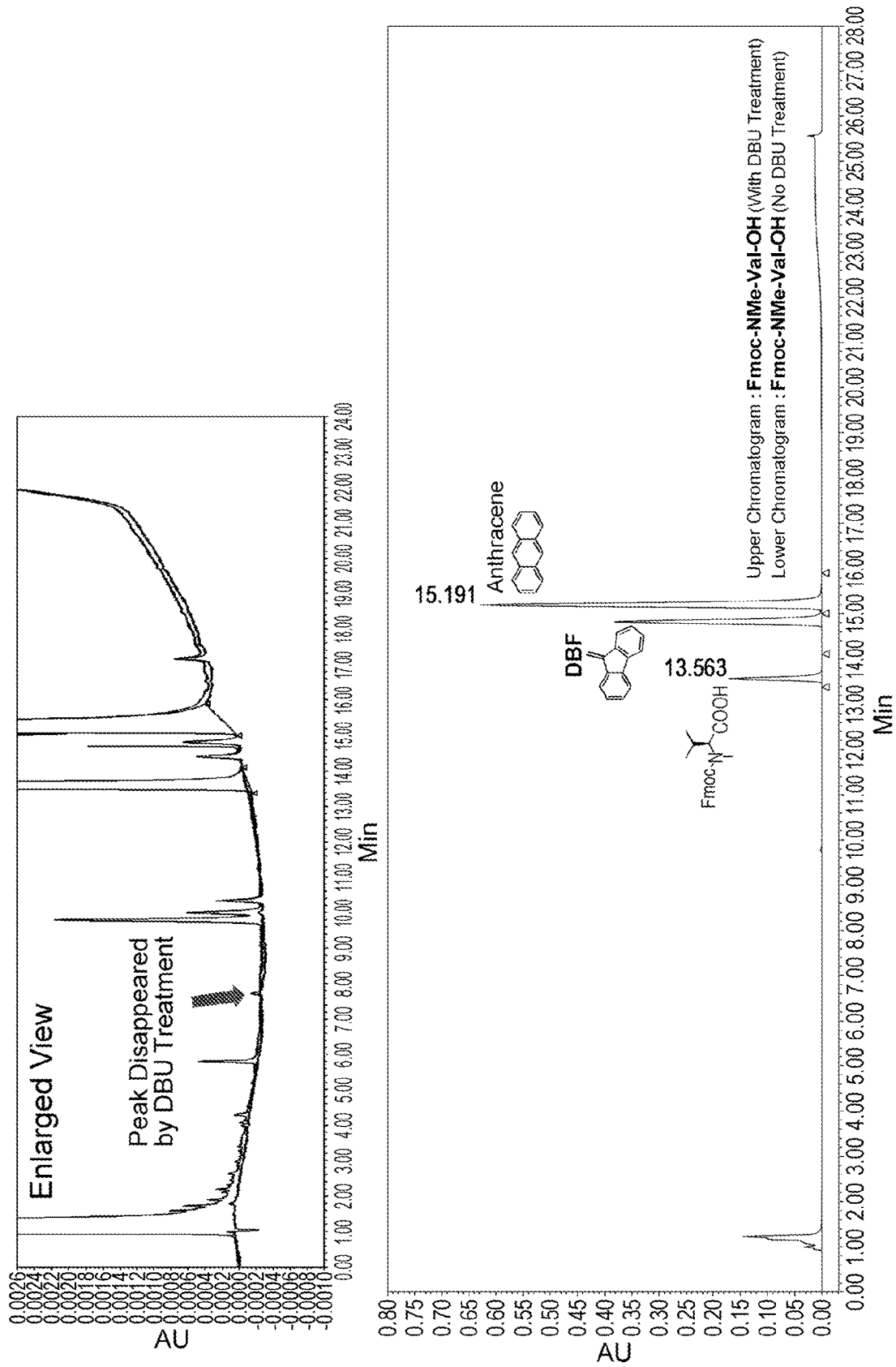
Figures 2, 18:
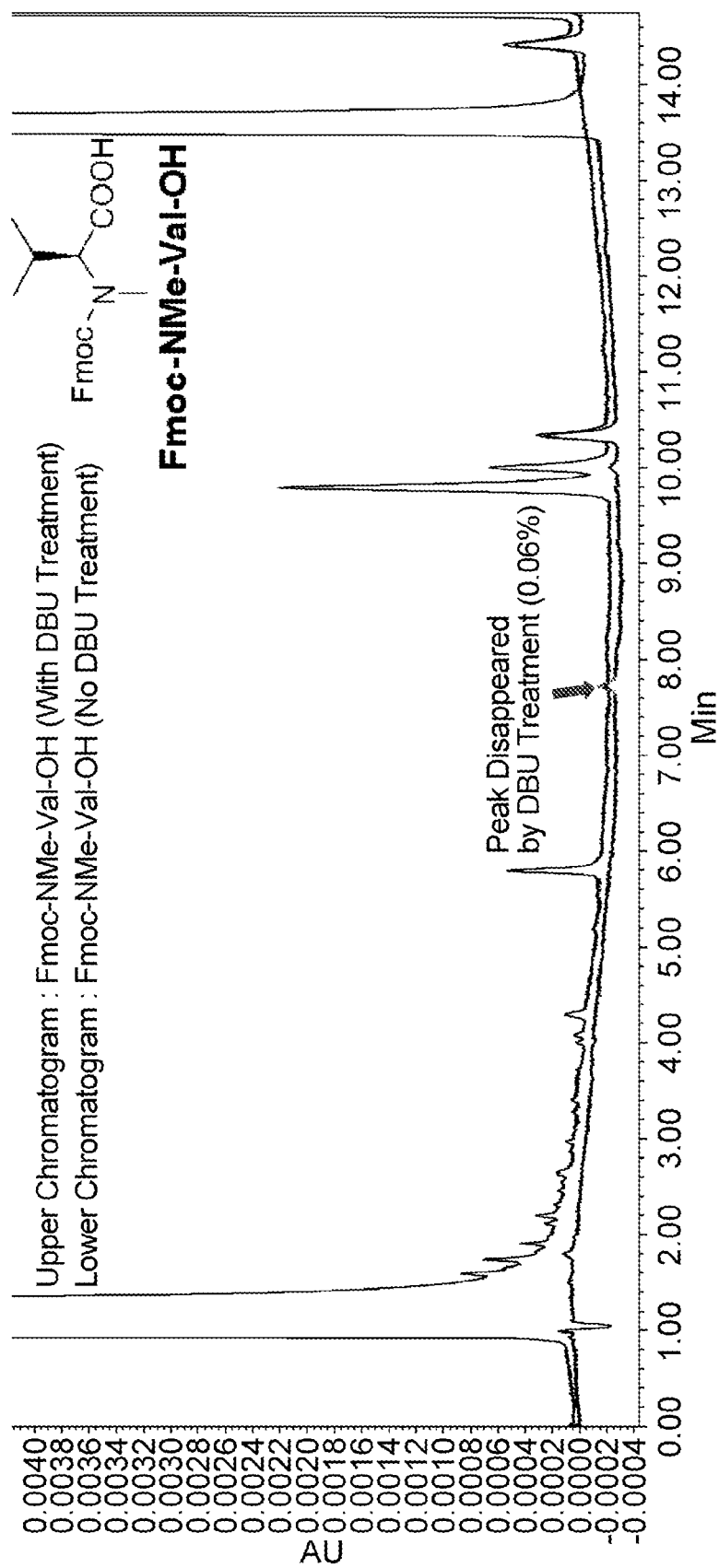
Figure 19:
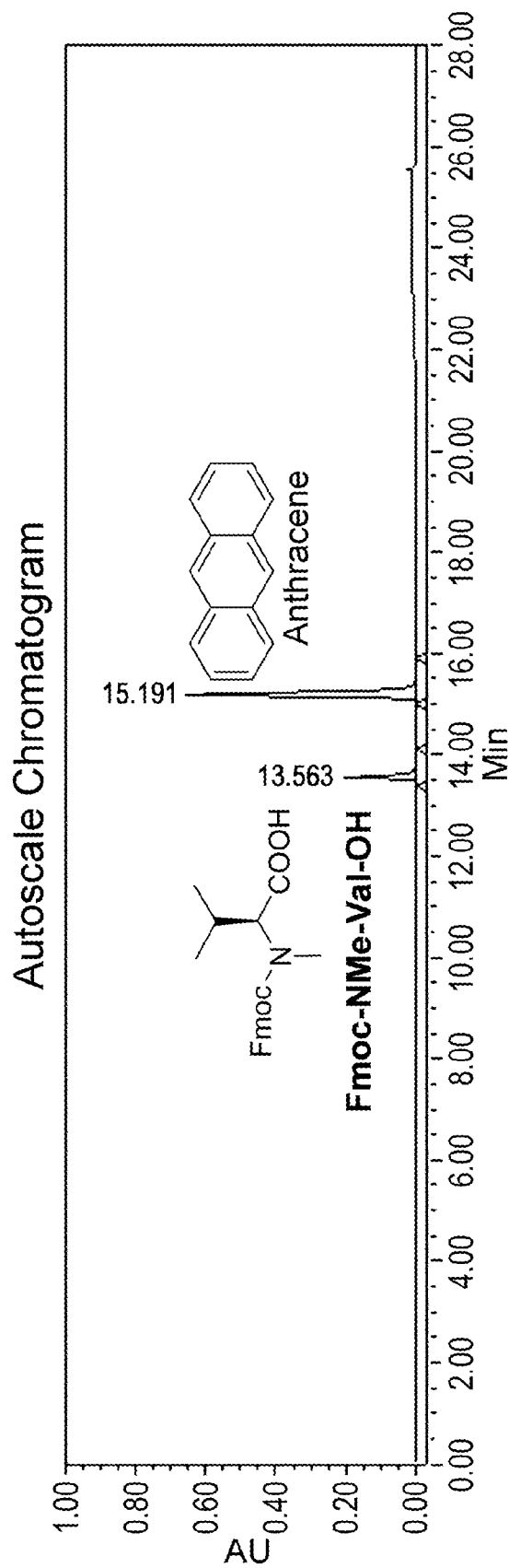
FIG. 19 shows the chromatogram of a sample solution before DBU treatment for a sample solution comprising crude Fmoc-NMe-Val-OH in Example 3.
Figure 20:
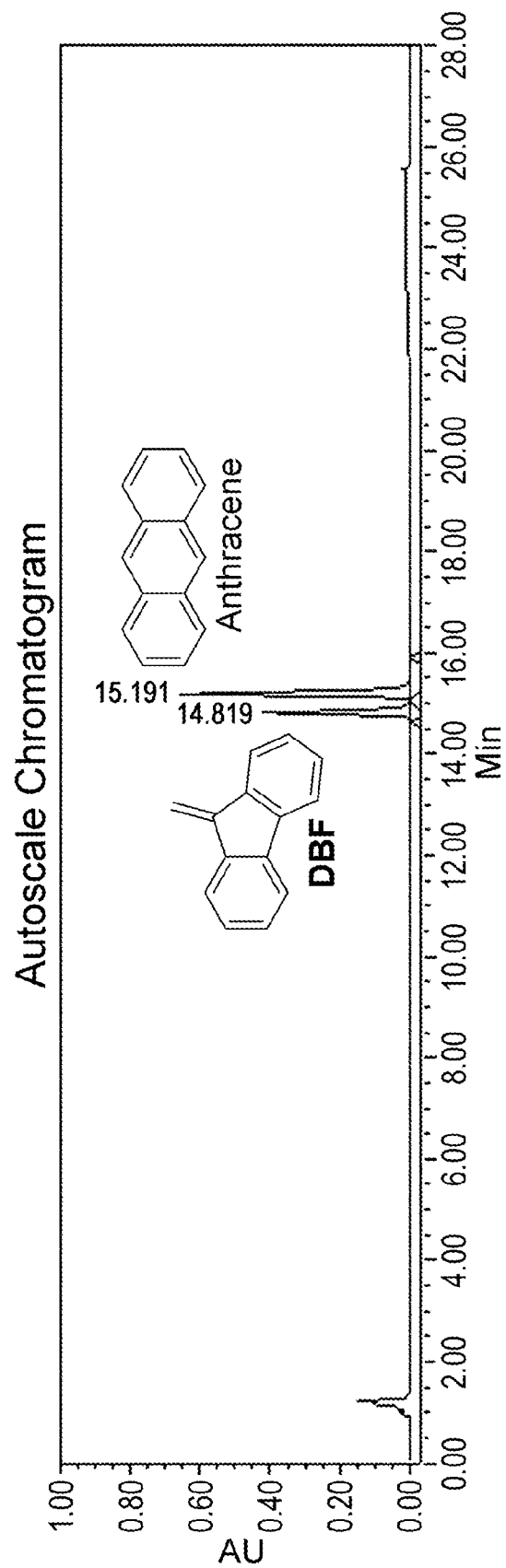
FIG. 20 shows the chromatogram of a sample solution after DBU treatment for a sample solution comprising crude Fmoc-NMe-Val-OH in Example 3.

The chromatogram of the standard solution is shown in FIG. 8 and chromatograms of each of the sample solutions are shown in FIGS. 9 to 11.

Furthermore, the content rate (w/w %) of each Fmoc-amino acid relative to Fmoc-Gly-OH can be calculated using the formulae described in Example 1. The results are shown in Table 5 (when the injected amount was not corrected with anthracene) and Table 6 (when the injected amount was corrected with anthracene).

TABLE 5

(No correction of injection amount with Anthracene)

| | Content rate | Weighed value (mg) | Molecular weight | DBF area |
|---|---|---|---|---|
| Fmoc-Gly-OH(Standard solution) | 100% | 10.089 | 297.31 | 2712659 |
| Fmoc-Val-OH | 101.2% | 10.042 | 339.39 | 2393206 |
| Fmoc-Phe-OH | 100.9% | 10.031 | 387.44 | 2088257 |
| Fmoc-NMe-Val-OH | 100.8% | 10.033 | 353.42 | 2286824 |

TABLE 6

(With correction of injection amount with Anthracene)

| | Content rate | Weighed value (mg) | Molecular weight | DBF area | IS area |
|---|---|---|---|---|---|
| Fmoc-Gly-OH(Standard solution) | 100% | 10.089 | 297.31 | 2712659 | 4128476 |
| Fmoc-Val-OH | 101.2% | 10.042 | 339.39 | 2393206 | 4129553 |
| Fmoc-Phe-OH | 100.6% | 10.031 | 387.44 | 2088257 | 4139598 |
| Fmoc-NMe-Val-OH | 100.9% | 10.033 | 353.42 | 2286824 | 4123566 |

From the above result, the content rates of the three Fmoc-amino acids were almost 100%. Furthermore, since the content rates were nearly unchanged by the presence or absence of the correction of the injected amount with anthracene, it is presumed that there was no difference between the injected amounts of the standard solution and each sample solution in this Example.

Example 3 (Analysis of Contents Corrected With Fmoc-Amino Acid Purity)

Preparation of Sample Solutions

Sample solutions (acetonitrile solutions containing a crude Fmoc-amino acid at a concentration of 100 μg/mL) were prepared by diluting 1 mg/mL crude Fmoc-amino acid solutions. The crude Fmoc-amino acids used in the sample solutions were purchased from Watanabe Chemical Industries, Ltd.

Analytical device and condition are as follows.
(Analytical Device)
HPLC System: H-class (Waters)
Ultraviolet/visible absorbance detector: ACQ-TUV
Pump: ACQ-QSM
Autosampler: ACQ-FTN
(Analytical Condition)
Column: OSAKA SODA, CAPCELL CORE ADME (3.0×150 mm, 2.7 μm)
Mobile Phase A: 0.05% TFA/water
Mobile Phase B: 0.05% TFA/acetonitrile
Flow Rate: 0.6 mL/min
Column Temperature: 40° C.
Sample Injection Volume: 2 μL
Measurement Wavelength: 254 nm
Gradient Condition: shown in Table 7

TABLE 7

| Time (min) | B (%) |
|---|---|
| 0 | 30 |
| 20 | 70 |
| 22 | 100 |
| 24 | 100 |

TABLE 7-continued

| Time (min) | B (%) |
|---|---|
| 24.1 | 30 |
| 28 | 30 |

As shown in FIGS. 12 to 20, the peaks of Fmoc-amino acids that disappeared due to DBU treatment can be confirmed by comparing the chromatograms with the chromatograms of Example 2. These peaks are considered as those derived from compounds having an Fmoc group, and the Fmoc-amino acid purities calculated by integrating only these peaks are shown in Table 8. The content rates can be calculated by correction with these purities and that of the injected amounts with anthracene. The results are shown in Table 9.

Calculation Formula $$\text{Content rate of each } Fmoc \text{ amino acid } (w/w\ \%) = DBF\ \text{assay}_{sample} \times \frac{P_S}{100}$$

DBF assay$_{sample}$: the content rate of each Fmoc-amino acid before the correction with purity
$P_S$: the purity of each Fmoc-amino acid in a compound having the Fmoc group

TABLE 8

Purity of each Fmoc amino acid

|  | Purity | Fmoc-amino acid peak area | Fmoc-related impurity peak area |
|---|---|---|---|
| Fmoc-Val-OH | 100% | 867907 | Not Detected |
| Fmoc-Phe-OH | 100% | 753197 | Not Detected |
| Fmoc-NMe-Val-OH | 99.94% | 821485 | 532 |

TABLE 9

Content of each Fmoc amino acid (with purity correction)

|  | Content |
|---|---|
| Fmoc-Val-OH | 101.2% |
| Fmoc-Phe-OH | 100.6% |
| Fmoc-NMe-Val-OH | 100.8% |

Example 4 (Study of DBF Stability)

Preparation of Sample Solutions

Fmoc-Gly-OH was dissolved in each solvent listed in Table 10 to prepare sample solutions (containing Fmoc-Gly-OH at a concentration of 100 µg/mL). Moreover, the sample solutions were stored at 10° C. and then analyzed.

TABLE 10

| Sample solution | Dissolving solvent |
|---|---|
| 1 | 20% Piperidine in DMF |
| 2 | 4% DBU in DMF |
| 3 | 2% DBU in DMF |
| 4 | 2% DBU in CH$_3$CN |
| 5 | 2% DBU in DMF dehydrated with Na$_2$SO$_4$ |
| 6 | 2% DBU and 5% citric acid in DMF (Prepared using 10% citric acid after treating with 4% DBU) |

Analytical device and condition are as follows.
(Analytical Device)
  HPLC System: H-class (Waters)
  Ultraviolet/visible absorbance detector: ACQ-PDA
  Pump: ACQ-QSM
  Autosampler: ACQ-FTN
(Analytical Condition)
  Column: OSAKA SODA, CAPCELL CORE ADME (2.1×150 mm, 2.7 µm)
  Mobile Phase A: 0.05% TFA/water
  Mobile Phase B: 0.05% TFA/acetonitrile
  Flow Rate: 0.3 mL/min
  Column Temperature: 40° C.
  Sample Injection Volume: 2 µL
  Measurement Wavelength: 254 nm
  Gradient Condition: shown in Table 11

TABLE 11

| Time (min) | B (%) |
|---|---|
| 0 | 30 |
| 20 | 70 |
| 22 | 100 |
| 24 | 100 |
| 24.1 | 30 |
| 28 | 30 |

Table 12 shows the ratios of the peak areas of DBF and its degradation product in the sample solutions on the first day and after storage periods of one, two, and five days. Table 13 shows the results of comparing the DBF peak areas in the sample solutions on the first day and after storage for five days (five days storage/first day). From these, it was found that degradation of DBF can be suppressed by treatment with citric acid.

TABLE 12

Peak ratio of DBF and its degradation products in stability test

|  |  | First day | One day storage | Two days storage | Five days storage |
|---|---|---|---|---|---|
| Sample solution-1 (20% Piperidine in DMF) | DBF-Pip | 93.35% | 78.38% | 66.65% | 44.64% |
|  | DBF | 3.53% | 2.79% | 2.32% | 1.68% |
|  | DBF degradation product | 3.12% | 18.84% | 31.02% | 53.69% |
| Sample solution-2 (4% DBU in DMF) | DBF | 99.59% | 98.20% | 96.40% | 89.72% |
|  | DBF degradation product | 0.41% | 1.80% | 3.60% | 10.28% |
| Sample solution-3 (2% DBU in DMF) | DBF | 99.70% | 99.33% | 98.87% | 97.16% |
|  | DBF degradation product | 0.30% | 0.67% | 1.13% | 2.84% |
| Sample solution-4 (2% DBU in CH$_3$CN) | DBF | 99.64% | 98.85% | 97.83% | 94.61% |
|  | DBF degradation product | 0.36% | 1.15% | 2.17% | 5.39% |
| Sample solution-5 (2% DBU in DMF dehydrated with Na$_2$SO$_4$) | DBF | 99.69% | 99.35% | 98.94% | 97.34% |
|  | DBF degradation product | 0.31% | 0.65% | 1.06% | 2.66% |

TABLE 12-continued

Peak ratio of DBF and its degradation products in stability test

| | | First day | One day storage | Two days storage | Five days storage |
|---|---|---|---|---|---|
| Sample solution-6 (2% DBU and 5% citric acid in DMF) | DBF | 99.78% | 99.77% | 99.77% | 99.76% |
| | DBF degradation product | 0.22% | 0.23% | 0.23% | 0.24% |

Note:
DBF-Pip has the following structure:

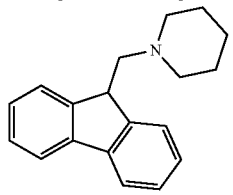

Note:
DBF degradation product has the following structure:

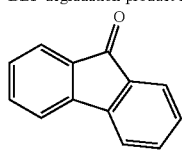

TABLE 13

Comparison result of DBU peak area in sample solutions at first day and after five days storage

| | DBF residual ratio (Five days storage/ First day) |
|---|---|
| Sample solution-1 (20% Piperidine in DMF) | 76.5% |
| Sample solution-2 (4% DBU in DMF) | 84.8% |
| Sample solution-3 (2% DBU in DMF) | 93.4% |
| Sample solution-4 (2% DBU in CH$_3$CN) | 92.1% |
| Sample solution-5 (2% DBU in DMF dehydrated with Na$_2$SO$_4$) | 94.2% |
| Sample solution-6 (2% DBU and 5% citric acid in DMF) | 97.1% |

Example 5 (Comparison with Quantitative NMR)

Figure 21:
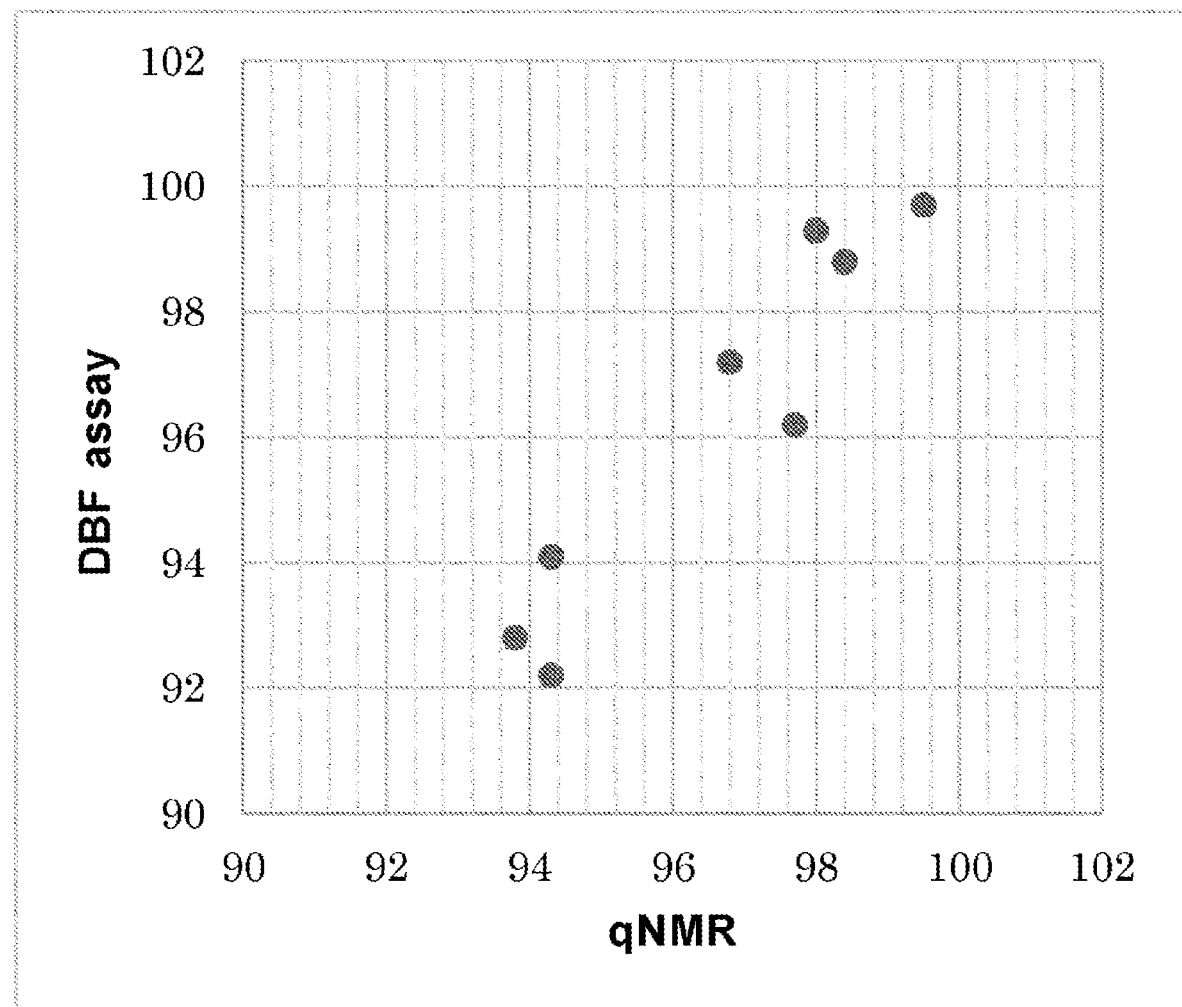
FIG. 21 depicts comparisons between the content rate of each Fmoc-amino acid calculated using a method of quantitative determination with DBF of the present invention and that calculated by quantitative NMR in Example 5.

To evaluate the validity of the quantitative determination methods (DBF assays) of the present invention, DBF produced by treatment with DBU was quantitatively determined in the same manner as in Example 1 or 2 (not corrected with the internal standard substance but corrected with purity) for various crude Fmoc-amino acids and compared with the quantitative values of the crude Fmoc-amino acids determined by quantitative NMR. Fmoc-Ile-OH (content rate of 99.18% by quantitative NMR) was used as an amino acid of the authentic sample used to prepare a standard solution. As shown in FIG. 21 and Table 14, a good positive correlation, a correlation coefficient of 0.95, was observed between the quantitative values by the present invention and those by quantitative NMR, and the validity of the present invention was proved.

Analytical device and reagents are as follows.

(Analytical Device)
NMR: JEOL 500 MHz Royal HFX Probe
Reagent: Fmoc-amino acids
Solvent: DMSO-d6
Standard: 3,5-bis(trifluoromethyl)-benzoic acid (99.96%±0.06%, Reagent for Quantitative NMR)

TABLE 14

| Fmoc-amino acid | DBF assay (%) | qNMR (%) |
|---|---|---|
| Fmoc-Aze-OH | 92.2 | 94.3 |
| Fmoc-cLeu-OH | 97.2 | 96.8 |
| Fmoc-Ile-OH | 99.3 | 98.0 |
| Fmoc-Pro-OH | 94.1 | 94.3 |
| Fmoc-NMe-Ala-OH | 99.7 | 99.5 |
| Fmoc-NMe-Cha-OH | 96.2 | 97.7 |
| Fmoc-NMe-Gly-OH | 92.8 | 93.8 |
| Fmoc-NMe-Leu-OH | 98.8 | 98.4 |

The correlation with qNMR showed that the quantitative determination methods of the present invention are effective, similarly to qNMR.

Example 6 (Quantitative Determination of Amino Acids after DBU Treatment of Fmoc-Amino Acids)

Figure 22:
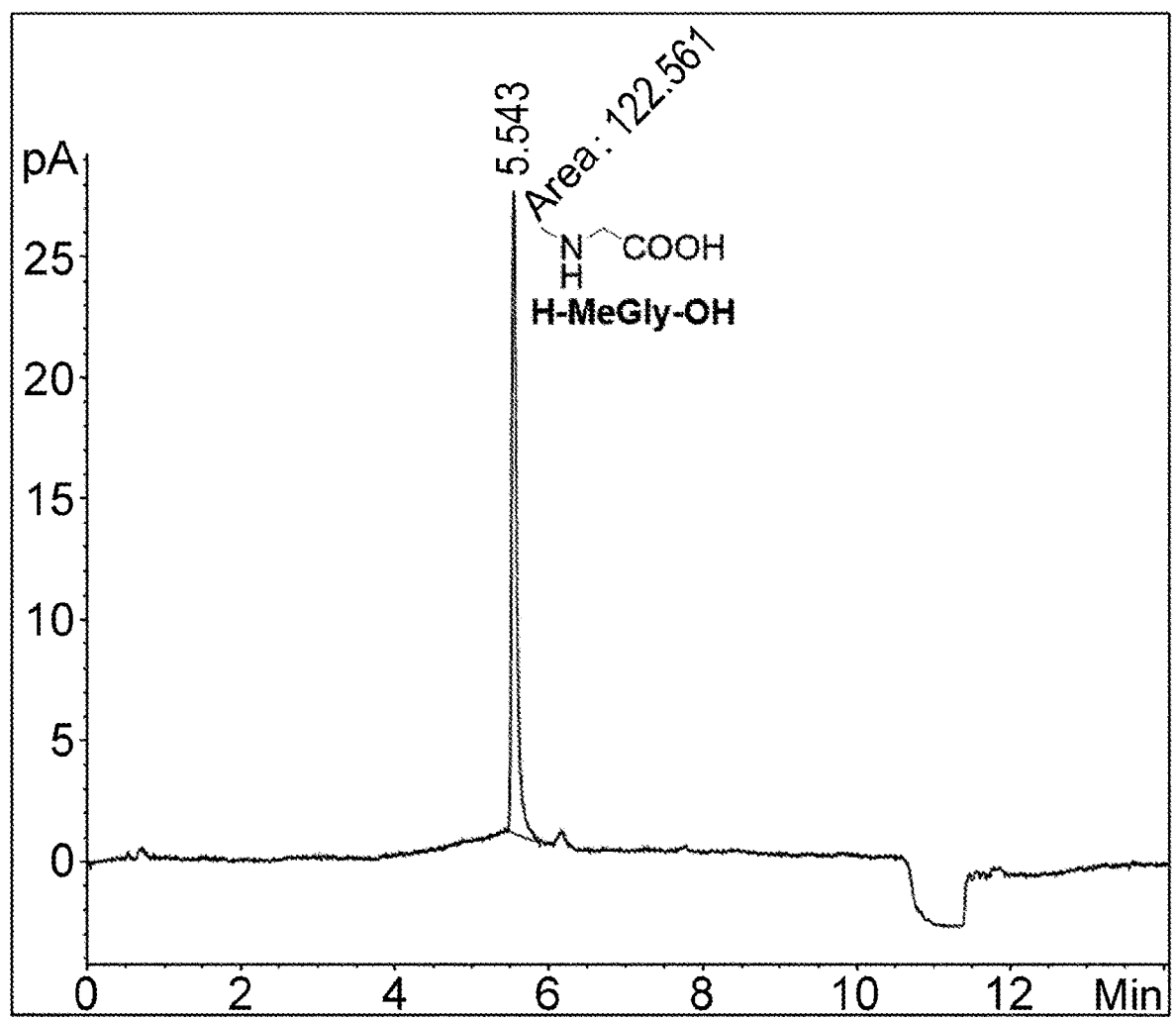
FIG. 22 shows the chromatogram of the standard solution of H-NMe-Gly-OH in Example 6.
Figure 23:
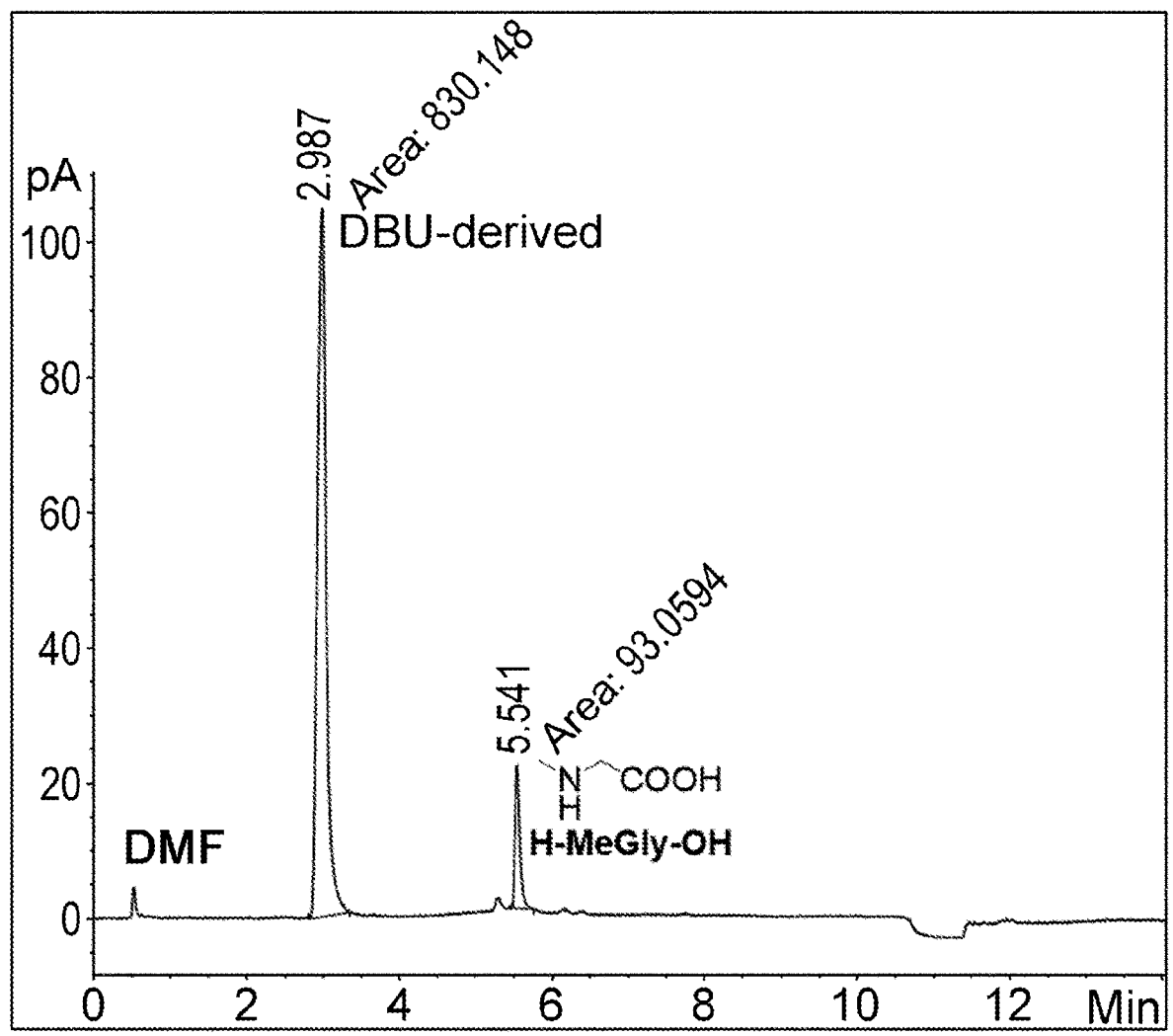
FIG. 23 shows the chromatogram of a sample solution after DBU treatment for a sample solution comprising crude Fmoc-NMe-Gly-OH in Example 6.
Figure 24:
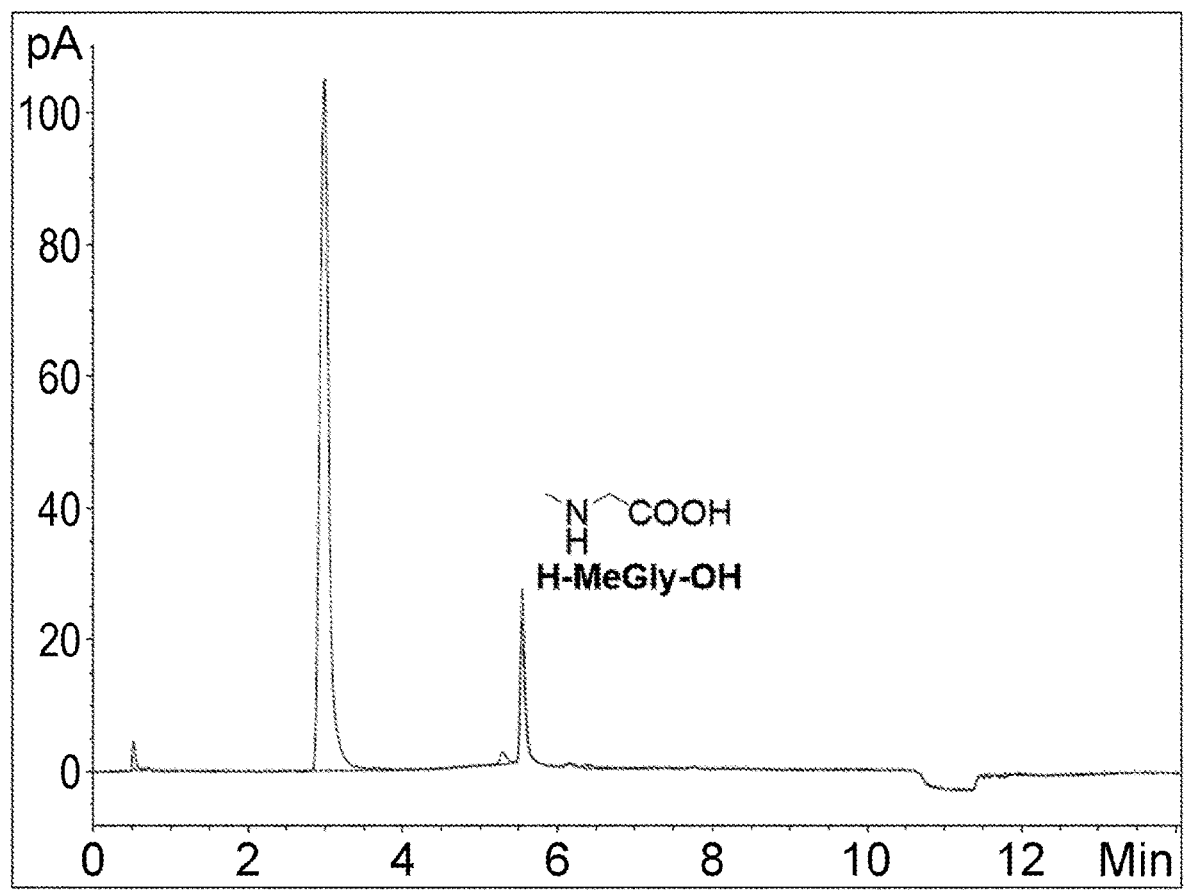
FIG. 24 depicts a comparison between the chromatograms of the standard solution of H-NMe-Gly-OH and the sample solution comprising crude Fmoc-NMe-Gly-OH after DBU treatment.

When an Fmoc-amino acid is deprotected with DBU, DBF and an amino acid are produced. While DBF was quantitatively determined in Examples 1 to 4, an amino acid was quantitatively determined in this Example. The peak area of H-NMe-Gly-OH produced by deprotecting Fmoc-NMe-Gly-OH with DBU was compared with that of the amino acid standard solution in which H-NMe-Gly-OH was used as an internal standard substance, and consequently H-NMeGly-OH produced by the deprotection was obtained at a yield of 97.2% (FIGS. 22 to 24). Thus, it was demonstrated that the deprotection reaction by addition of DBU proceeded quantitatively.

Moreover, the measurements in this Example were performed by hydrophilic interaction chromatography (HILIC), and the peaks of highly hydrophobic compounds (such as DBF) appeared at earlier elution positions and the peaks of highly hydrophilic compounds (such as an amino acid) appeared at later elution positions. Furthermore, H-NMe-Gly-OH hardly absorbs ultraviolet-visible wavelengths and thus was detected by CAD.

Preparation of an Amino Acid Standard Solution

A solution containing H-NMeGly-OH (N-methylglycine) at a concentration of 100 μg/mL was prepared. H-NMe-Gly-OH (purity: 99.7% (non-aqueous method)) was purchased from Tokyo Chemical Industry, Co., Ltd.

Preparation of a Sample Solution

After addition of 2% DBU solution (acetonitrile solution containing DBU at a concentration of 2 v/v %) to Fmoc-NMeGly-OH, it was diluted with $CH_3CN/H_2O$ (4:1) to prepare a sample solution (a solution containing the Fmoc-amino acid at a concentration of 300 μg/mL). Fmoc-MeGly-OH was purchased from a raw material manufacturer.

Analytical device and condition are as follows.

(Analytical Device)
 HPLC System: 1200 series (Agilent)
 Ultraviolet/visible absorbance detector: Agilent 1200 MWD
 Pump: Agilent 1200 Binary pump-1, -2
 Autosampler: Agilent 1200 Auto sampler (Analytical Condition)
 Column: Imtakt Intrada Amino Acid (3×100 mm, 3 μm)
 Mobile Phase A: 0.1% formic acid/acetonitrile
 Mobile Phase B: 100 mM ammonium formate/water
 Flow Rate: 1.0 mL/min
 Column Temperature: 35° C.
 Sample Injection Volume: 2 μL
 Detector: Charged Aerosol Detector (CAD) (Corona ULTRA)
 Gradient Condition: shown in Table 15

TABLE 15

| Time (min) | A (%) | B (%) |
|---|---|---|
| 0 | 86 | 14 |
| 3 | 86 | 14 |
| 10 | 0 | 100 |
| 10.01 | 86 | 14 |
| 14 | 86 | 14 |

Separately from the above conditions, an inverse gradient setting was performed and the mobile phases were introduced into the detector so that A:B=50:50 constantly.

Reverse-gradient Condition: shown in Table 16

TABLE 16

| Time (min) | A (%) | B (%) |
|---|---|---|
| 0 | 14 | 86 |
| 3 | 14 | 86 |
| 10 | 100 | 0 |
| 10.01 | 14 | 86 |
| 14 | 14 | 86 |

Example 7 (Quantitative Determination of Fmoc-Peptides by DBF)

Preparation of a Standard Solution

Fmoc-Gly-OH (about 10 mg) was precisely weighed according to the Pharmacopoeia of Japan and dissolved in acetonitrile (20 mL) to prepare an Fmoc-Gly-OH solution (acetonitrile solution containing Fmoc-Gly-OH at a concentration of 500 μg/mL). An internal standard solution (acetonitrile solution containing anthracene at a concentration of 250 μg/mL), a DBU solution (acetonitrile solution containing DBU at a concentration of 10 v/v %), and acetonitrile were added to the Fmoc-Gly-OH solution to prepare an acetonitrile solution containing Fmoc-Gly-OH, anthracene, and DBU at concentrations of 50 μg/mL, 25 μg/mL, and 2 v/v %, respectively. Next, the solution was agitated with vortex and then left to stand at room temperature for 10 minutes or longer to deprotect the Fmoc group. It was confirmed by the UV chromatogram obtained by HPLC that the deprotection reaction proceeded quantitatively. In this Example, the above solution before the start of the deprotection reaction may be referred to as the "unreacted standard solution" and the solution after the deprotection reaction may be referred to merely as the "standard solution". Fmoc-Gly-OH (purity: 98.6%) used to prepare the standard solution was purchased from Tokyo Chemical Industry, Co., Ltd.

Preparation of Sample Solution-1

Crude Fmoc-Phe-Phe-OH (about 10 mg) to be quantitatively determined was precisely weighed according to the Pharmacopoeia of Japan and dissolved in acetonitrile (20 mL) to prepare a crude Fmoc-Phe-Phe-OH solution (acetonitrile solution containing an Fmoc-Phe-Phe-OH at a concentration of 500 μg/mL). An internal standard solution (acetonitrile solution containing anthracene at a concentration of 250 μg/mL), a DBU solution (acetonitrile solution containing DBU at a concentration of 10 v/v %), and acetonitrile were added to the crude Fmoc-Phe-Phe-OH solution to prepare an acetonitrile solution containing the crude Fmoc-Phe-Phe-OH, anthracene, and DBU at concentrations of 50 μg/mL, 25 μg/mL, and 2 v/v %, respectively. Next, the solution was agitated with vortex and then left to stand at room temperature for 10 minutes or longer to deprotect the Fmoc group. It was confirmed by the UV chromatogram obtained by HPLC that the deprotection reaction proceeded quantitatively. Crude Fmoc-Phe-Phe-OH (purity: 99.8%) used to prepare the solution was purchased from Watanabe Chemical Industries, Ltd. In this Example, the above solution before the start of the deprotection reaction may be referred to as the "unreacted sample solution" and the solution after the deprotection reaction may be referred to merely as the "sample solution".

Preparation of Sample Solutions-2 (Crude Fmoc-Peptide Compounds Which Were Synthesized by a Solid-Phase Reaction and Supported by a Resin)

The crude Fmoc-peptide compounds to be quantitatively determined which were synthesized by a solid-phase reaction and supported by a resin (hereinafter may be referred to merely as "crude Fmoc-peptide compounds supported by a resin") (about 30 mg) were precisely weighed according to the Pharmacopoeia of Japan, dichloromethane (3 mL) was added, and they were left to stand for 15 minutes or longer to be swollen. In this Example and Example 8, a CTC resin was used as the resin for solid-phase synthesis. After eliminating dichloromethane, the resin was washed twice with dichloromethane (3 mL). To the resin, 0.6 mL of TFA solution (dichloromethane solution containing TFA at a concentration of 1 v/v %) was added and shaken at room temperature to cut off the crude Fmoc-peptides from the resin. To them, an internal standard solution (acetonitrile solution containing anthracene at a concentration of 250 μg/mL), a DBU solution (acetonitrile solution containing DBU at a concentration of 10 v/v %), and acetonitrile were added to prepare acetonitrile solutions respectively containing the crude Fmoc-peptide which contains the crude Fmoc-peptide as a crude Fmoc-peptide compound supported by a resin at a concentration of 1 mg/mL, anthracene at a concentration of 25 µg/mL, and DBU at a concentration of 2 v/v %. Next, the solutions were agitated with vortex and left to stand at room temperature for 10 minutes or longer to deprotect the Fmoc group. It was confirmed by the UV chromatograms obtained by HPLC that the deprotection reaction proceeded quantitatively. In this Example, the above solution before the start of the deprotection reaction may be referred to as the "unreacted sample solution" and the solution after the deprotection reaction may be referred to merely as the "sample solution".

Analytical device and condition are as follows.
(Analytical Device)
 HPLC System: H-class (Waters)
 Ultraviolet/visible absorbance detector: ACQ-TUV
 Pump: ACQ-QSM
 Autos ampler: ACQ-FTN
(Analytical Condition)
 Column: OSAKA SODA, CAPCELL CORE ADME (2.1×150 mm, 2.7 µm)
 Mobile Phase A: 0.05% TFA/water
 Mobile Phase B: 0.05% TFA/acetonitrile
 Flow Rate: 0.3 mL/min
 Column Temperature: 40° C.
 Sample Injection Volume: 2 µL
 Measurement Wavelength: 254 nm
 Gradient Condition: shown in Table 17

TABLE 17

| Time (min) | B (%) |
|---|---|
| 0 | 30 |
| 20 | 70 |
| 22 | 100 |
| 24 | 100 |
| 24.1 | 30 |
| 28 | 30 |

Calculation Formula (When the Injected Amount was not Corrected With Anthracene)

$$\text{Content rate of each } \textit{Fmoc} \text{ peptide } (w/w\ \%) = \frac{C_S \times A_T}{C_T \times A_S} \times 100$$

$C_S$: the concentration of Fmoc-Gly-OH in the unreacted standard solution (µmol/L)
$C_T$: the concentration of each crude Fmoc-peptide in each unreacted sample solution (µmol/L)
$A_S$: the peak area of DBF in the standard solution
$A_T$: the peak area of DBF in each sample solution Calculation Formula (When the Injected Amount was Corrected With Anthracene)

$$\text{Content rate of each } \textit{Fmoc} \text{ peptide } (w/w\ \%) = \frac{C_S \times IS_S \times A_T}{C_T \times IS_T \times A_S} \times 100$$

$C_S$: the concentration of Fmoc-Gly-OH in the unreacted standard solution (µmol/L)
$C_T$: the concentration of each crude Fmoc-peptide in each unreacted sample solution (µmol/L)
$IS_S$: the peak area of anthracene in the standard solution
$IS_T$: the peak area of anthracene in each sample solution
$A_S$: the peak area of DBF in the standard solution
$A_T$: the peak area of DBF in each sample solution

TABLE 18

(No correction of injection amount with Anthracene)

|  | Content rate | Weighed value (mg) | Molecular weight | DBF area |
|---|---|---|---|---|
| Fmoc-Gly-OH(Standard solution) | 100% | 10.164 | 297.31 | 2877246 |
| Fmoc-Phe-Phe-OH | 96.9% | 10.159 | 534.61 | 1549442 |
| Fmoc-Gly-Gly-O-resin | 4.5% | 30.246 | 354.36 | 2133393 |
| Fmoc-Gly-Leu-O-resin | 14.3% | 30.035 | 410.47 | 5851797 |
| Fmoc-Gly-bAla-O-resin | 15.6% | 30.228 | 368.39 | 7161231 |

TABLE 19

(With correction of injection amount with Anthracene)

|  | Content rate | Weighed value (mg) | Molecular weight | DBF area | IS area |
|---|---|---|---|---|---|
| Fmoc-Gly-OH(Standard solution) | 100% | 10.164 | 297.31 | 2877246 | 5485589 |
| Fmoc-Phe-Phe-OH | 96.8% | 10.159 | 534.61 | 1549442 | 5487385 |
| Fmoc-Gly-Gly-O-resin | 4.5% | 30.246 | 354.36 | 2133393 | 5490954 |
| Fmoc-Gly-Leu-O-resin | 14.1% | 30.035 | 410.47 | 5851797 | 5537987 |
| Fmoc-Gly-bAla-O-resin | 15.6% | 30.228 | 368.39 | 7161231 | 5484376 |

Figure 25:
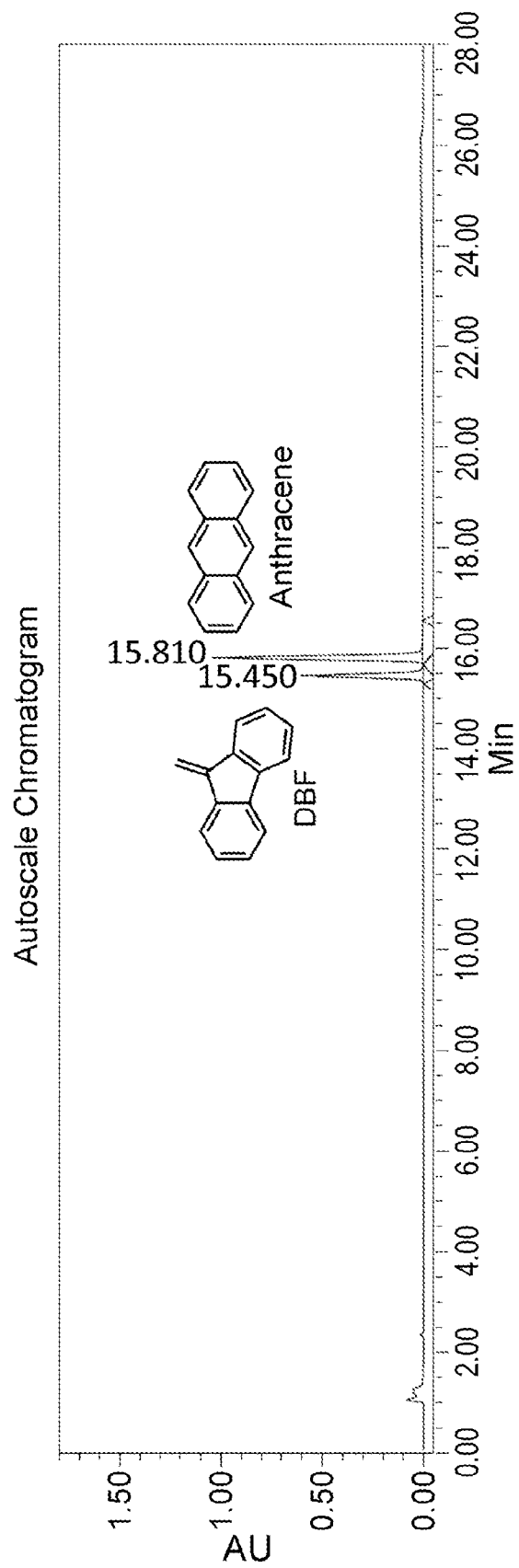
FIG. 25 shows the chromatogram of the standard solution (solution in which Fmoc-Gly-OH was treated by DBU) in Example 7.
Figure 26:
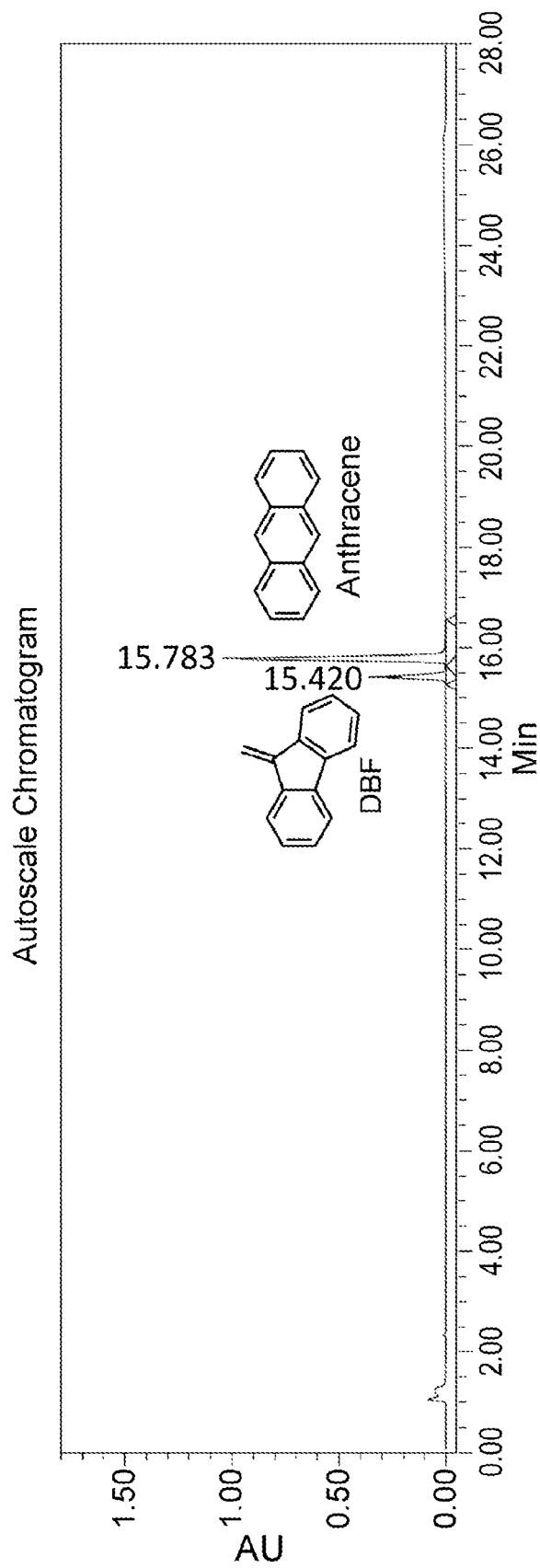
FIG. 26 shows the chromatogram of a solution after DBU treatment for a sample solution comprising crude Fmoc-Phe-Phe-OH in Example 7.
Figure 27:
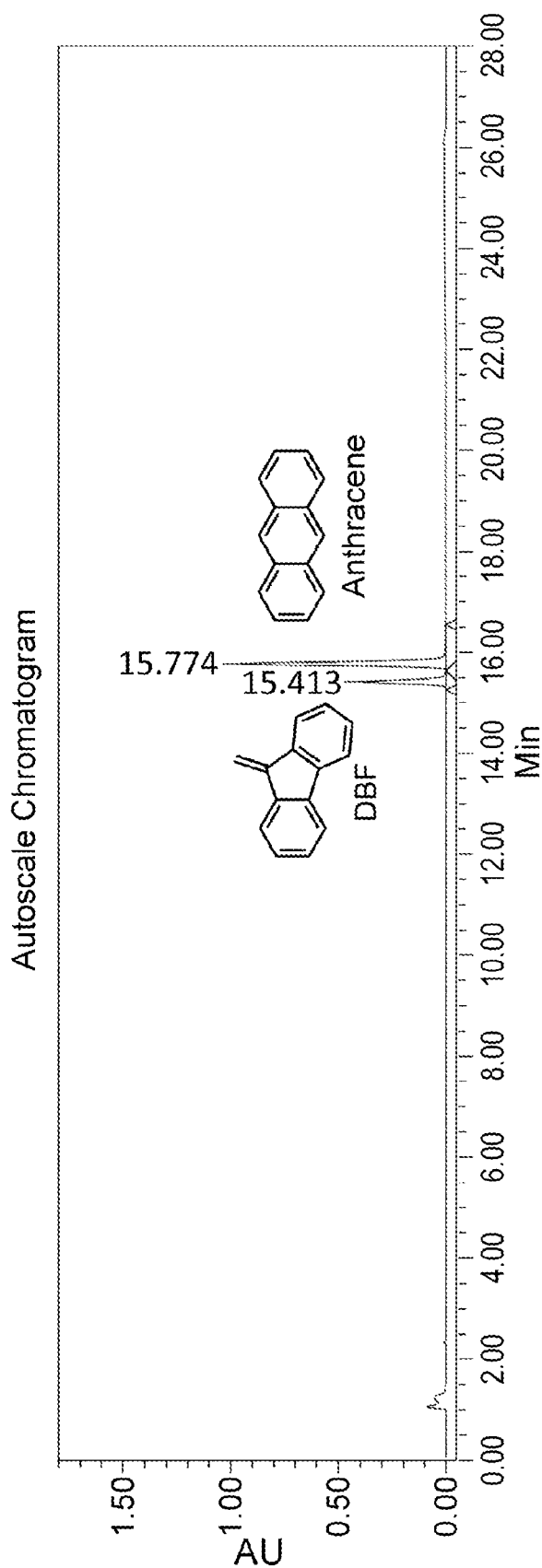
FIG. 27 shows the chromatogram of a solution after DBU treatment for a sample solution comprising crude Fmoc-Gly-Gly-OH in Example 7.
Figure 28:
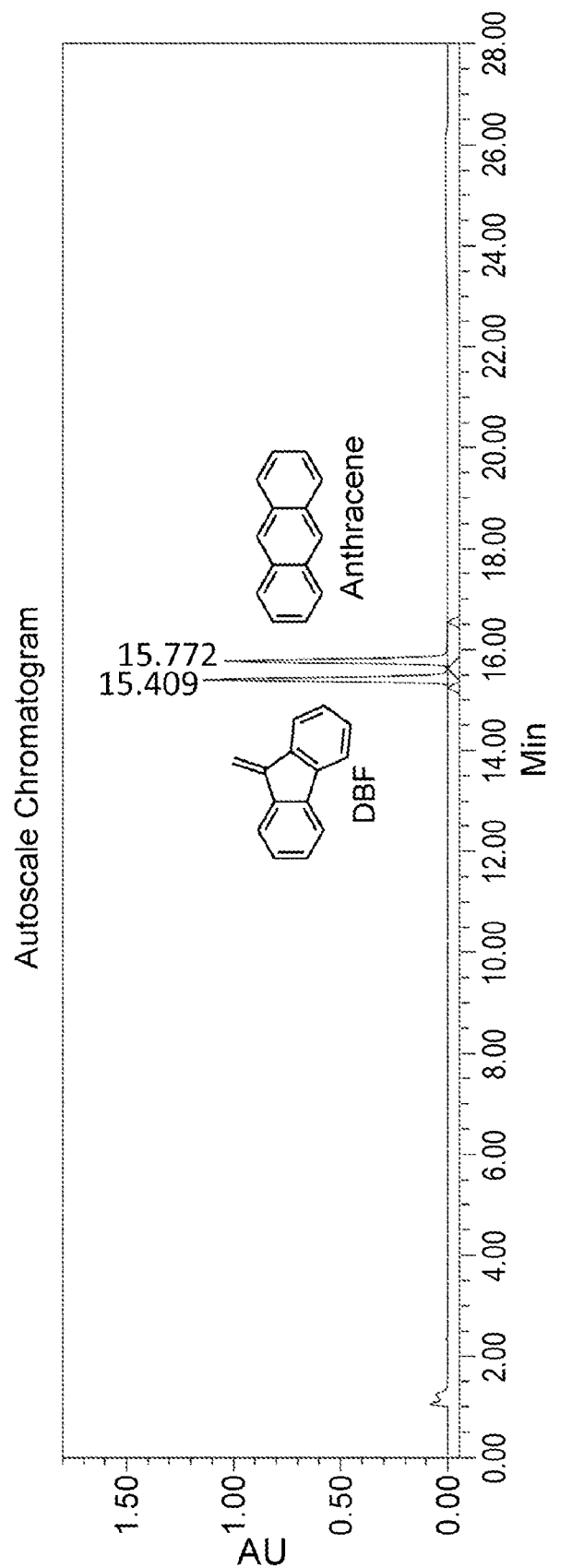
FIG. 28 shows the chromatogram of a solution after DBU treatment for a sample solution comprising crude Fmoc-Gly-Leu-OH in Example 7.
Figure 29:
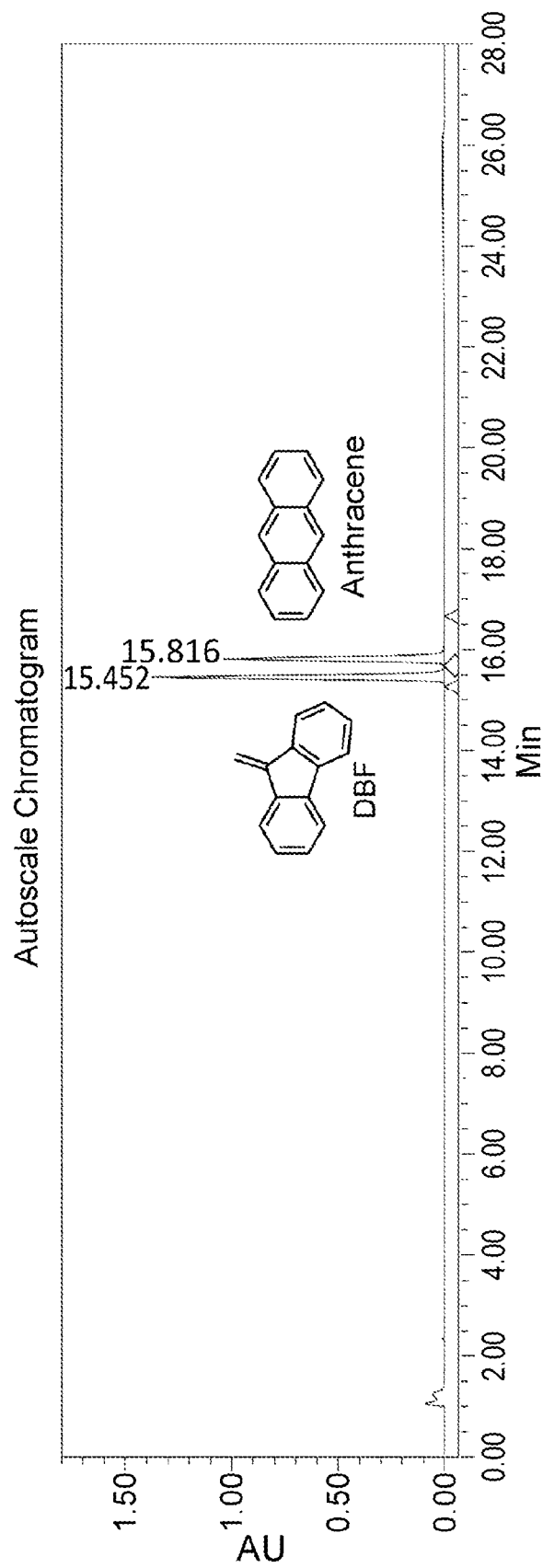
FIG. 29 shows the chromatogram of a solution after DBU treatment for a sample solution comprising crude Fmoc-Gly-bAla-OH in Example 7.
Figure 30:
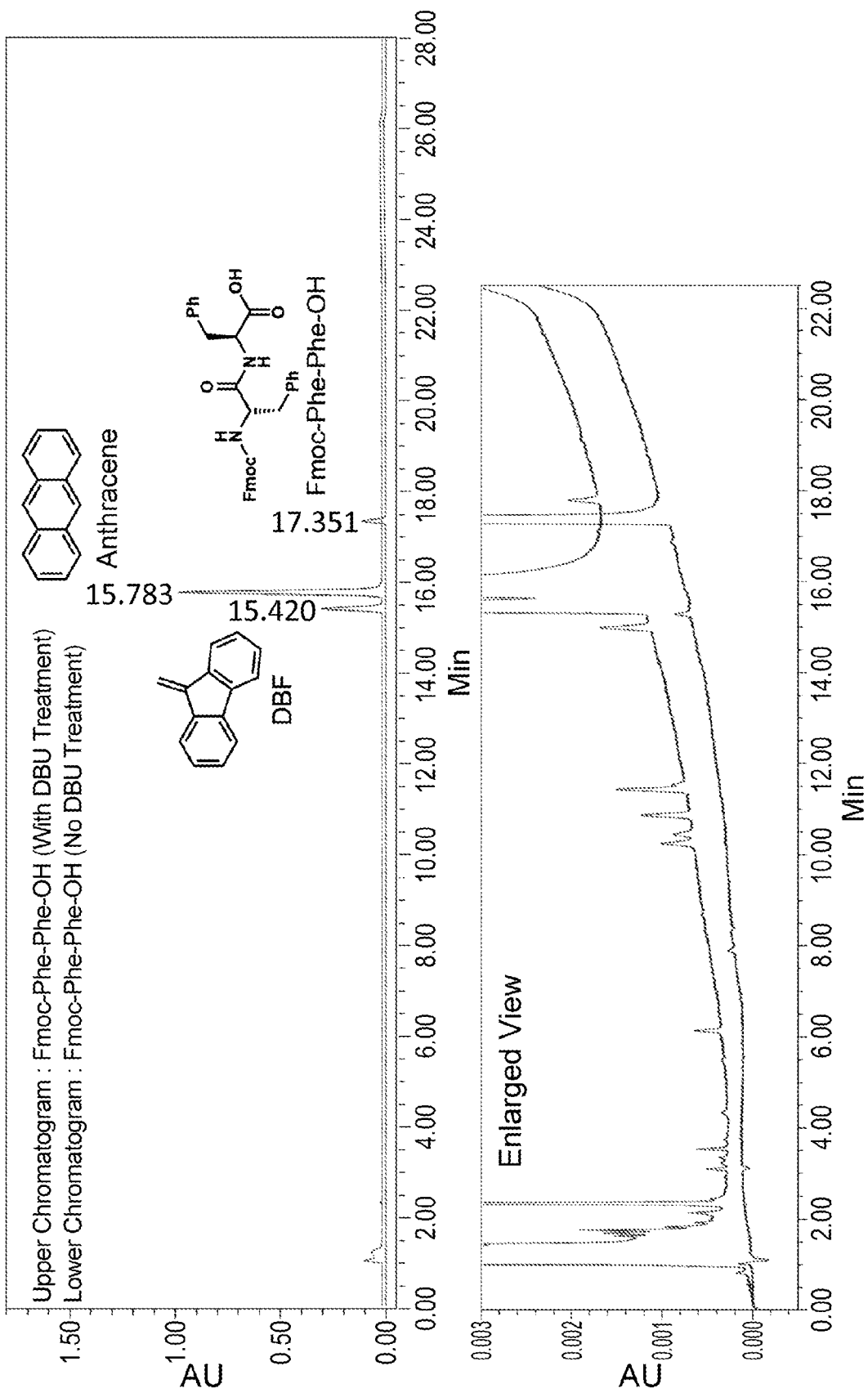
FIG. 30 depicts a comparison between the chromatograms of a sample solution comprising crude Fmoc-Phe-Phe-OH before and after DBU treatment in Example 7.
Figure 31:
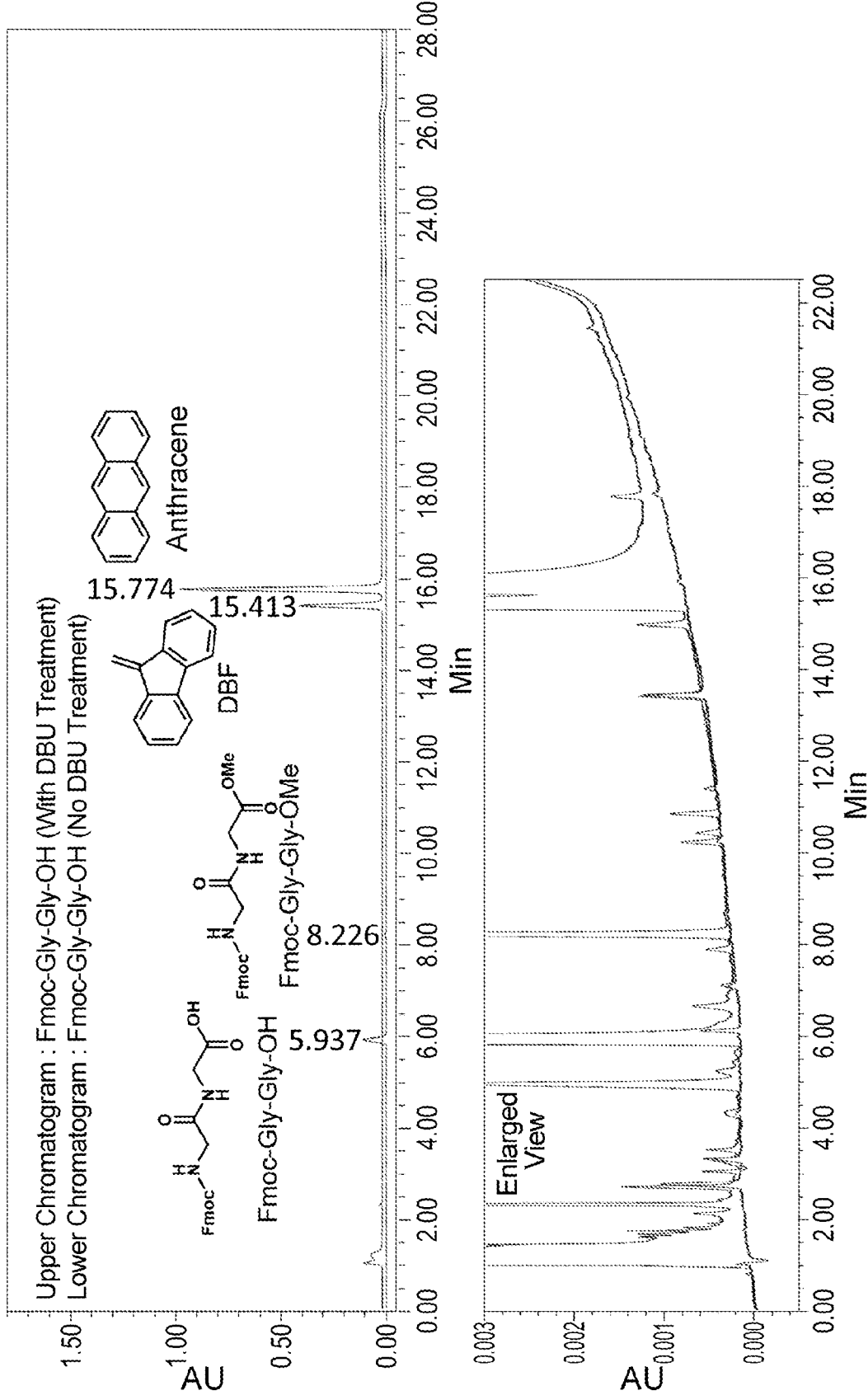
FIG. 31 depicts a comparison between the chromatograms of a sample solution comprising crude Fmoc-Gly-Gly-OH before and after DBU treatment in Example 7.
Figure 32:
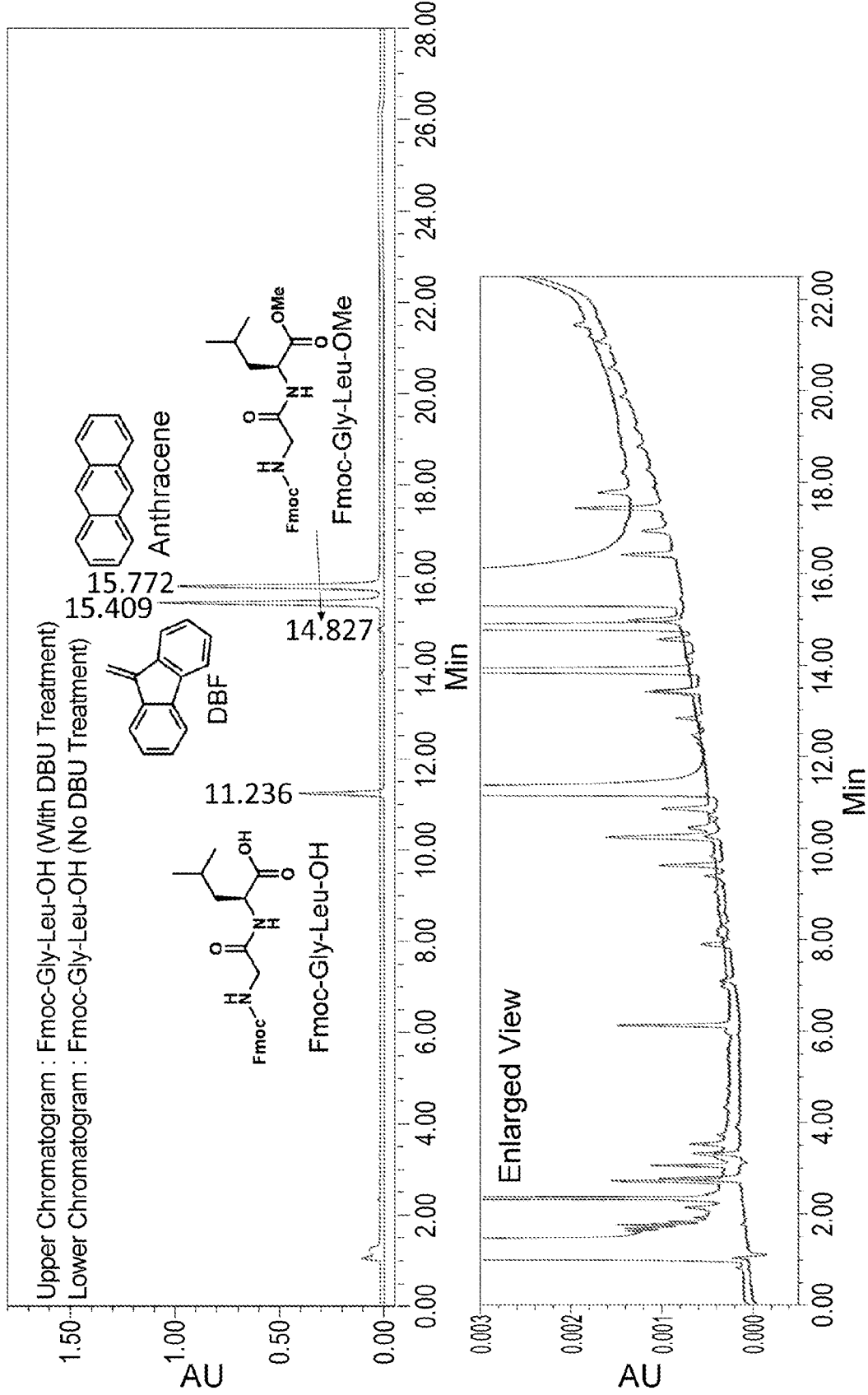
FIG. 32 depicts a comparison between the chromatograms of a sample solution comprising crude Fmoc-Gly-Leu-OH before and after DBU treatment in Example 7.
Figure 33:
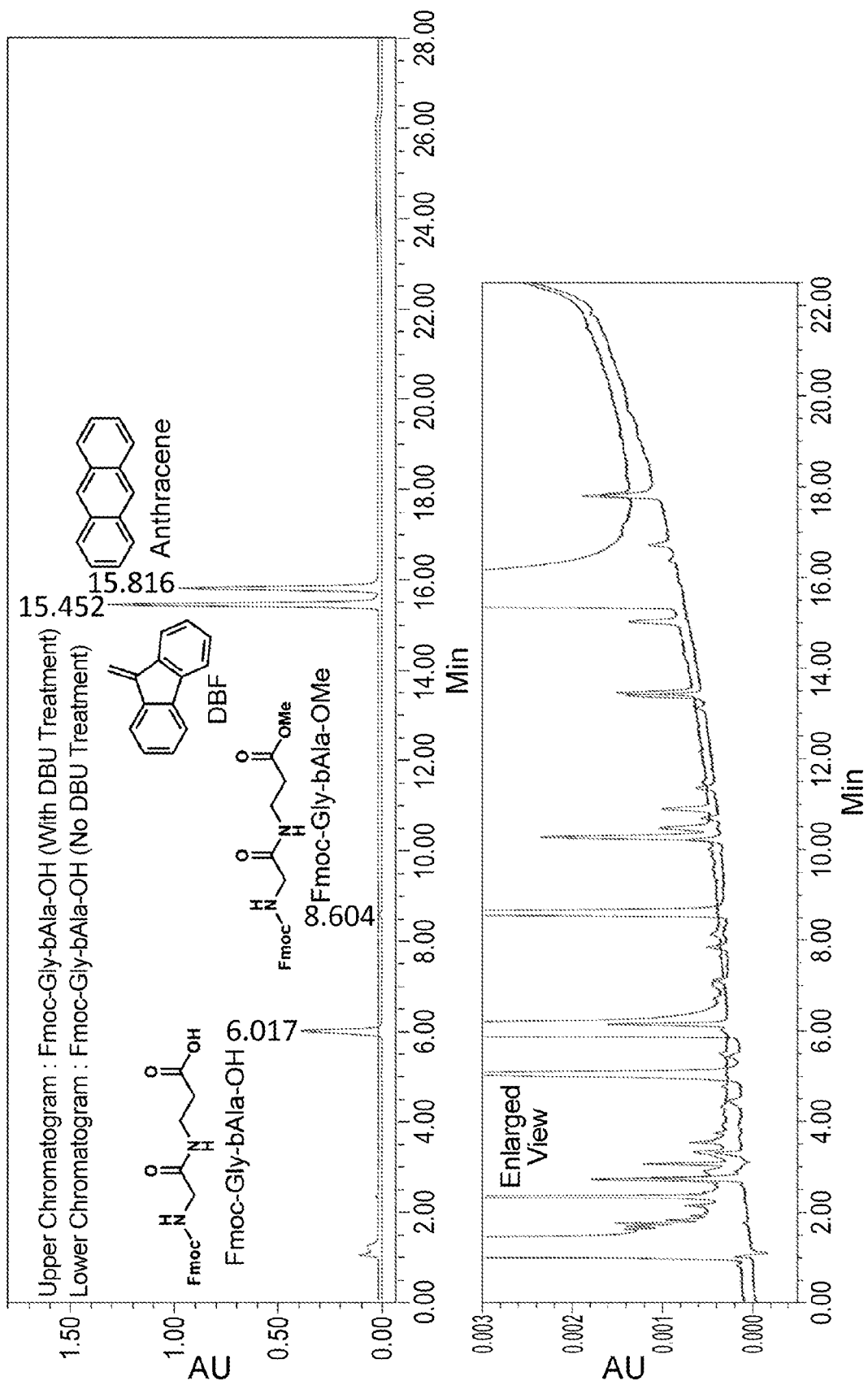
FIG. 33 depicts a comparison between the chromatograms of a sample solution comprising crude Fmoc-Gly-bAla-OH before and after DBU treatment in Example 7.

The chromatogram of the standard solution is shown in FIG. 25 and those of the sample solutions are each shown in FIGS. 26 to 29.

Furthermore, the content rate (w/w %) of each Fmoc-peptide relative to Fmoc-Gly-OH can be calculated using the formulae indicated below. The results are shown in Table 18 (when the injected amount was not corrected with anthracene) and Table 19 (when the injected amount was corrected with anthracene). The molecular weights of Fmoc-peptides contained in the sample solutions were determined as carboxylate forms having a carboxyl group at their end.

Example 8 (Analysis of Contents Corrected With Fmoc-Peptide Purity)

Preparation of a Sample Solution-1
A sample solution (acetonitrile solution containing crude Fmoc-Phe-Phe-OH at a concentration of 50 µg/mL) was prepared by diluting 500 µg/mL crude Fmoc-Phe-Phe-OH solution.

Preparation of Sample Solutions-2
As with "Preparation of sample solutions-2" in Example 7, sample solutions were prepared by diluting cutoff solutions with acetonitrile so as to contain a crude Fmoc peptide as a crude Fmoc-peptide compound supported by a resin at a concentration of 1 mg/mL. Analytical device and condition are as follows.
(Analytical Device)
  HPLC System: H-class (Waters)
  Ultraviolet/visible absorbance detector: ACQ-TUV
  Pump: ACQ-QSM
  Autosampler: ACQ-FTN
(Analytical Condition)
  Column: OSAKA SODA, CAPCELL CORE ADME (2.1×150 mm, 2.7 µm)
  Mobile Phase A: 0.05% TFA/water
  Mobile Phase B: 0.05% TFA/acetonitrile
  Flow Rate: 0.3 mL/min
  Column Temperature: 40° C.
  Sample Injection Volume: 2 µL
  Measurement Wavelength: 254 nm
  Gradient Condition: shown in Table 20

TABLE 20

| Time (min) | B (%) |
|---|---|
| 0 | 30 |
| 20 | 70 |
| 22 | 100 |
| 24 | 100 |
| 24.1 | 30 |
| 28 | 30 |

The purity of crude Fmoc-peptide relative to the total Fmoc compounds was calculated for each sample solution. The results are shown in Table 21. Correction with the purities calculated and with anthracene was performed to calculate the content rates of the Fmoc-peptides. The results are shown in Table 22. With respect to the measured samples in which a methyl ester form occurred during storage of the samples, the purity was calculated assuming that the methyl ester form was also the Fmoc-peptide of interest.
Calculation Formula $$\text{Content rate of each } Fmoc \text{ peptide } (w/w\ \%) = DBF\ \text{assay}_{sample} \times \frac{P_S}{100}$$

DBF assay$_{sample}$: the content rate of each Fmoc-peptide before the correction with purity
$P_S$: the purity of each Fmoc-peptide in a compound having an Fmoc group

TABLE 21

|  | Purity | Fmoc-peptide peak area | Fmoc-related impurity peak area |
|---|---|---|---|
| Fmoc-Phe-Phe-OH | 99.8% | 550347 | 1164 |
| Fmoc-Gly-Gly-O-resin | 95.4% | 733278 | 35659 |
| Fmoc-Gly-Leu-O-resin | 96.5% | 2092302 | 75060 |
| Fmoc-Gly-bAla-O-resin | 98.4% | 2570065 | 41707 |

TABLE 22

|  | Content rate |
|---|---|
| Fmoc-Phe-Phe-OH | 96.6% |
| Fmoc-Gly-Gly-O-resin | 4.3% |

TABLE 22-continued

|  | Content rate |
|---|---|
| Fmoc-Gly-Leu-O-resin | 13.6% |
| Fmoc-Gly-bAla-O-resin | 15.4% |

From the results above, it was demonstrated that the quantitative determination methods of the present invention can be utilized for content analysis of Fmoc-peptides and Fmoc-peptides from Fmoc-peptide compounds which have been synthesized by a solid-phase reaction and supported by a resin.

INDUSTRIAL APPLICABILITY

The present invention provides novel methods of quantitatively determining compounds containing an amino group protected with a protecting group having an Fmoc skeleton. The present invention allows quantitatively determining highly precisely and easily the content of a compound containing an amino group protected with a protecting group having an Fmoc skeleton contained in an analysis sample.

The invention claimed is:

1. A method of quantitatively determining the content of a compound containing an amino group protected with a first protecting group having an Fmoc skeleton (hereinafter referred to as a first Fmoc compound) comprised in a crude product, the method comprising:
  deprotecting the first protecting group with a first base from the first Fmoc compound in a solution (hereinafter referred to as a first solution) to quantitatively determine the content of dibenzofulvene or its derivative thereby produced; and
  deprotecting a second protecting group having an Fmoc skeleton with a second base from a compound containing an amino group with the second protecting group (hereinafter referred to as a second solution) to quantitatively determine the content of dibenzofulvene or its derivative thereby produced.

2. The method of claim 1, wherein a content rate (% weight) of the first Fmoc compound relative to the second Fmoc compound is calculated by comparing the content of the dibenzofulvene or its derivative between in the first solution and in the second solution.

3. The method of claim 1, wherein the deprotection reactions quantitatively proceed in the first solution and in the second solution.

4. The method of claim 1, wherein the content of the dibenzofulvene or its derivative in the first solution or the second solution is quantitatively determined by measuring the peak area of the dibenzofulvene or its derivative in the first solution or the second solution.

5. The method of claim 2, further comprising correcting the content rate with an Fmoc purity in the crude product, wherein the "Fmoc purity" is the ratio of the content of the first Fmoc compound to the sum of the contents of all compounds protected with the protecting group having the Fmoc skeleton contained in the crude product.

6. The method of claim 5, wherein the Fmoc purity is calculated based on (i) the peak area of the first Fmoc compound and (ii) each peak area of the compounds protected with the protecting group having the Fmoc skeleton other than the first Fmoc compound in the crude product.

7. The method of claim 2, further comprising correcting the content rate with an internal standard substance.

8. The method of claim 7, comprising comparing the content of an internal standard substance comprised in the first solution (hereinafter referred to as a first internal standard substance) with that of an internal standard substance comprised in the second solution (hereinafter referred to as a second internal standard substance).

9. The method of claim 8, wherein the contents of the first and second internal standard substances are each quantitatively determined by measuring the peak areas of the first and second internal standard substances.

10. The method of claim 4, wherein each peak area is measured by chromatography.

11. The method of claim 10, wherein each peak area is measured under the same measurement conditions.

12. The method of claim 1, wherein the first protecting group having the Fmoc skeleton in the first Fmoc compound is represented by Formula (1):

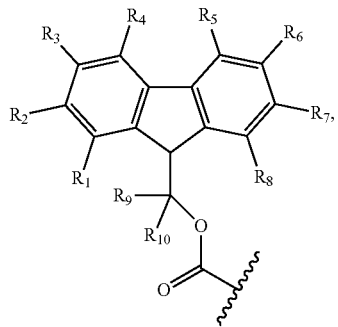

(1)

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl.

13. The method of claim 1, wherein the first Fmoc compound and/or the second Fmoc compound are/is amino acid(s), peptide(s), or low molecular weight organic compound(s), each protected with the protecting group having the Fmoc skeleton.

14. The method of claim 1, wherein the first base is an organic base.

15. The method of claim 1, wherein the second protecting group having the Fmoc skeleton in the second Fmoc compound is represented by Formula (1):

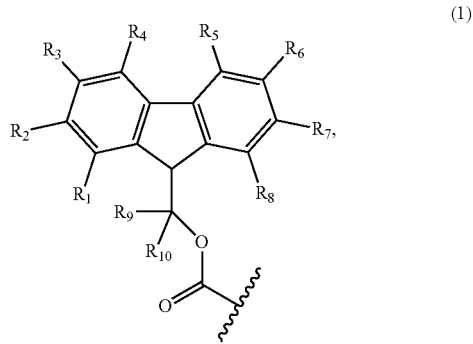

(1)

wherein
$R_1$ to $R_8$ are independently selected from the group consisting of hydrogen, $C_1$-$C_8$ alkyl, $C_1$-$C_8$ fluoroalkyl, halogen, sulfo, and trimethylsilyl; and
$R_9$ and $R_{10}$ are independently hydrogen or methyl.

16. The method of claim 1, wherein the second base is an organic base.

17. The method of claim 1, wherein the first protecting group and the second protecting group are the same.

18. The method of claim 1, wherein the first protecting group and the second protecting group are both 9-Fluorenylmethoxycarbonyl (Fmoc) group.

19. The method of claim 1, wherein the first base and the second base are the same.

20. The method of claim 1, wherein the first base and the second base are both 1,8-diazabicyclo[5.4.0]-7-undecene (DBU).

* * * * *